US012693388B2

(12) United States Patent　　　(10) Patent No.:　US 12,693,388 B2
Kobayashi et al.　　　　　　　　(45) Date of Patent:　　Jul. 28, 2026

(54) OPTICAL MODULE AND DISTANCE MEASURING DEVICE

(71) Applicant: SONY SEMICONDUCTOR SOLUTIONS CORPORATION, Kanagawa (JP)

(72) Inventors: Takashi Kobayashi, Kanagawa (JP); Tatsuya Oiwa, Kanagawa (JP); Jialun Xu, Kanagawa (JP); Motoi Kimura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 539 days.

(21) Appl. No.: 18/276,347

(22) PCT Filed: Dec. 23, 2021

(86) PCT No.: PCT/JP2021/047961
§ 371 (c)(1),
(2) Date: Aug. 8, 2023

(87) PCT Pub. No.: WO2022/176389
PCT Pub. Date: Aug. 25, 2022

(65) Prior Publication Data
US 2024/0111030 A1　　Apr. 4, 2024

(30) Foreign Application Priority Data
Feb. 16, 2021　(JP) ................................. 2021-022811

(51) Int. Cl.
G01S 7/481　　　(2006.01)

(52) U.S. Cl.
CPC .......... G01S 7/4817 (2013.01); G01S 7/4815 (2013.01)

(58) Field of Classification Search
CPC .... G01S 7/4817; G01S 7/4815; G01S 17/894; G01B 11/2513; G02B 5/1828; G02B 27/4205; G02B 5/32
(Continued)

(56) References Cited

U.S. PATENT DOCUMENTS

2012/0105855 A1　5/2012　Miyasaka et al.
2013/0148102 A1　6/2013　Oggier
(Continued)

FOREIGN PATENT DOCUMENTS

JP　　2002-122417 A　　4/2002
JP　　2012-098548 A　　5/2012
WO　WO2021/075340 A1　4/2021

OTHER PUBLICATIONS

International Search Report issued in International Patent Application No. PCT/JP2021/047961 on Feb. 8, 2022 and English translation of same. 5 pages.
(Continued)

*Primary Examiner* — Susan E. Hodges
(74) *Attorney, Agent, or Firm* — K&L Gates LLP

(57) ABSTRACT

To improve resolution while suppressing the number of light emitting elements arranged in an optical module.

The optical module is provided with an optical element that converts a light beam emitted from the light emitting element into a substantially parallel light beam or a light beam having a predetermined angular width, and a diffraction element that diffracts the light beam to separate into a plurality of light beams. The diffraction element generates diffracted lights in n direction, and an angle $\theta x$ formed between one diffraction direction and a side in a direction in which the light emitting element is arranged satisfies $\tan^{-1}(b/3a)$. A diffraction angle $\varphi x$ of the diffracted light satisfies $m \cdot \mathrm{sqrt}((3\varphi a)^2 + \varphi b^2)/(2(2n+1))$. Note that, $\varphi a$ and $\varphi b$ are angular differences of two light beams caused by inter-light
(Continued)

emission distances a and b. Furthermore, n is a natural number, and m is a natural number excluding an integral multiple of $2n+1$.

6 Claims, 60 Drawing Sheets

(58) Field of Classification Search
USPC ........................................................... 356/4
See application file for complete search history.

(56) References Cited

U.S. PATENT DOCUMENTS

| | | |
|---|---|---|
| 2014/0376092 A1 | 12/2014 | Mor |
| 2016/0025993 A1 | 1/2016 | Mor et al. |
| 2021/0325686 A1* | 10/2021 | Kimura ................ G02B 5/1866 |

OTHER PUBLICATIONS

Written Opinion issued in International Patent Application No. PCT/JP2021/047961 on Feb. 8, 2022. 4 pages.

* cited by examiner a b

OPTICAL MODULE AND DISTANCE MEASURING DEVICE

TECHNICAL FIELD

The present technology relates to an optical module. Specifically, this relates to an optical module that irradiates a target with a light beam, and a distance measuring device using the optical module.

BACKGROUND ART

An optical module that irradiates a target with a light beam is used for measuring a distance by time of flight (ToF) of light, shape recognition of an object and the like. When spot-shaped light is emitted by such optical module, resolution thereof depends on the number of spots. In contrast, a technology of multipath correction for correcting an influence of reflected light from an object other than the target is known. For example, a camera system that performs multipath correction by switching between uniform irradiation and spot irradiation is suggested (refer to, for example, Patent Document 1).

CITATION LIST

Patent Document

Patent Document 1: US Patent Application Publication No. 2013/0148102 Specification

SUMMARY OF THE INVENTION

Problems to be Solved by the Invention

As described above, when the number of light emitting elements is increased in order to improve the resolution, a contribution ratio of a laser oscillation threshold current increases, and electro-optical conversion efficiency decreases. Furthermore, there is a limit to arrange the light emitting elements with narrow intervals, and an area as the light emission unit increases. Furthermore, when the number of spots increases, it becomes difficult to perform the above-described multipath correction.

The present technology has been achieved in view of such a situation, and an object thereof is to improve the resolution while suppressing the number of light emitting elements arranged in the optical module.

Solutions to Problems

The present technology is achieved for solving the above-described problem, and a first aspect thereof is an optical module and a distance measuring device including a light emission unit including light emitting elements arrayed two-dimensionally, and a diffraction element that diffracts a light beam emitted from each of the light emitting elements and separates the light beam into a plurality of light beams, in which the light emission unit has a structure of a plurality of arrays based on a structure in which the light emitting elements are arranged at vertexes of a quadrangle of which sides facing each other are parallel to each other and at a point at which diagonal lines of the quadrangle intersect, in which a distance between the light emitting elements on a side in a first direction is set to a and a distance between the light emitting elements on a side in a second direction orthogonal to the side in the first direction is set to b, the diffraction element generates diffracted lights in n directions (n is a natural number), in which an angle $\theta x$ formed between one diffraction direction and the side in the first direction satisfies $$\theta x = \tan^{-1}(b/3a), \text{ and}$$

a diffraction angle $\varphi x$ of diffracted light satisfies $$\varphi x = m \cdot \mathrm{sqrt}((3\varphi a)\hat{}2 + \varphi b\hat{}2)/(2(2n+1)))$$

when angle differences of two light beams generated by inter-light emission distances a and b are set to $\varphi a$ and $\varphi b$, respectively, and m is set to a natural number excluding an integral multiple of $2n+1$. This brings about an effect that the diffraction element generates the diffracted lights in the n directions.

Furthermore, the first aspect may further include an optical element that converts the light beam emitted from the light emitting element into a substantially parallel light beam or a light beam having a predetermined angular width. This brings about an effect of supplying an appropriate light beam to the diffraction element even if the light beam emitted from the light emitting element is not the substantially parallel light beam or the light beam having a predetermined angle width.

Furthermore, the first aspect may further include a light detection unit that detects reflected light from a target with respect to the light beam. This brings about an effect of detecting the reflected light from the target with respect to the emitted light beam.

Furthermore, in the first aspect, the light emission unit may include a switching unit that switches the light emitting elements to emit light between at least two sets. This brings about an effect of switching the irradiation pattern.

Furthermore, in the first aspect, each of the light emitting elements may include at least two active layers in a longitudinal direction. This brings about an effect of improving intensity of light emitted from each of the light emitting elements.

MODE FOR CARRYING OUT THE INVENTION

Modes for carrying out the present technology (hereinafter referred to as embodiments) will be described below. The description will be given in the following order.

1. First Embodiment (Example of Dividing Light into Three by Diffraction Element)

2. Second Embodiment (Example of Dividing Light into Five by Diffraction Element)

3. Third Embodiment (Example of Dividing Light into Seven by Diffraction Element)

4. Fourth Embodiment (Example of Dividing Light into Nine by Diffraction Element)

5. Fifth Embodiment (Variation)

6. Sixth Embodiment (Application Example)

1. First Embodiment

[Configuration of Ranging Device]

Figure 1:
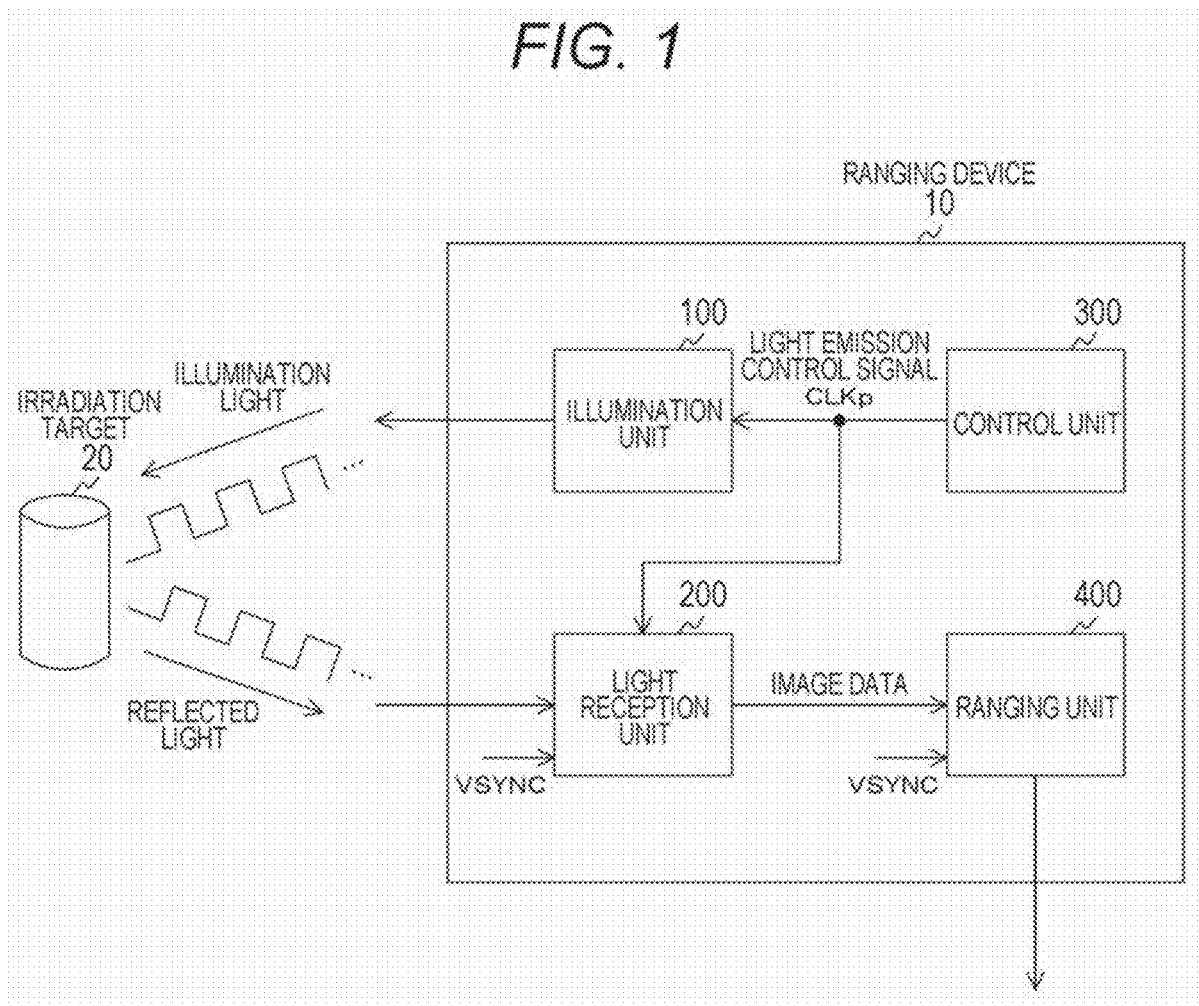
FIG. 1 is a block diagram illustrating an example of an overall configuration of a ranging device 10 in an embodiment of the present technology.

FIG. 1 is a block diagram illustrating an example of an overall configuration of a ranging device 10 in an embodiment of the present technology.

The ranging device 10 is a device that measures a distance to an irradiation target 20 by irradiating the irradiation target 20 with illumination light and receiving reflected light thereof. The ranging device 10 is provided with an illumination unit 100, a light reception unit 200, a control unit 300, and a ranging unit 400.

The illumination unit 100 generates irradiation light in synchronization with a light emission control signal CLKp of a rectangular wave from the control unit 300. It is sufficient that the light emission control signal CLKp is a periodic signal, and this is not limited to the rectangular wave. For example, the light emission control signal CLKp may be a sine wave.

The light reception unit 200 receives the reflected light reflected by the irradiation target 20 and detects, each time a period of a vertical synchronization signal VSYNC elapses, an amount of received light within the period. In the light reception unit 200, a plurality of pixel circuits is arranged in a two-dimensional lattice manner. The light reception unit 200 supplies image data (frame) corresponding to the amount of received light of these pixel circuits to the ranging unit 400. Note that, the light reception unit 200 is an example of a light detection unit recited in claims.

The control unit 300 controls the illumination unit 100 and the light reception unit 200. The control unit 300 generates the light emission control signal CLKp and supplies the same to the illumination unit 100 and the light reception unit 200.

The ranging unit 400 measures the distance to the irradiation target 20 by a ToF method on the basis of the image data. The ranging unit 400 measures the distance for each pixel circuit and generates a depth map indicating a distance to an object as a gradation value for each pixel. This depth map is used for, for example, image processing of performing blurring processing of a degree according to a distance, autofocus (AF) processing of obtaining a focal point of a focus lens according to a distance and the like.

[Configuration of Illumination Unit]

Figure 2:
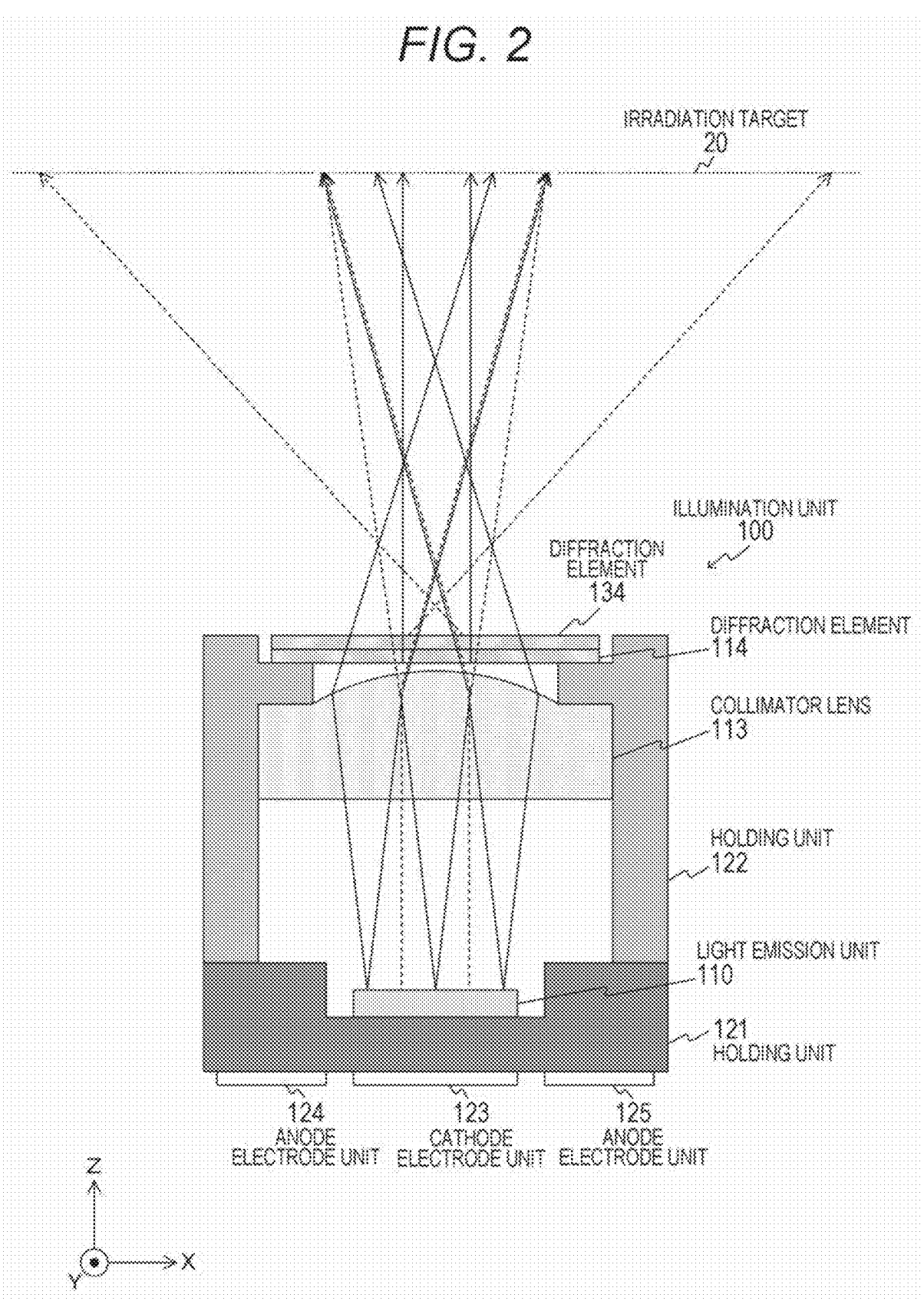
FIG. 2 is a cross-sectional view illustrating an example of a configuration of an illumination unit 100 in the embodiment of the present technology.

FIG. 2 is a cross-sectional view illustrating an example of a configuration of the illumination unit 100 in the embodiment of the present technology.

The illumination unit 100 is provided with a light emission unit 110, a collimator lens 113, and diffraction elements 114 and 134. The collimator lens 113 and the diffraction elements 114 and 134 are arranged in this order on an optical path of light emitted from the light emission unit 110. Note that, the order of arrangement is not limited to this.

The collimator lens 113 is an optical element that collimates a light beam emitted from the light emission unit 110 into a substantially parallel light beam or a light beam having a predetermined angular width. The collimator lens 113 is not limited to a general optical lens as long as this is an element having a collimating function. For example, it is also possible to arrange a Fresnel lens or a meta lens. Furthermore, in a case where light emitted from the light emission unit 110 is substantially parallel light and emitted each in a desired direction, an optical component for collimating may be omitted. Note that, the collimator lens 113 is an example of an optical element recited in claims.

The diffraction elements 114 and 134 are elements that diffract the light beam to separate into a plurality of light beams. The diffraction element 114 performs tiling in 3×3 as described later. The diffraction element 134 generates diffracted light of a predetermined order as described later. Note that, in this example, it is assumed that the diffraction elements 114 and 134 are integrated as front and back sides, but they may also be separate components. Note that, the diffraction element 114 may be omitted. Furthermore, functions of the diffraction elements 113 and 134 may be formed on the same plane. A direction of a diffraction grating may be reversed by 180 degrees. That is, a diffraction direction described in this embodiment may be reversed by 180 degrees.

The light emission unit 110 is held by a holding unit 121, and the collimator lens 113, the diffraction element 114, and the diffraction element 134 are held by a holding unit 122. The holding unit 121 is provided with, for example, one cathode electrode unit 123 and two anode electrode units 124 and 125 on a surface opposite to a surface on which the light emission unit 110 is held.

The light emission unit 110 is, for example, a surface emitting semiconductor laser including a plurality of light emitting elements. The plurality of light emitting elements is arranged in an array on a substrate. In this example, optical paths of light emitted from three light emitting elements are schematically illustrated as representatives, but actually, as illustrated in FIG. 3, light from a large number of light emitting elements is emitted toward the irradiation target 20.

[Configuration of Light Emission Unit]

Figure 3:
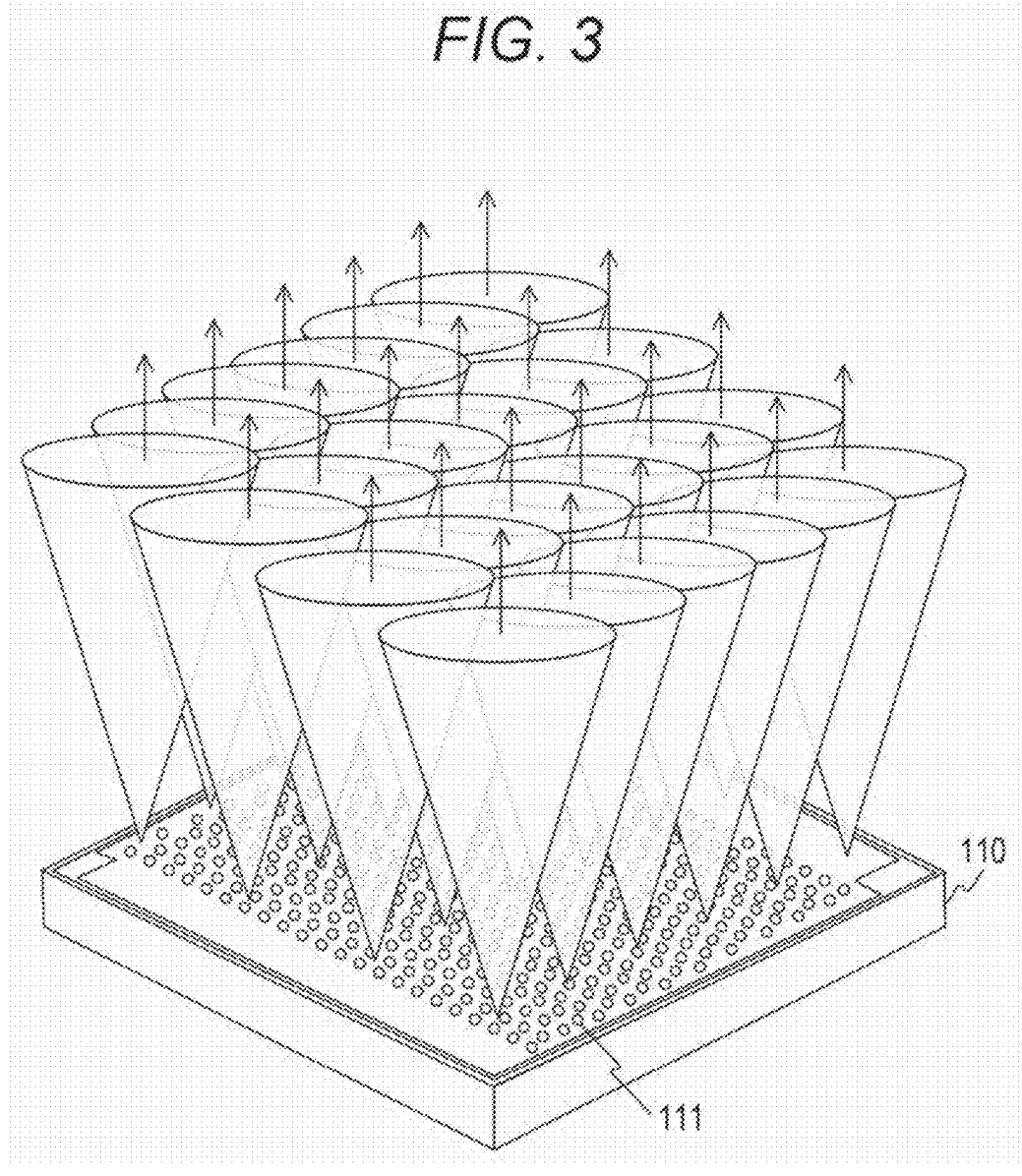
FIG. 3 is a diagram illustrating an example of light emitted from a light emission unit 110 in the embodiment of the present technology.

FIG. 3 is a diagram illustrating an example of light emitted from the light emission unit 110 in the embodiment of the present technology.

The light emission unit 110 has a size of, for example, about 1 cm square. In the light emission unit 110, for example, about 300 to 600 light emitting elements 111 are arranged. The light emission unit 110 has, for example, a light output of 1 to 5 W. A wavelength is assumed to be, for example, 940 nm, but may also be 850 nm or 1.5 μm as another example.

Figure 4:
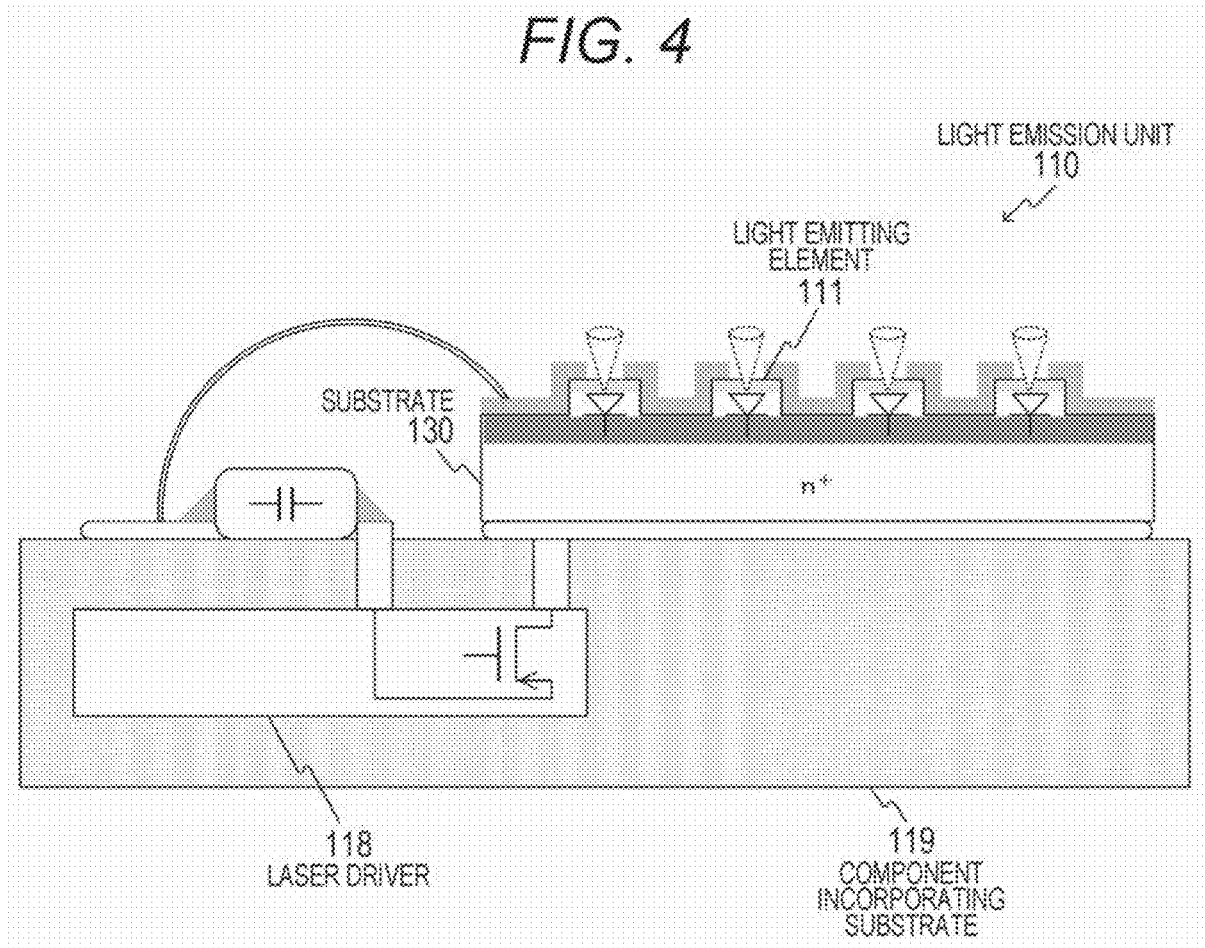
FIG. 4 is a cross-sectional view illustrating an example of a configuration of the light emission unit 110 in the embodiment of the present technology.

FIG. 4 is a cross-sectional view illustrating an example of a configuration of the light emission unit 110 in the embodiment of the present technology.

The light emission unit 110 is, for example, a vertical cavity surface emitting laser (VCSEL) of a front surface emitting type including a plurality of light emitting elements 111. The plurality of light emitting elements 111 is formed on an n-type substrate 130. The substrate 130 is mounted on a component incorporating substrate 119. The component incorporating substrate 119 may incorporate a laser driver 118 for driving the light emission unit 110. Note that, the substrate 130 is not limited to the n-type, and may be a p-type or a high-resistance substrate.

Note that, although an example of the front surface emitting type VCSEL is herein illustrated, a back surface emitting type VCSEL may also be used. Furthermore, the application is not limited to the VCSEL, and it is also possible to apply to a configuration in which a plurality of end face emitting lasers is arranged.

[Structure of Light Emitting Element]

Figure 5:
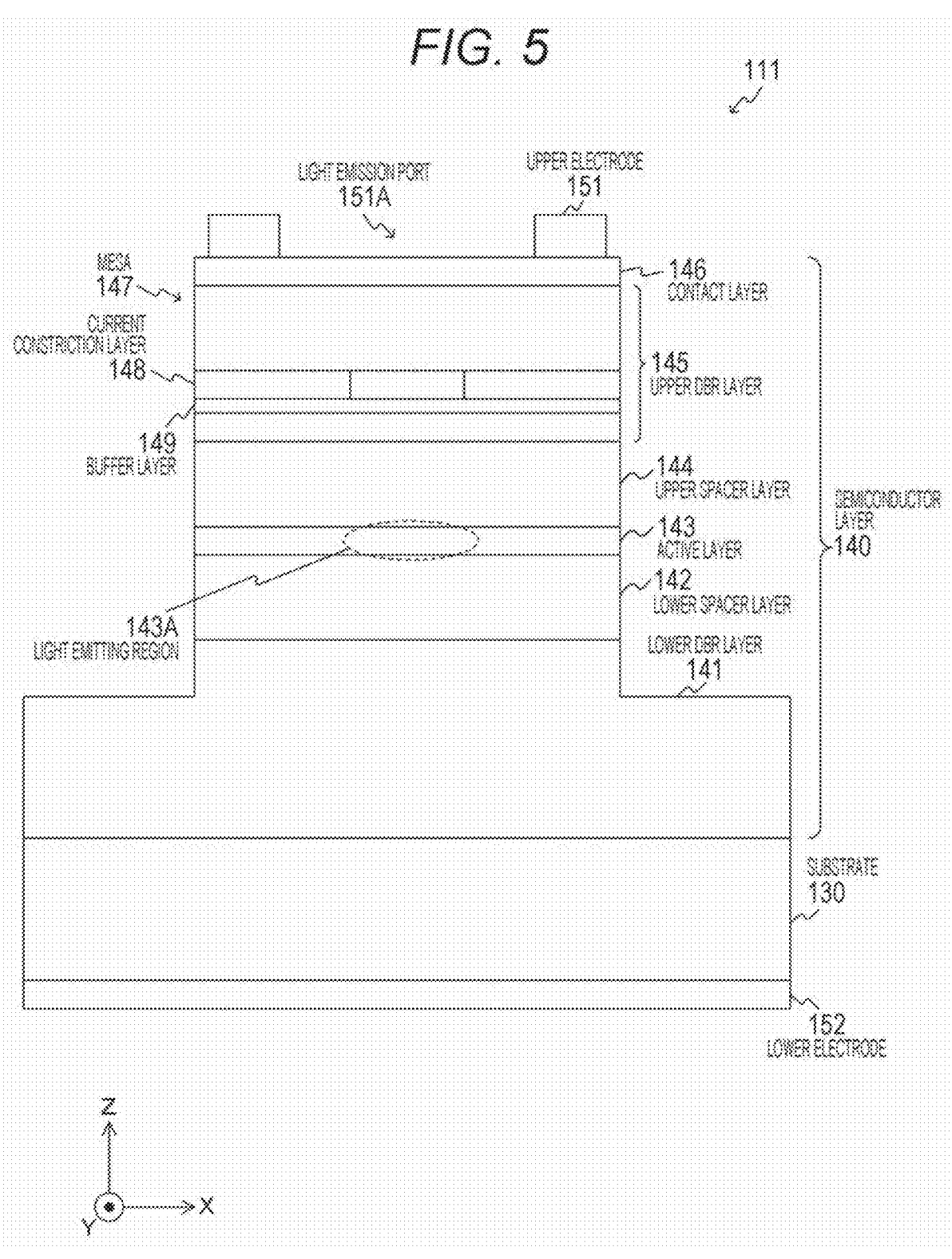
FIG. 5 is a cross-sectional view illustrating a first structural example of a light emitting element 111 in the embodiment of the present technology.

FIG. 5 is a cross-sectional view illustrating a first structural example of the light emitting element 111 in the embodiment of the present technology.

The plurality of light emitting elements 111 is arranged in an array on the substrate 130. Each of the light emitting elements 111 includes a semiconductor layer 140 including a lower distributed Bragg reflector (DBR) layer 141, a lower spacer layer 142, an active layer 143, an upper spacer layer 144, an upper DBR layer 145, and a contact layer 146 in this order on a front surface side of the substrate 130. An upper portion of the semiconductor layer 140, specifically, a part of the lower DBR layer 141, the lower spacer layer 142, the active layer 143, the upper spacer layer 144, the upper DBR layer 145, and the contact layer 146 form a columnar mesa 147. In the mesa 147, the center of the active layer 143 forms a light emitting region 143A.

Furthermore, the upper DBR layer 145 is provided with a current constriction layer 148 and a buffer layer 149. The substrate 130 is, for example, an n-type GaAs substrate. Examples of an n-type impurity include silicon (Si), selenium (Se) or the like, for example. The semiconductor layer 140 includes each, for example, an AlGaAs-based compound semiconductor. Here, the AlGaAs-based compound semiconductor is a compound semiconductor containing at least aluminum (Al) and gallium (Ga) among the group 3B elements in the short-period periodic table and at least arsenic (As) among the group 5B elements in the short-period periodic table. Note that, other materials may also be used depending on the wavelength.

On an upper surface of the contact layer 146, which is an upper surface of the mesa 147, an annular upper electrode 151 including a light emission port 151A is formed. Furthermore, an insulating layer is formed on a side surface and a peripheral surface of the mesa 147. The upper electrode 151 is connected to an electrode unit provided on a front surface of the holding unit 121 by wire bonding via an electrode pad, and is electrically connected to the anode electrode units 124 and 125 provided on a back surface of the holding unit 121.

A lower electrode 152 is provided on a back surface of the substrate 130. The lower electrode 152 is electrically connected to the cathode electrode unit 123 provided on the back surface of the holding unit 121.

Note that, although an example in which the cathode electrode is made a common electrode and the anode electrode is separately provided is described in this example, it is also possible to make the anode electrode the common electrode and separately provide the cathode electrode depending on the structure of the light emitting element 111.

Figure 6:
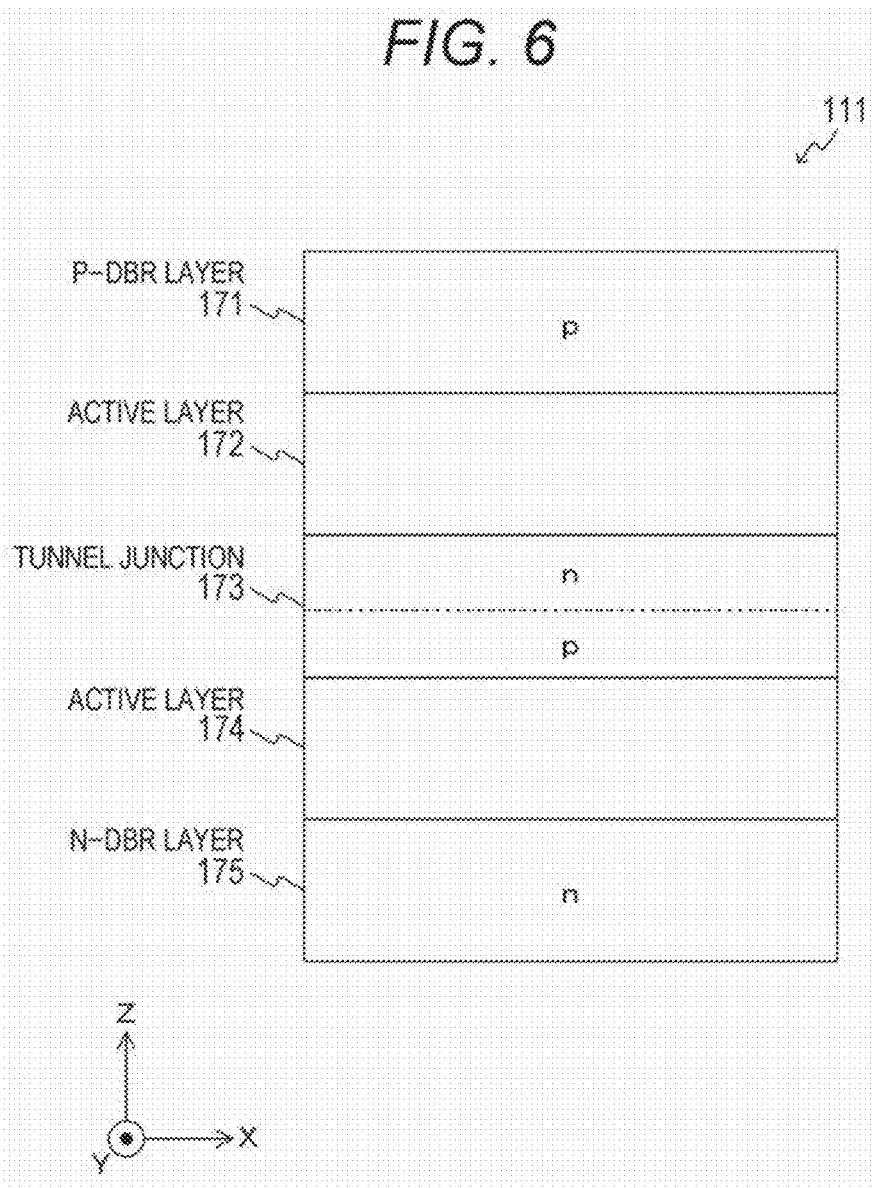
FIG. 6 is a cross-sectional view illustrating a second structural example of the light emitting element 111 in the embodiment of the present technology.

FIG. 6 is a cross-sectional view illustrating a second structural example of the light emitting element 111 in the embodiment of the present technology.

The light emitting element 111 of the second configuration example is a multi-junction type VCSEL, and has a structure in which a P-DBR layer 171, an active layer 172, a tunnel junction 173, an active layer 174, and an N-DBR layer 175 are stacked in this order from an emission side. That is, two pn junctions are connected, and active layers (active regions) 172 and 174 that emit a laser oscillation wavelength are stacked in a vertical direction therebetween. By providing a plurality of active layers 172 and 174 in this manner, a light output by each of the light emitting elements 111 may be improved (refer to Zhu Wenjun, et. al: "Analysis of the Operating Point of a Novel Multiple-Active Region Tunneling-Regenerated Vertical-Cavity Surface-Emitting Laser", Proc. of International Conference on Solid-State and Integrated Circuit Technology, Vol. 6, pp. 1306-1309, 2001). According to this multi-junction type VCSEL, it is possible to reduce a size and a cost of the element. Note that, although omitted in the second structural example, similarly to the first structural example, a spacer layer, a buffer layer, a current constriction layer, a mesa, a light emission port, an upper electrode layer, and a lower electrode layer in the vicinity of the active layer may be provided.

In the embodiment of the present technology, since spot light is divided by the diffraction element 134, it is possible to increase the number of spots while maintaining or enhancing light intensity of the spot light by combining with the multi-junction type VCSEL. Then, therefore, both ranging accuracy and ranging resolution may be satisfied.

[Tiling]

Figure 7:
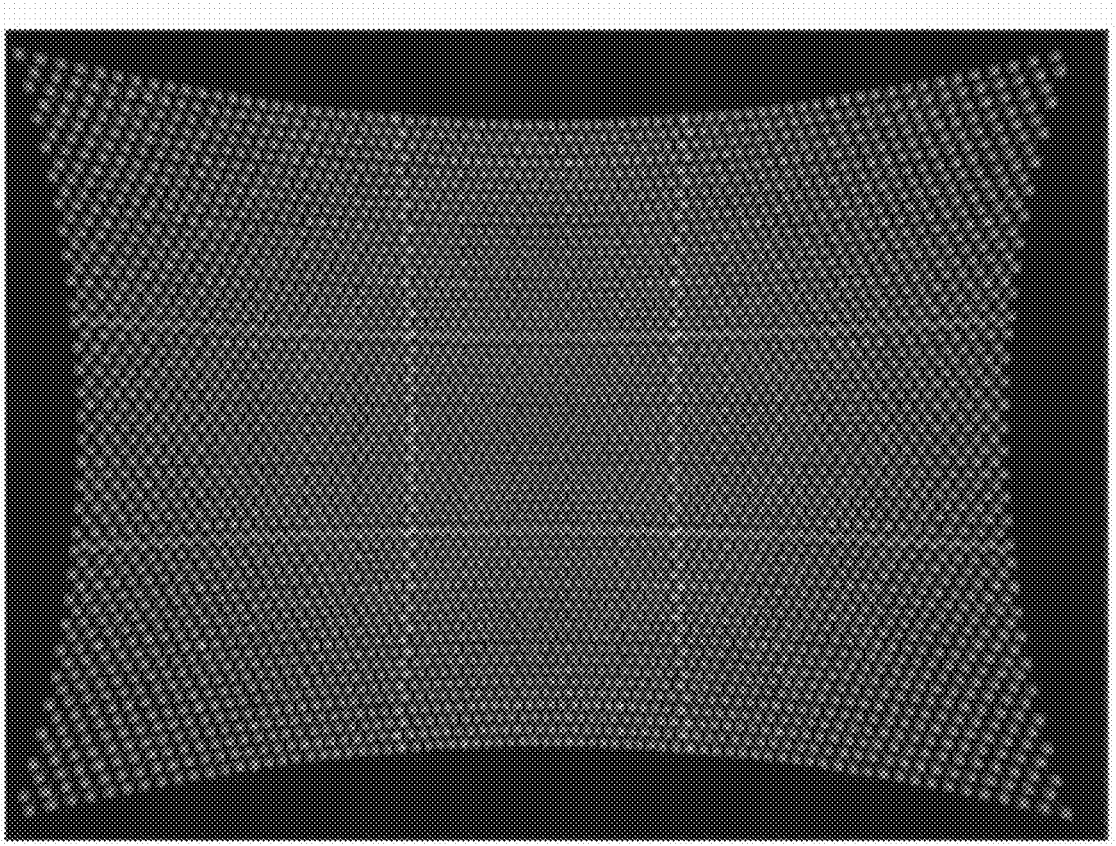
FIG. 7 is a diagram illustrating an example of an irradiation pattern of a diffraction element 114 in the embodiment of the present technology.

FIG. 7 is a diagram illustrating an example of an irradiation pattern of the diffraction element 114 in the embodiment of the present technology.

The diffraction element 114 separates each of the light beams emitted from the light emission unit 110 and then collimated by the collimator lens 113 into a plurality of light beams. In this example, for each of the light beams in a central quadrangle, replicas are generated in vertical, horizontal, and oblique eight directions, and tiling in 3×3 is performed.

In contrast, the diffraction element 134 generates diffracted light of a predetermined order as described later for each of the light beams tiled by the diffraction element 114 in this manner.

[Structure of Diffraction Element]

Figure 8:
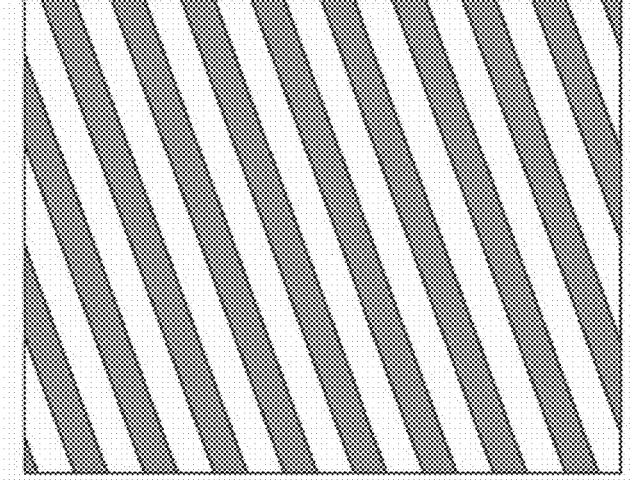
FIG. 8 is a diagram illustrating a structural example of a diffraction element 134 in a first embodiment of the present technology.

FIG. 8 is a diagram illustrating a structural example of the diffraction element 134 in the first embodiment of the present technology.

In the first embodiment, it is assumed that the light is divided into three by the diffraction element 134. Therefore, the diffraction element 134 uses a diffraction grating obtained by providing fine parallel slits on a plane of glass and the like. Therefore, the diffraction element 134 generates diffracted light in one direction for the irradiation pattern of the diffraction element 114 described above.

[Arrangement of Light Emitting Element]

Figure 9:
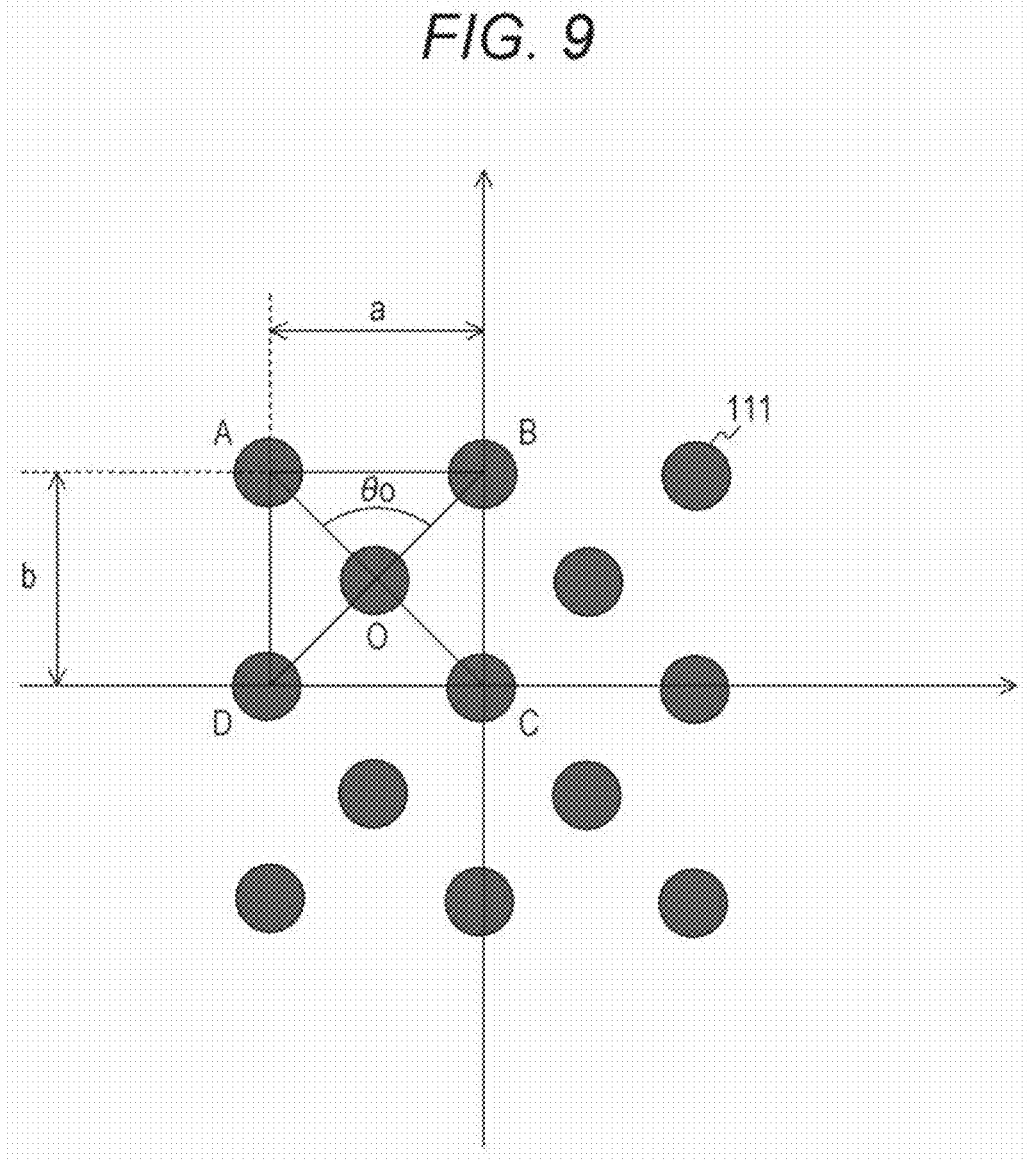
FIG. 9 is a diagram illustrating an arrangement example of the light emitting elements 111 in the light emission unit 110 in the embodiment of the present technology.

FIG. 9 is a diagram illustrating an arrangement example of the light emitting elements 111 in the light emission unit 110 in the embodiment of the present technology.

As described above, the plurality of light emitting elements 111 is arranged in the light emission unit 110. The light emission unit 110 has a structure of a plurality of arrays based on a structure in which the light emitting elements 111 are arranged at vertexes A, B, C, and D of a quadrangle of which sides facing each other are parallel to each other and at a point O at which diagonal lines thereof intersect. It is assumed that a distance between the light emitting elements 111 on a side AB (DC) in one direction is set to a, a distance between the light emitting elements 111 on a side AD (BC) orthogonal thereto is set to b, and an angle AOB formed by two diagonal lines is set to θo.

[Diffracted Light]

Figure 10:
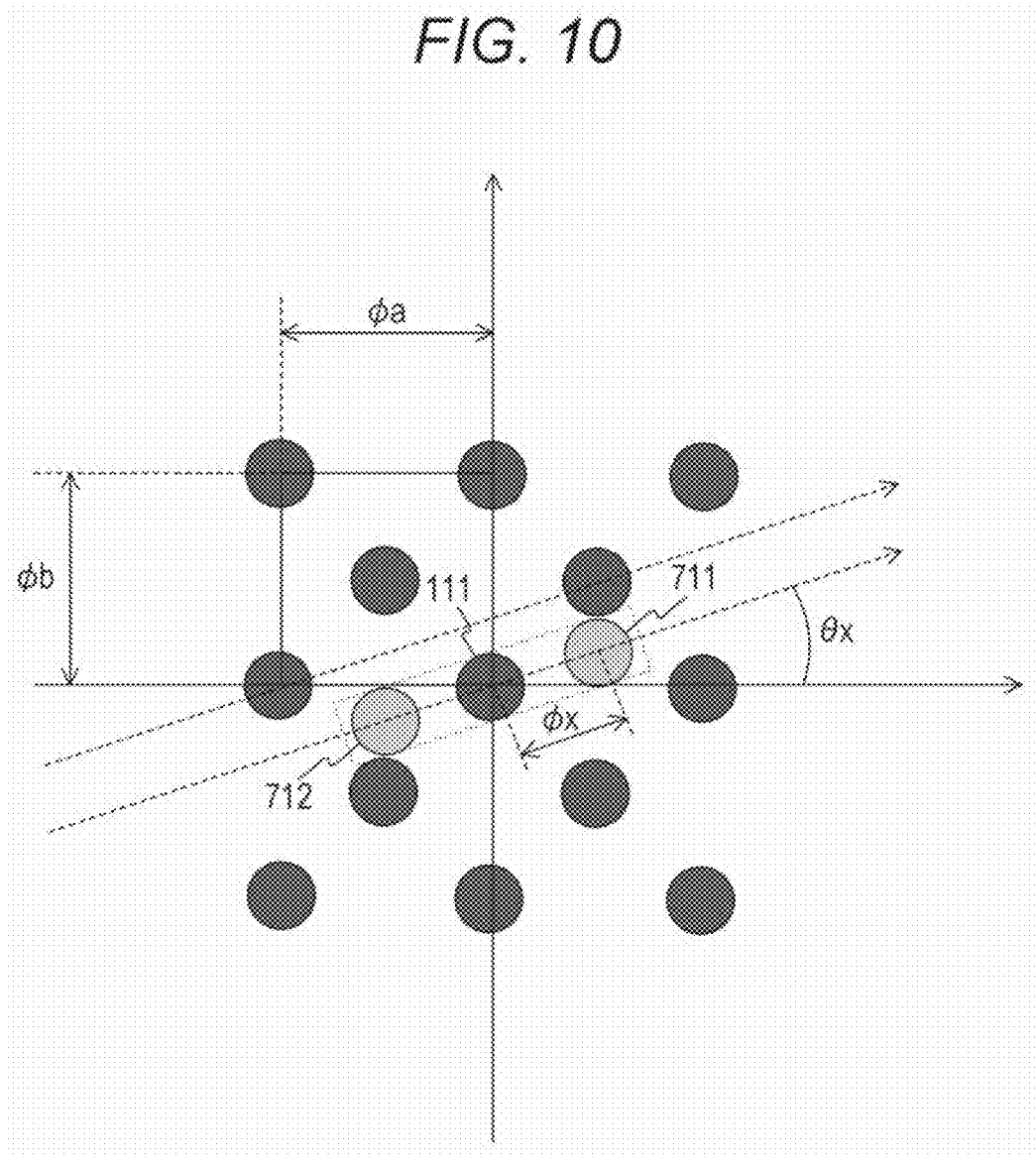
FIG. 10 is a diagram illustrating an example of diffracted light by one light emitting element 111 in the first embodiment of the present technology.
Figure 11:
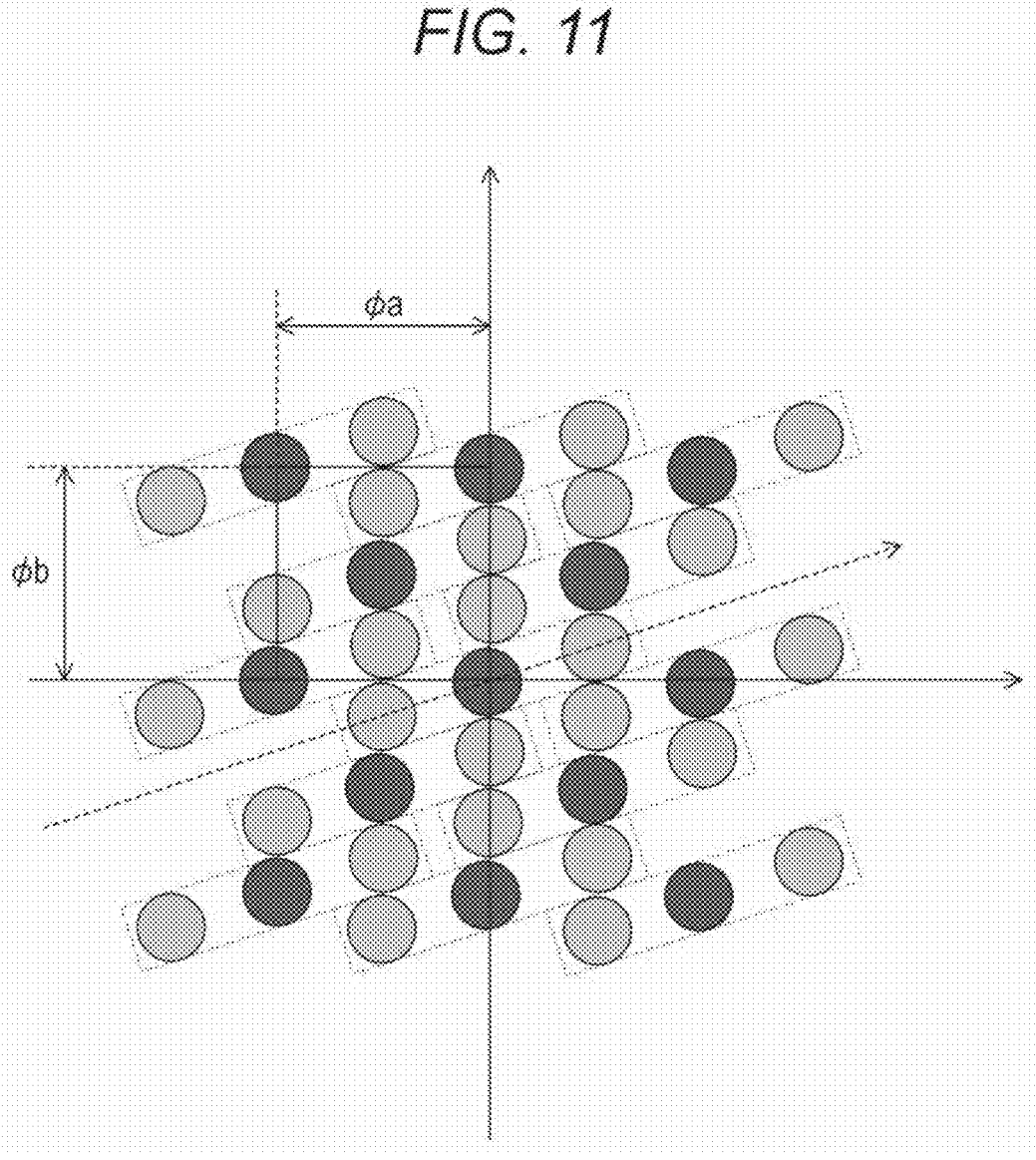
FIG. 11 is a diagram illustrating an example of the diffracted lights by a plurality of light emitting elements 111 in the first embodiment of the present technology.

FIG. 10 is a diagram illustrating an example of the diffracted light by one light emitting element 111 in the first embodiment of the present technology. FIG. 11 is a diagram illustrating an example of the diffracted lights by a plurality of light emitting elements 111 in the first embodiment of the present technology.

In the first embodiment, it is assumed that n=1, that is, the diffracted light in one direction is generated. The diffraction element 134 generates positive first order diffracted light 711 and negative first order diffracted light 712 for the light emitted from one light emitting element 111 at the point C described above. Therefore, a total of two diffracted lights are generated for one light emitting element 111.

An angle θx formed between one diffraction direction and the side AB (CD) in one direction satisfies:

$$\theta x = \tan^{-1}(b/3a).$$

When angle differences of the two light beams generated by inter-light emission distances a and b after being collimated by the collimator lens 113 are set to (φa and φb, respectively, a diffraction angle φx of the diffracted light satisfies:

$$\varphi x = m \cdot \mathrm{sqrt}((3\varphi a)^2 + \varphi b^2)/(2(2n+1))).$$

Note that, a diffraction unit m is one unit that defines the diffraction angle, and is a natural number excluding an integral multiple of 2n+1. This diffraction unit m desirably is:

$$m < 2n+1.$$

Figure 12:
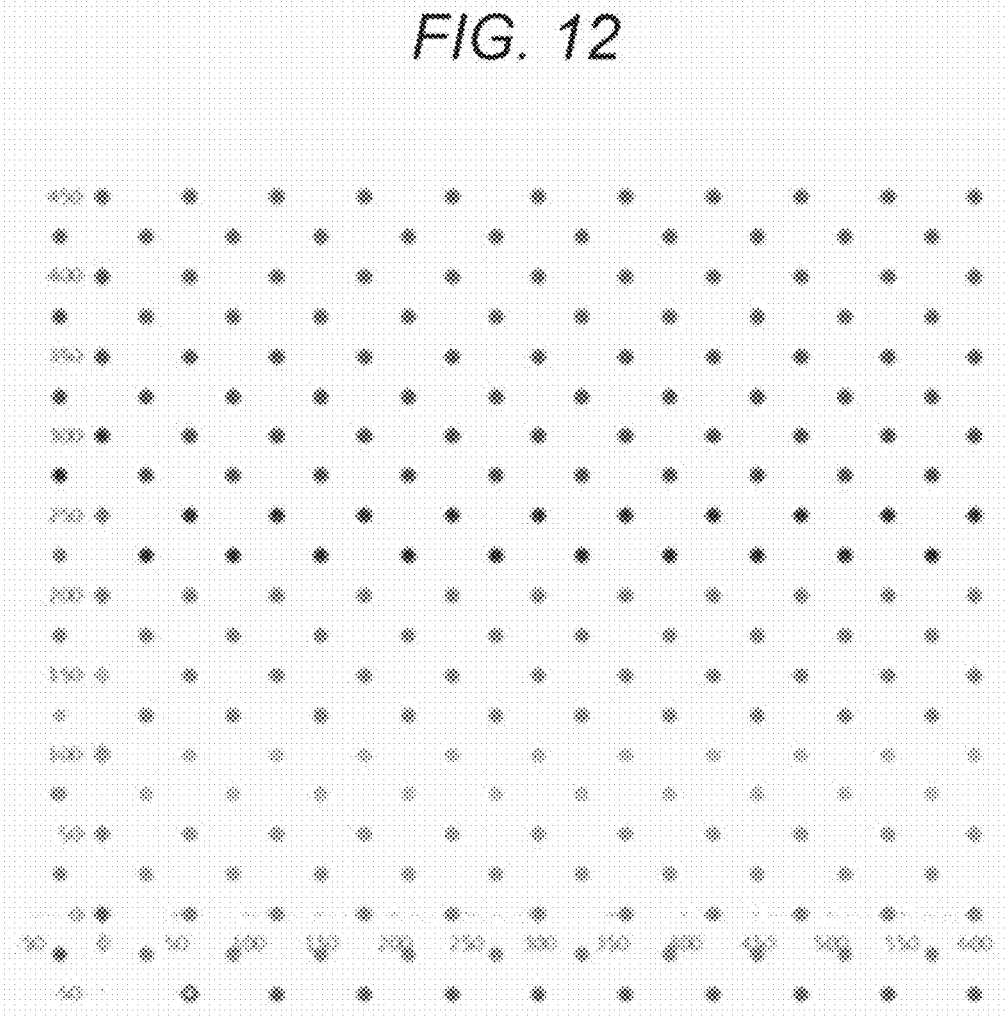
FIG. 12 is a diagram illustrating a specific example of a light irradiation spot pattern (a case where the diffraction element 134 is not provided) in the first embodiment of the present technology.
Figure 13:
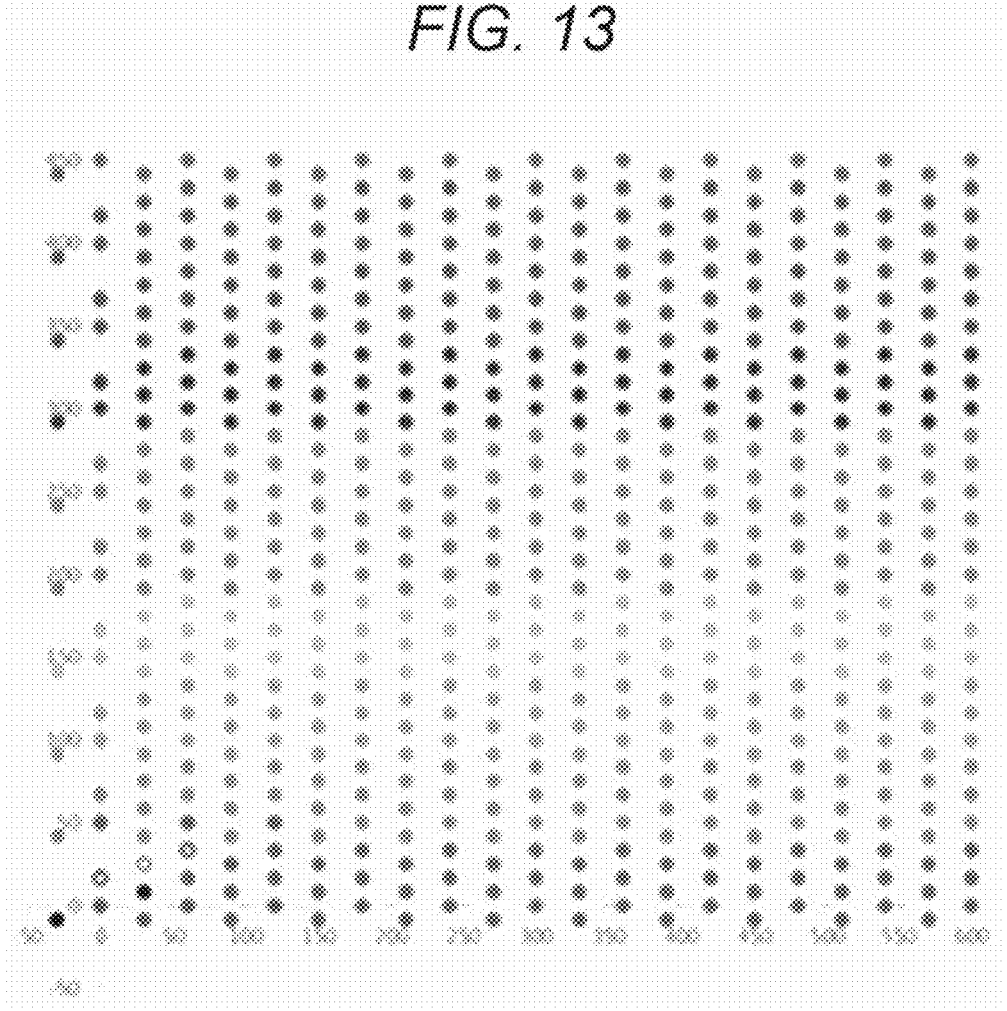
FIG. 13 is a diagram illustrating a specific example of a light irradiation spot pattern (m=1) in the first embodiment of the present technology.
Figure 14:
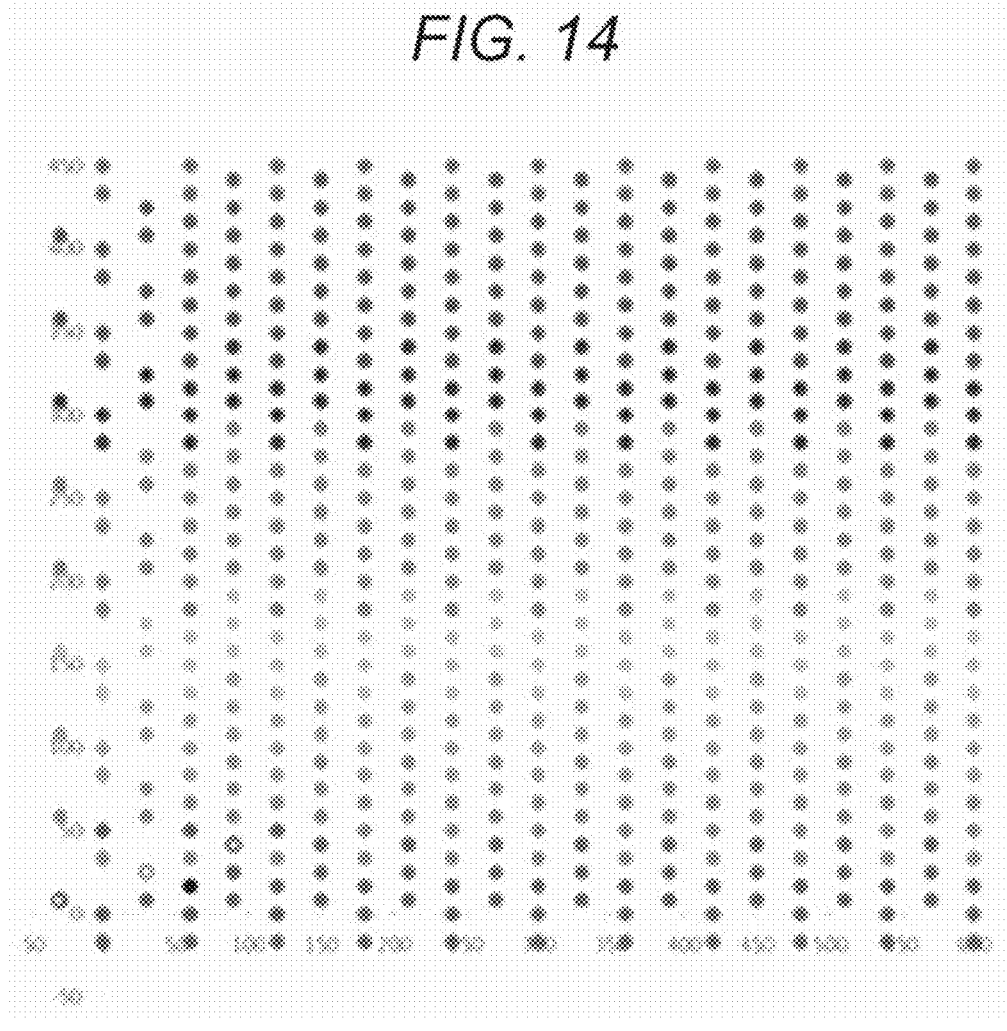
FIG. 14 is a diagram illustrating a specific example of a light irradiation spot pattern (m=2) in the first embodiment of the present technology.

FIGS. 12 to 14 are diagrams illustrating specific examples of a light irradiation spot pattern in the first embodiment of the present technology. Here, the light emitting elements 111 are arrayed in 11×21. FIG. 12 illustrates an example in which the diffraction element 134 is not provided. FIG. 13 illustrates an example of a case where the diffraction element 134 is provided and the diffraction unit m is set to 1. FIG. 14 illustrates an example of a case where the diffraction element 134 is provided and the diffraction unit m is set to 2.

In this manner, since two diffracted lights are generated for one light emitting element 111, the number of spots increases threefold by zeroth order light by the light emitting element 111 itself and the positive first order diffracted light and the negative first order diffracted light generated by the diffraction element 134. Furthermore, the distances between the spots are kept regular. Therefore, the ranging resolution may be improved.

Furthermore, as a value of the diffraction unit m increases, the number of spots in a peripheral portion decreases, so that the value of the diffraction unit m is desirably smaller. The diffraction unit m=1 is especially desirable. In contrast, in a case where the diffraction angle is small and it is difficult to control the diffraction angle and efficiency of the diffraction element 134, it is also possible to design the diffraction unit m to be larger.

Note that, in a case where the diffraction element 134 is provided, not a little high order diffracted light is generated. However, in the first embodiment of the present technology, since the high order diffracted light overlaps with the 0th order light or the positive first order diffracted light and the negative first order diffracted light from another light emitting element, this effectively functions as the spot light.

2. Second Embodiment

In this second embodiment, an example of dividing light into five by the diffraction element 134 is described. Note that, the configuration other than the diffraction element 134 is similar to that of the first embodiment described above, so that detailed description thereof will be omitted.

[Structure of Diffraction Element]

Figure 15:
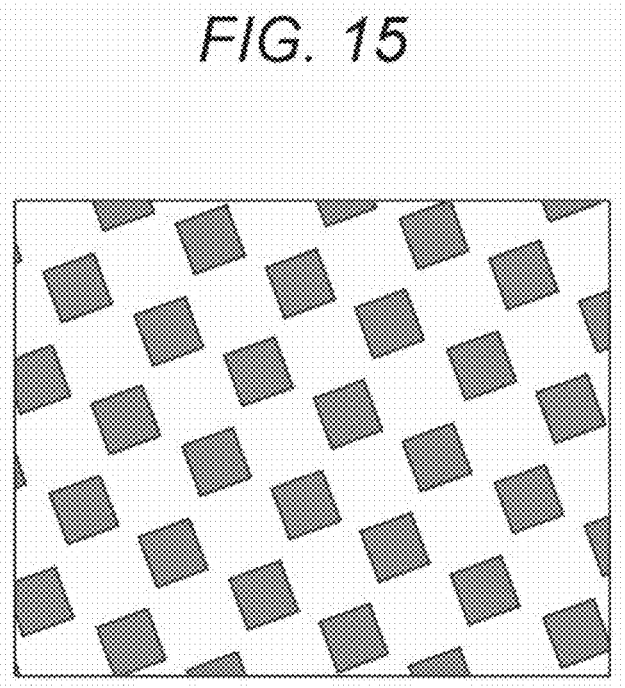
FIG. 15 is a diagram illustrating a structural example of the diffraction element 134 in a second embodiment of the present technology.

FIG. 15 is a diagram illustrating a structural example of the diffraction element 134 in the second embodiment of the present technology.

In the second embodiment, it is assumed that the light is divided into five by the diffraction element 134. Therefore, a diffractive optical element (DOE) obtained by forming a fine grating shape on a plane of glass and the like is used as the diffraction element 134. Therefore, the diffraction element 134 generates diffracted lights in two directions for the irradiation pattern of the diffraction element 114 described above.

[Diffracted Light]

Figure 16:
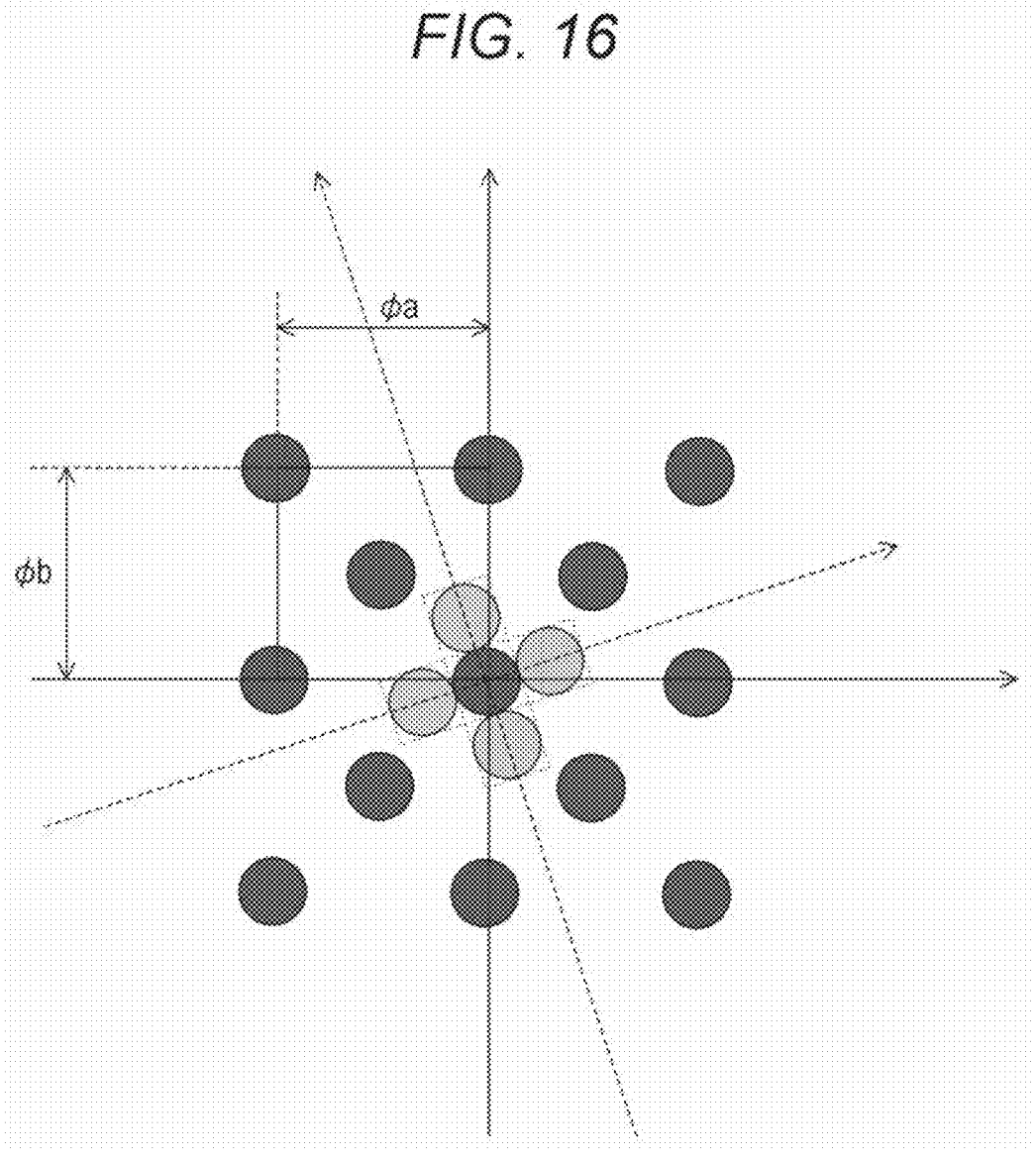
FIG. 16 is a diagram illustrating an example of diffracted light by one light emitting element 111 in the second embodiment of the present technology.
Figure 17:
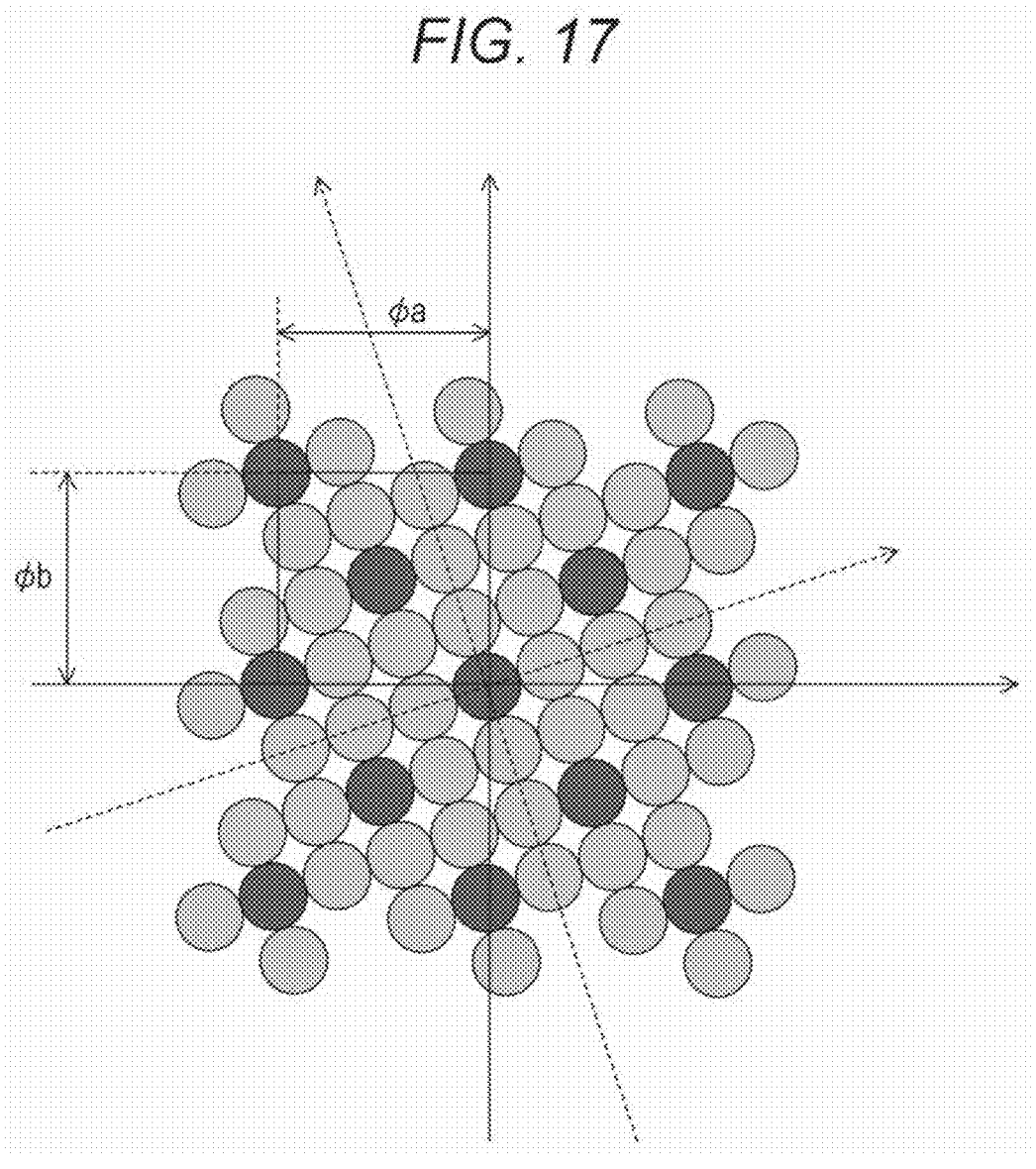
FIG. 17 is a diagram illustrating an example of the diffracted lights by a plurality of light emitting elements 111 in the second embodiment of the present technology.

FIG. 16 is a diagram illustrating an example of the diffracted light by one light emitting element 111 in the second embodiment of the present technology. FIG. 17 is a diagram illustrating an example of the diffracted lights by a plurality of light emitting elements 111 in the second embodiment of the present technology.

In the second embodiment, it is assumed that n=2, that is, the diffracted lights in two directions are generated. The diffraction element 134 generates positive first order diffracted light and negative first order diffracted light in each of the two directions for the light emitted from one light emitting element 111 at the point C described above. Therefore, a total of four diffracted lights are generated for one light emitting element 111.

An angle $\theta x$ formed between one diffraction direction and the side AB (CD) in one direction satisfies:

$$\theta x = \tan^{-1}(b/3a).$$

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$$\varphi x = m \cdot \mathrm{sgrt}((3\varphi a)^2 + \varphi b^2)/(2(2n+1)).$$

An angle $\theta x$ formed between another diffraction direction and the side AB (CD) in one direction satisfies:

$$\theta x = \tan^{-1}(-3b/a).$$

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$$\varphi x = m \cdot \mathrm{sgrt}(\varphi^2 + (3\varphi b)^2)/(2(2n+1)).$$

Note that, as described above, the diffraction unit m is a natural number excluding an integral multiple of 2n+1.

Figure 18:
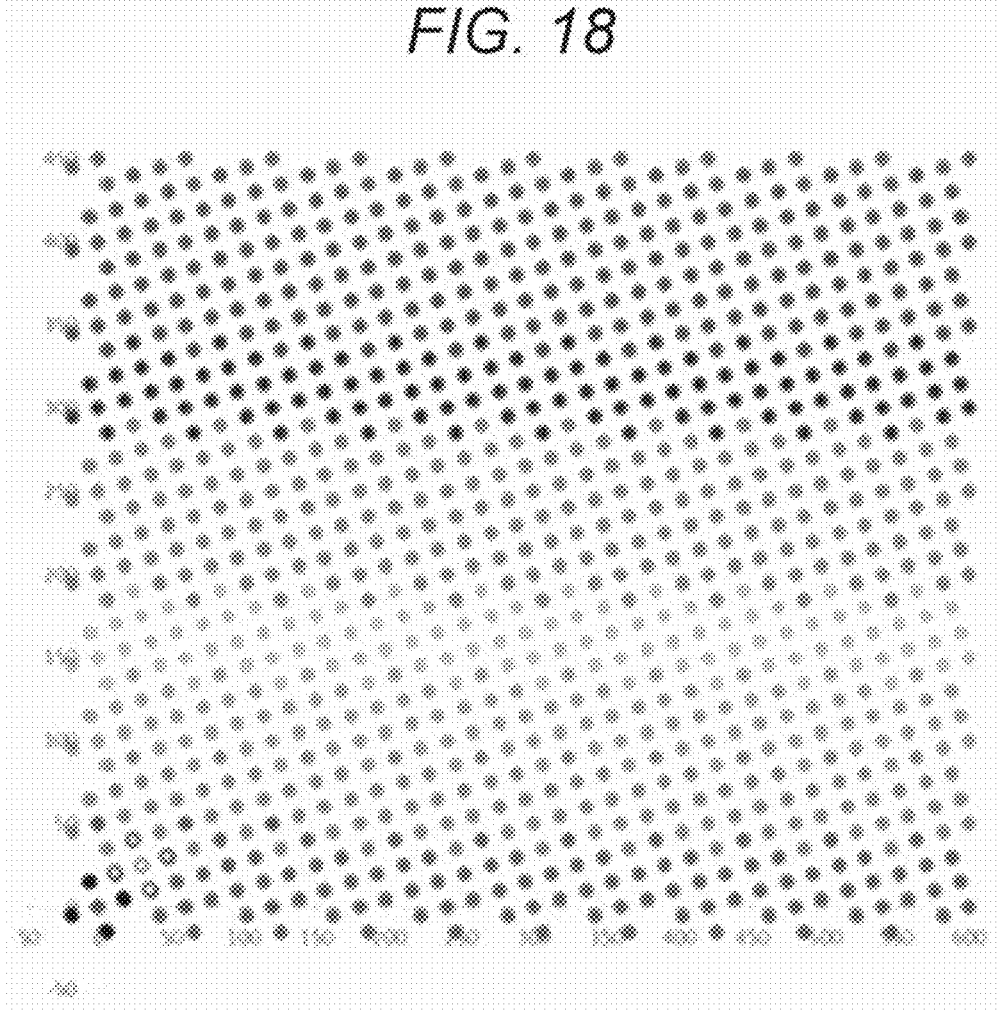
FIG. 18 is a diagram illustrating a specific example of a light irradiation spot pattern (m=1) in the second embodiment of the present technology.
Figure 19:
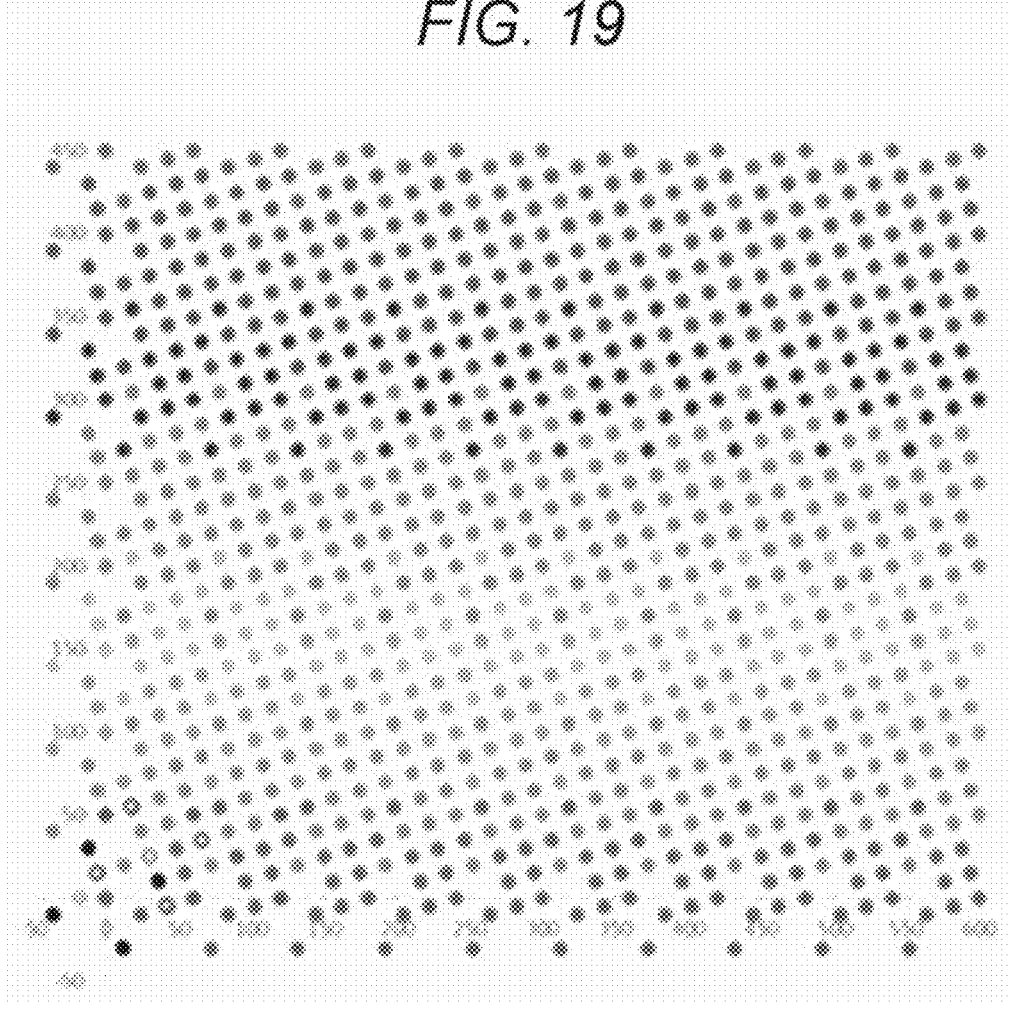
FIG. 19 is a diagram illustrating a specific example of a light irradiation spot pattern (m=2) in the second embodiment of the present technology.
Figure 20:
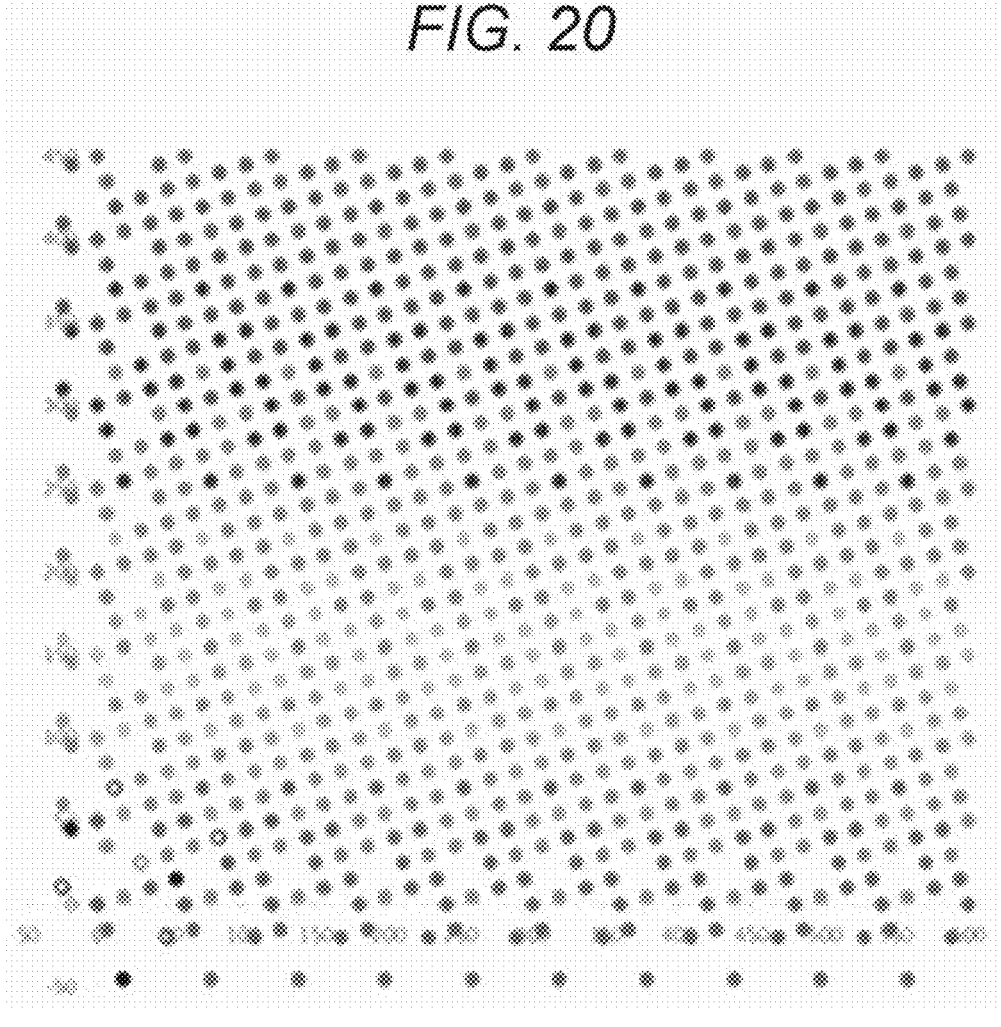
FIG. 20 is a diagram illustrating a specific example of a light irradiation spot pattern (m=3) in the second embodiment of the present technology.
Figure 21:
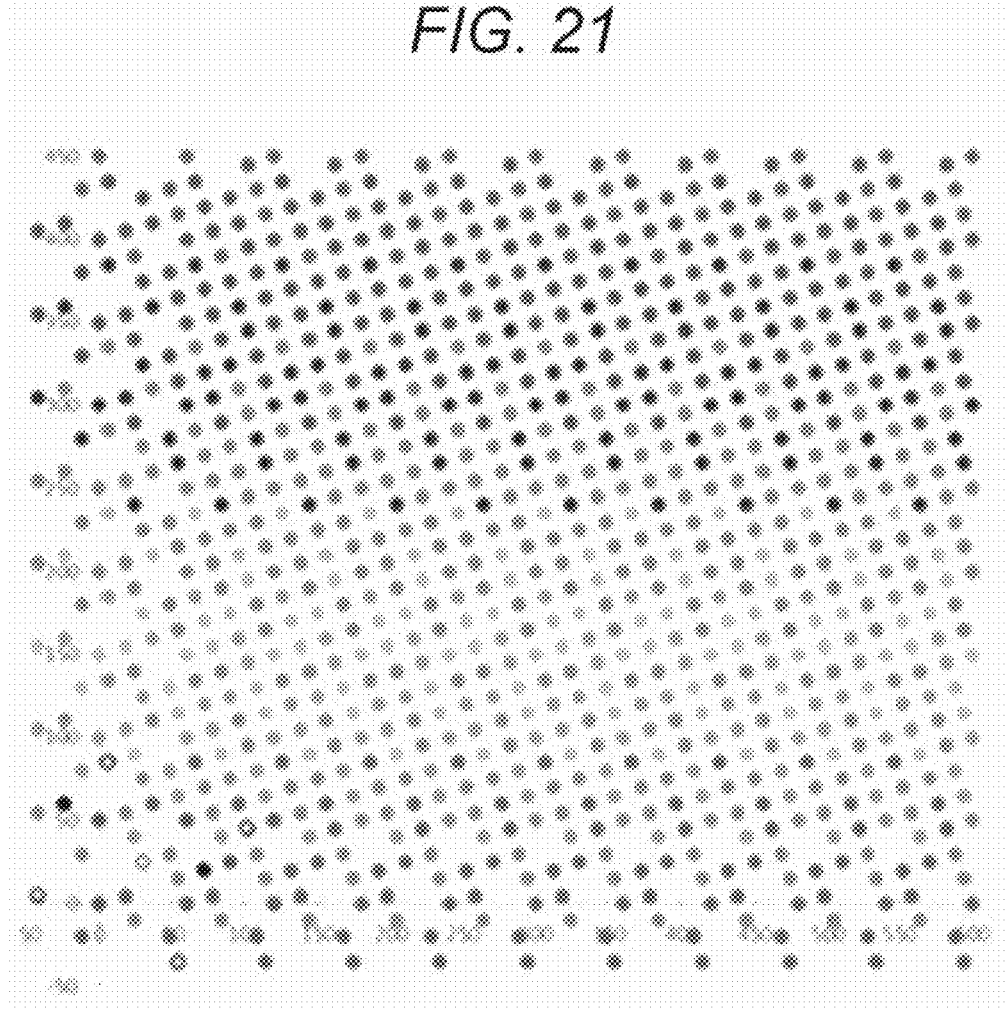
FIG. 21 is a diagram illustrating a specific example of a light irradiation spot pattern (m=4) in the second embodiment of the present technology.

FIGS. 18 to 21 are diagrams illustrating specific examples of a light irradiation spot pattern in the second embodiment of the present technology. FIG. 18 illustrates an example of a case where the diffraction unit m is set to 1. FIG. 19 illustrates an example of a case where the diffraction unit m is set to 2. FIG. 20 illustrates an example of a case where the diffraction unit m is set to 3. FIG. 21 illustrates an example of a case where the diffraction unit m is set to 4.

In this manner, since four diffracted lights are generated for one light emitting element 111, the number of spots increases fivefold by zeroth order light, the positive first order diffracted lights, and the negative first order diffracted lights. Furthermore, the distances between the spots are kept regular. Therefore, the ranging resolution may be further improved.

Furthermore, as a value of the diffraction unit m increases, the number of spots in a peripheral portion decreases, so that the value of the diffraction unit m is desirably smaller. The diffraction unit m=1 is especially desirable. In contrast, in a case where the diffraction angle is small and it is difficult to control the diffraction angle and efficiency of the diffraction element 134, it is also possible to design the diffraction unit m to be larger.

[Variation]

Figure 22:
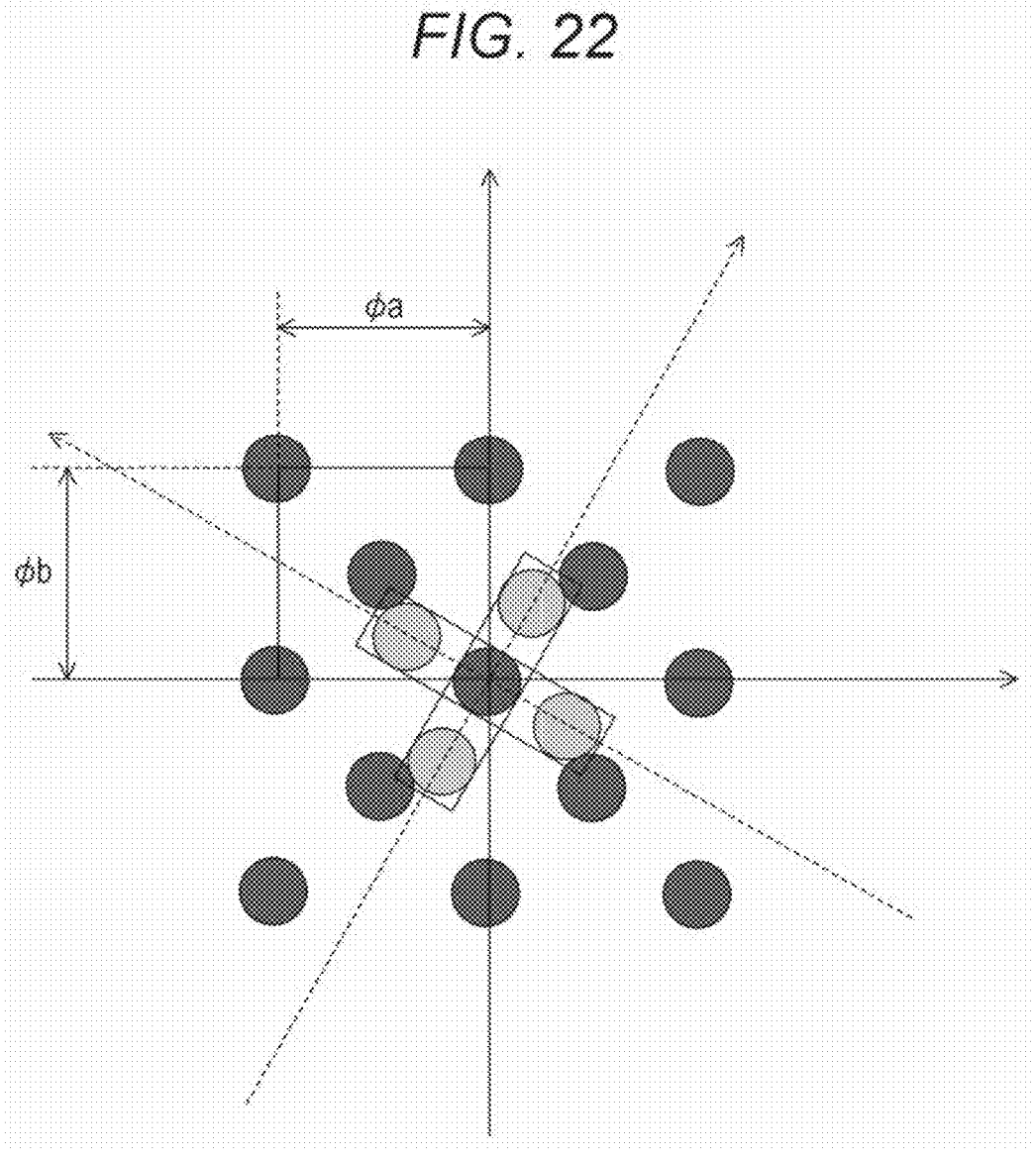
FIG. 22 is a diagram illustrating an example of the diffracted light by one light emitting element 111 in a variation of the second embodiment of the present technology.
Figure 23:
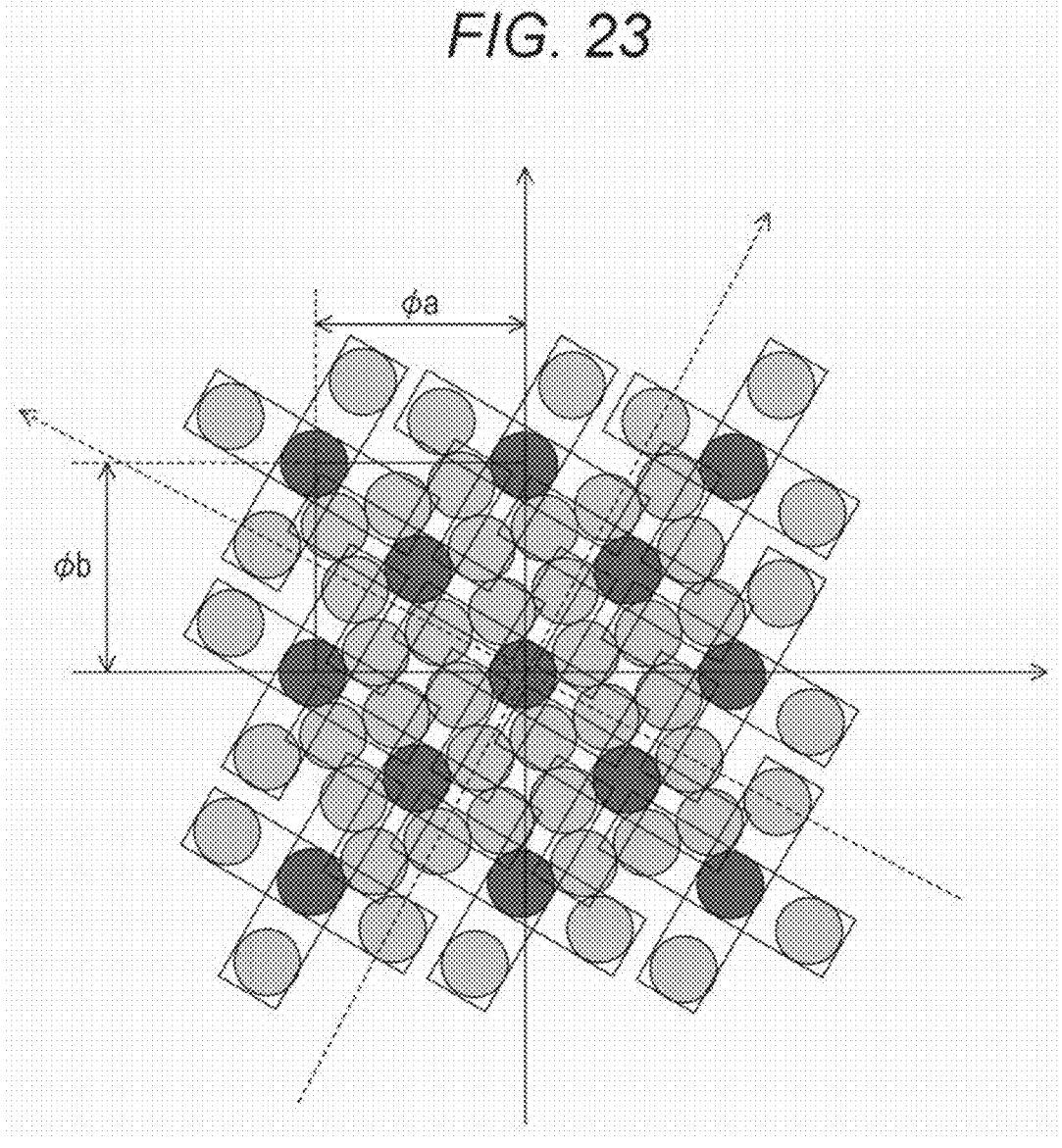
FIG. 23 is a diagram illustrating an example of the diffracted lights by a plurality of light emitting elements 111 in the variation of the second embodiment of the present technology.

FIG. 22 is a diagram illustrating an example of the diffracted light by one light emitting element 111 in a variation of the second embodiment of the present technology. FIG. 23 is a diagram illustrating an example of the diffracted lights by a plurality of light emitting elements 111 in the variation of the second embodiment of the present technology.

In this variation, an angle $\theta x$ formed by one diffraction direction and the side AB (CD) in one direction satisfies:

$$\theta x = \tan^{-1}(b/2a).$$

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$$\varphi x = m \cdot \mathrm{sgrt}((2\varphi a)^2 + \varphi b^2)/(2(2n+1)).$$

An angle $\theta x$ formed between another diffraction direction and the side AB (CD) in one direction satisfies:

$$\theta x = \tan^{-1}(-2b/a).$$

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$$\varphi x = m \cdot \mathrm{sgrt}(\varphi^2 + (2\varphi b)^2)/(2(2n+1)).$$

Note that, the diffraction unit m is a natural number being a multiple of 2 excluding an integral multiple of 2n+1. This diffraction unit m desirably is:

$$m < 2n+1.$$

Figure 24:
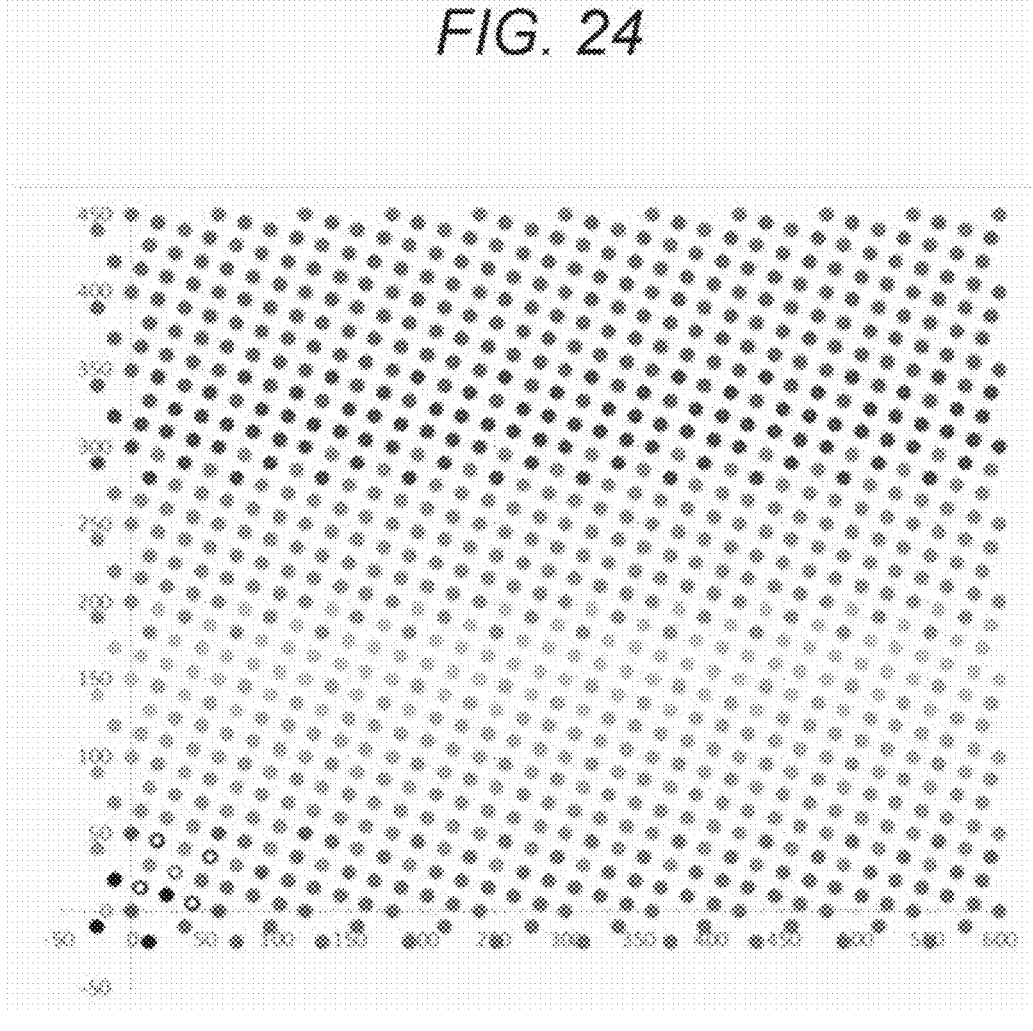
FIG. 24 is a diagram illustrating a specific example of a light irradiation spot pattern (m=2) in the variation of the second embodiment of the present technology.
Figure 25:
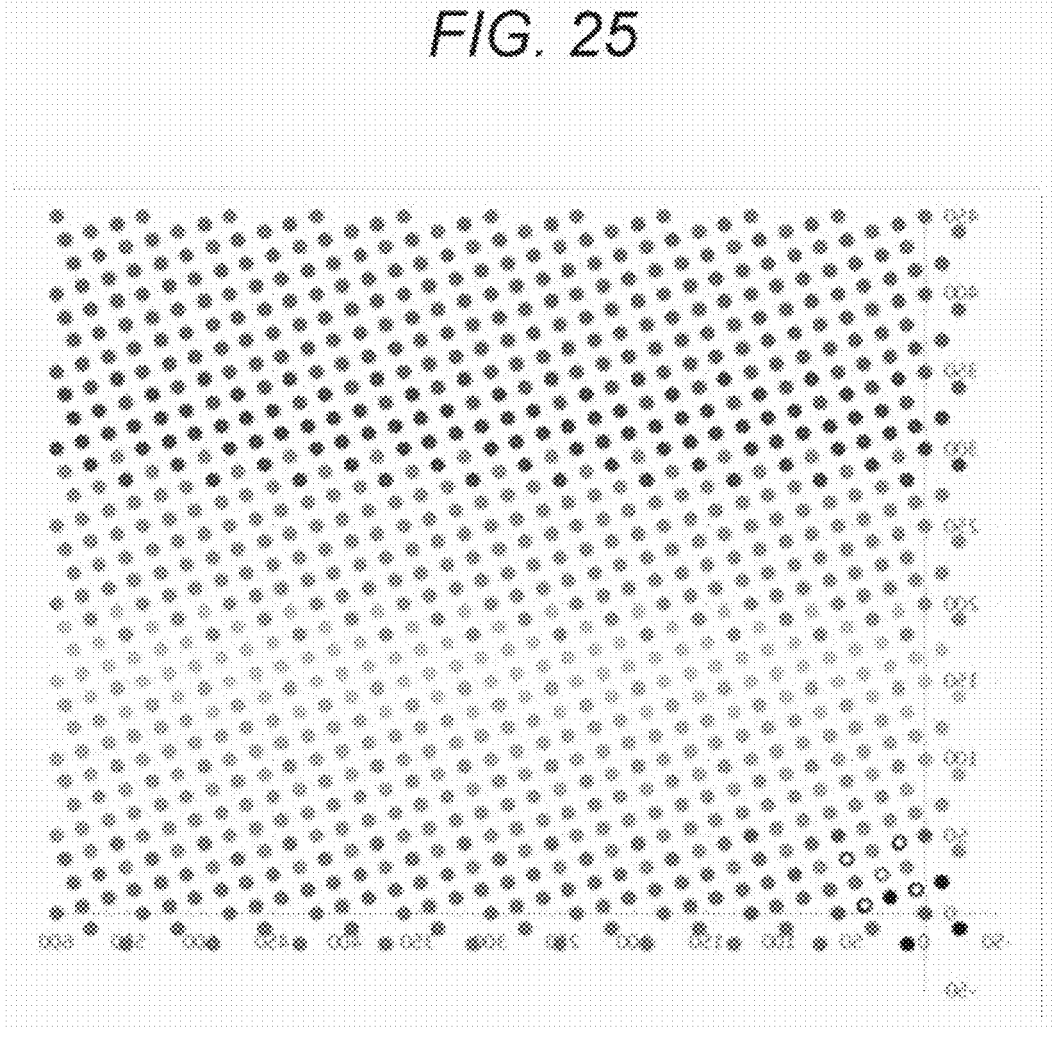
FIG. 25 is a diagram illustrating a specific example of a light irradiation spot pattern (reversed by 180 degrees) in the variation of the second embodiment of the present technology.

FIGS. 24 to 25 are diagrams illustrating specific examples of a light irradiation spot pattern in the variation of the second embodiment of the present technology. FIG. 24 illustrates an example of a case where the diffraction unit m is set to 2. FIG. 25 illustrates an example when it is reversed by 180 degrees in the example in FIG. 24. FIG. 25 illustrates a pattern similar to that in FIG. 18 of the second embodiment described above.

3. Third Embodiment

In this third embodiment, an example of dividing light into seven by the diffraction element 134 is described. Note that, the configuration other than the diffraction element 134 is similar to that of the first embodiment described above, so that detailed description thereof will be omitted.

[Diffracted Light]

Figure 26:
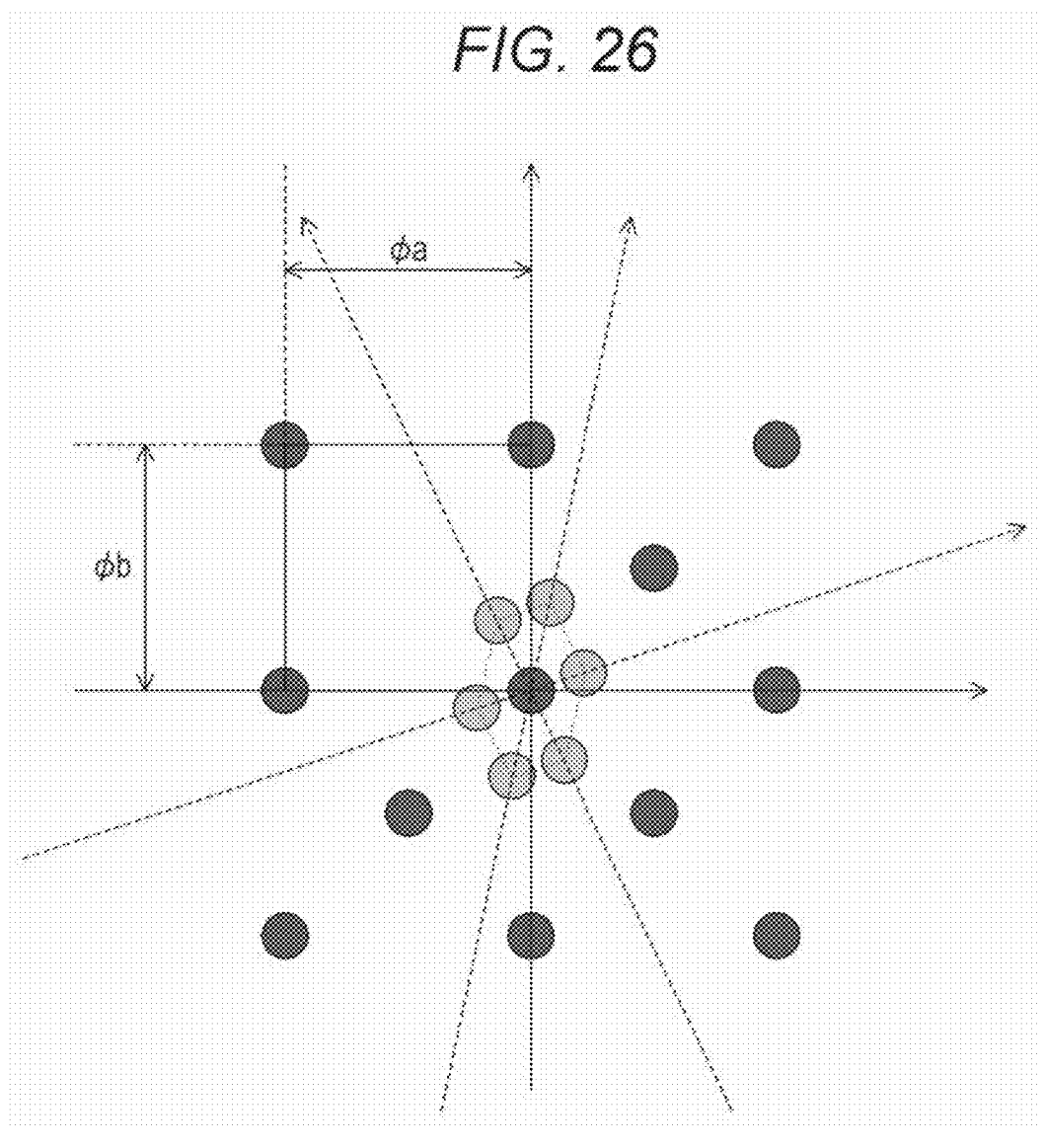
FIG. 26 is a diagram illustrating an example of the diffracted light by one light emitting element 111 in the third embodiment of the present technology.
Figure 27:
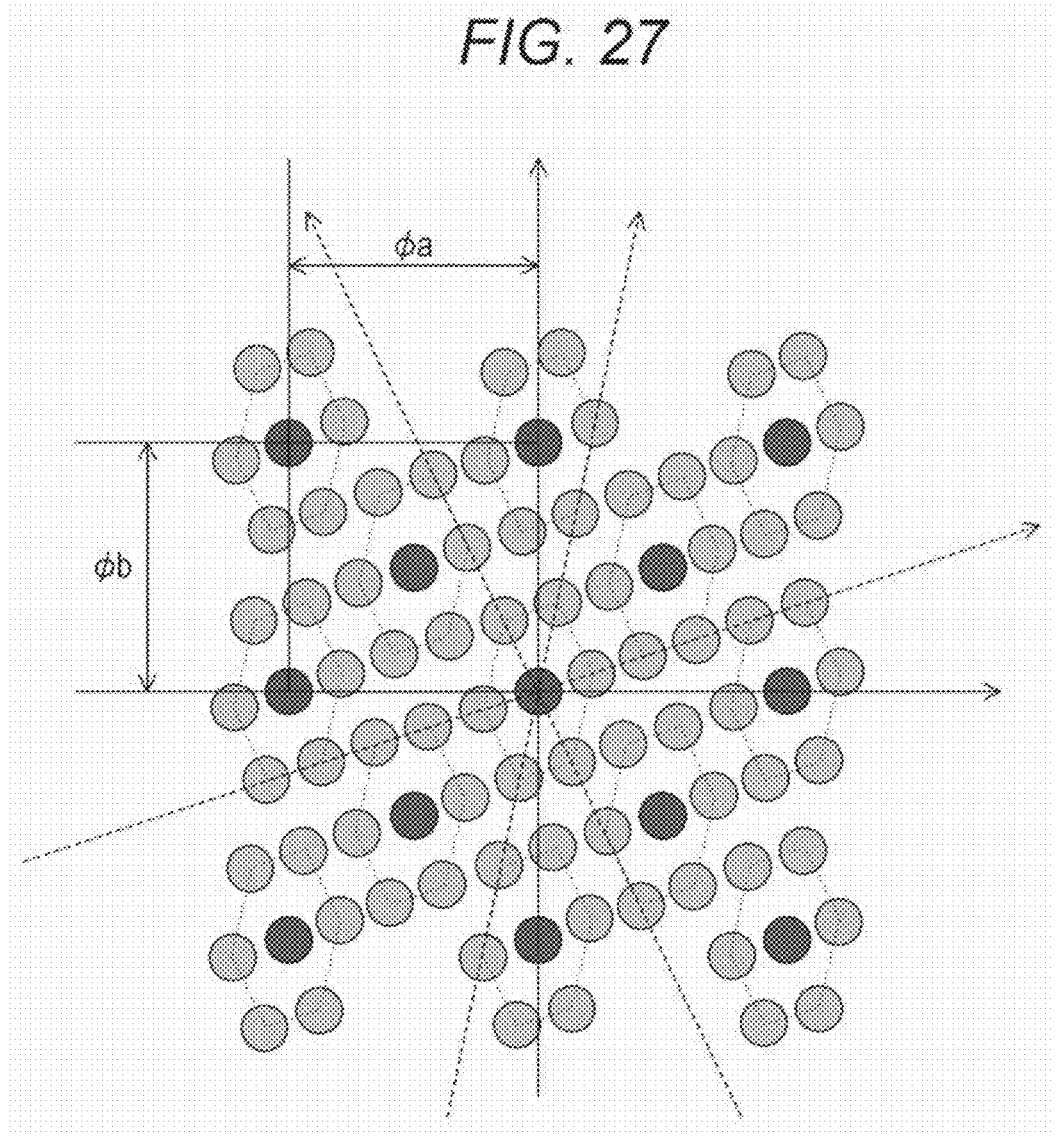
FIG. 27 is a diagram illustrating an example of the diffracted lights by a plurality of light emitting elements 111 in the third embodiment of the present technology.

FIG. 26 is a diagram illustrating an example of the diffracted light by one light emitting element 111 in the third embodiment of the present technology. FIG. 27 is a diagram illustrating an example of the diffracted lights by a plurality of light emitting elements 111 in the third embodiment of the present technology.

In the third embodiment, it is assumed that n=3, that is, the diffracted lights in three directions are generated. The diffraction element 134 generates positive first order diffracted light and negative first order diffracted light in each of the three directions for the light emitted from one light emitting element 111 at the point C described above. Therefore, a total of six diffracted lights are generated for one light emitting element 111.

An angle $\theta x$ formed between one diffraction direction and the side AB (CD) in one direction satisfies:

$$\theta x = \tan^{-1}(b/3a).$$

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sgrt}((3\varphi a)^2 + \varphi b^2)/(2(2n+1)))$.

An angle $\theta x$ formed between another diffraction direction and the side AB (CD) in one direction satisfies:

$\theta x = \tan^{-1}(5b/a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sgrt}(\varphi a^2 + (5\varphi b)^2)/(2(2n+1)))$.

An angle $\theta x$ formed between still another diffraction direction and the side AB (CD) in one direction satisfies:

$\theta x = \tan^{-1}(-4b/2a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sgrt}((2\varphi a)^2 + (4\varphi b)^2)/(2(2n+1)))$.

Note that, as described above, the diffraction unit m is a natural number excluding an integral multiple of 2n+1.

Figure 28:
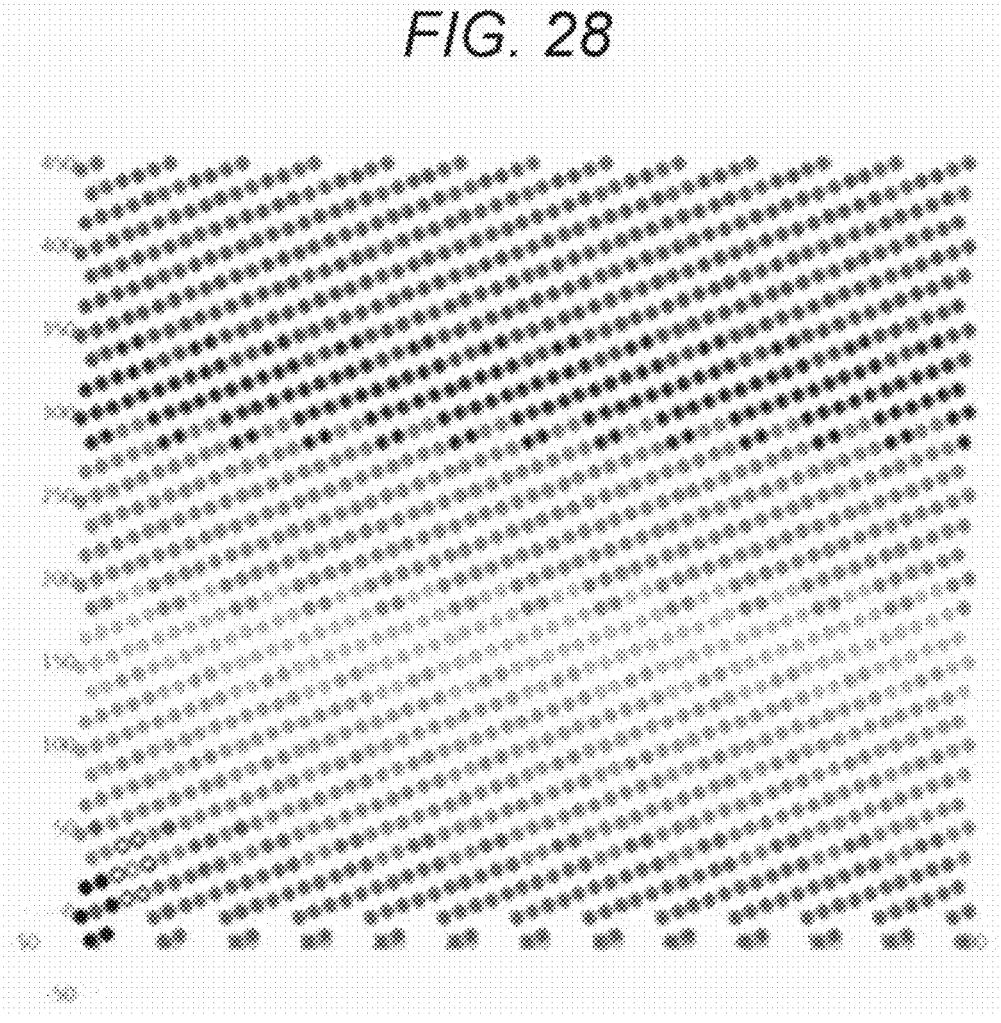
FIG. 28 is a diagram illustrating a specific example of a light irradiation spot pattern (m=1) in the third embodiment of the present technology.
Figure 29:
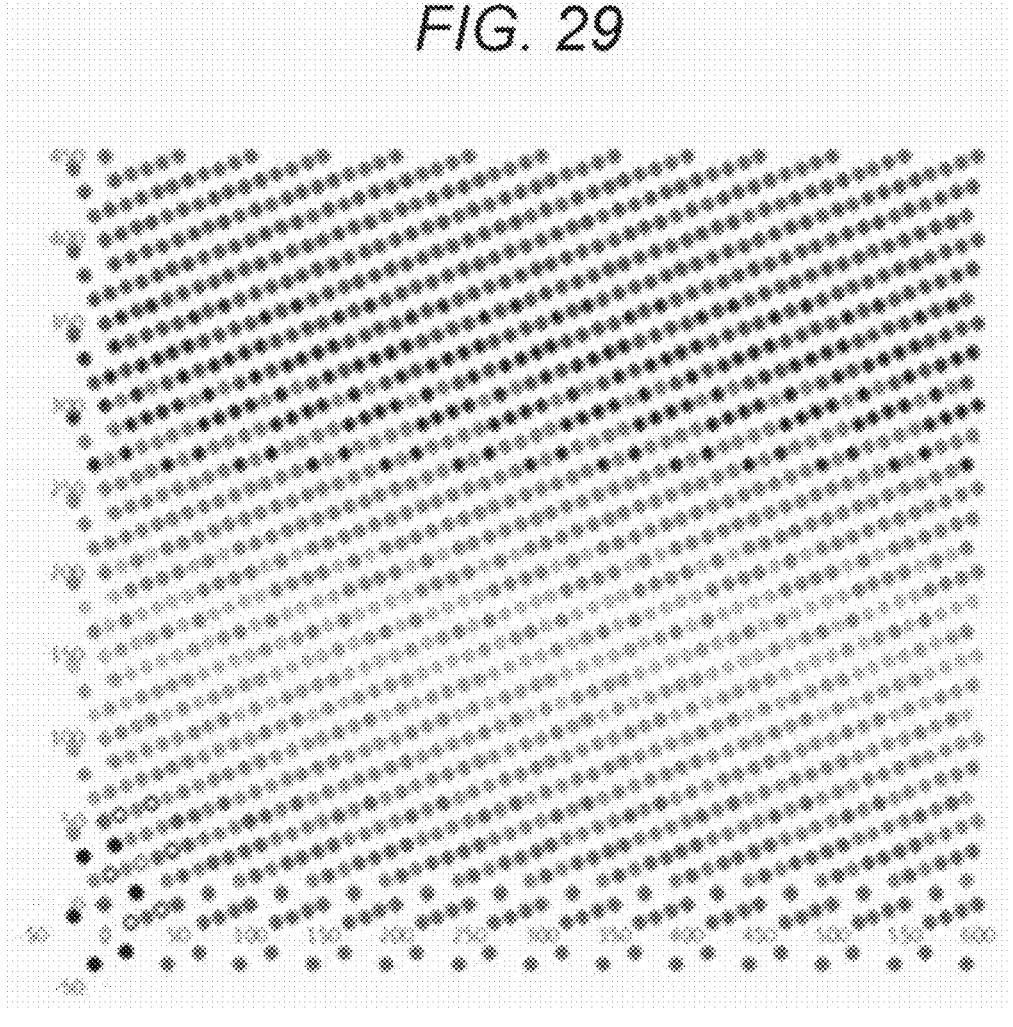
FIG. 29 is a diagram illustrating a specific example of a light irradiation spot pattern (m=2) in the third embodiment of the present technology.
Figure 30:
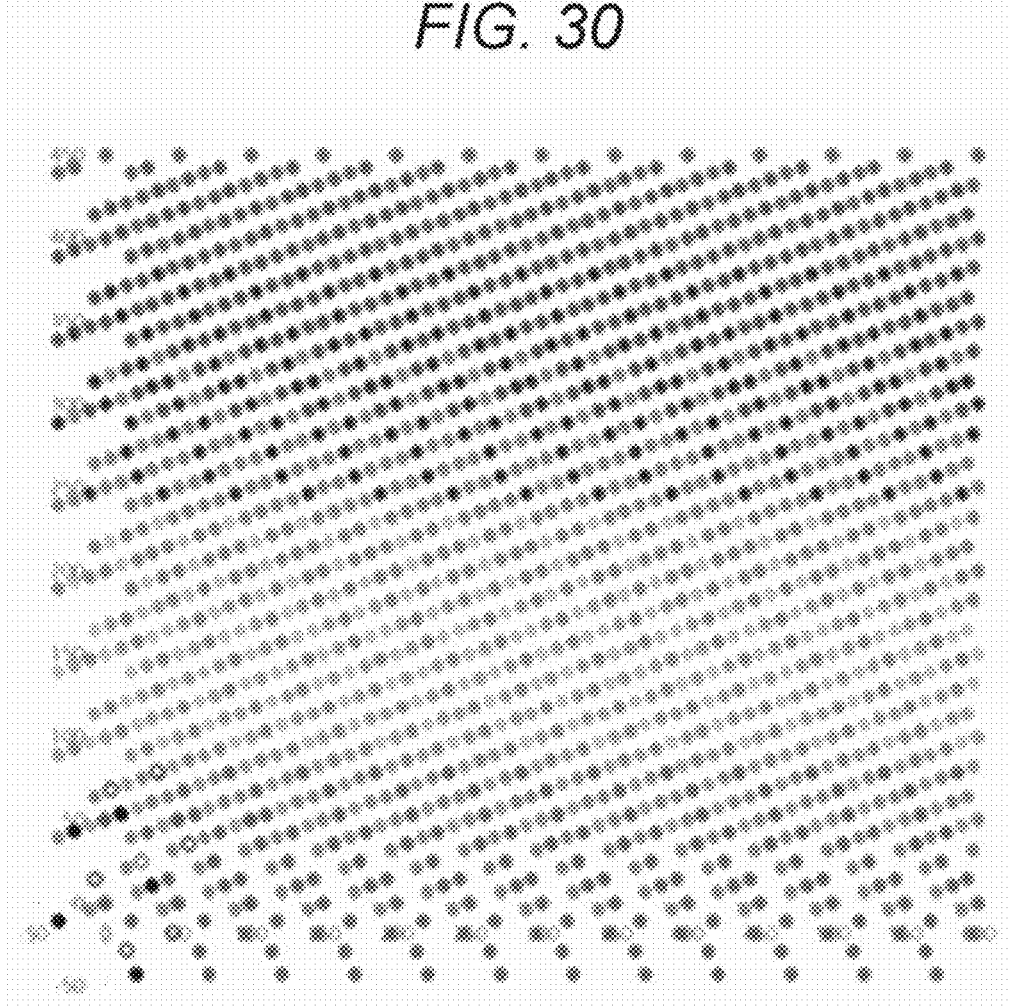
FIG. 30 is a diagram illustrating a specific example of a light irradiation spot pattern (m=3) in the third embodiment of the present technology.
Figure 31:
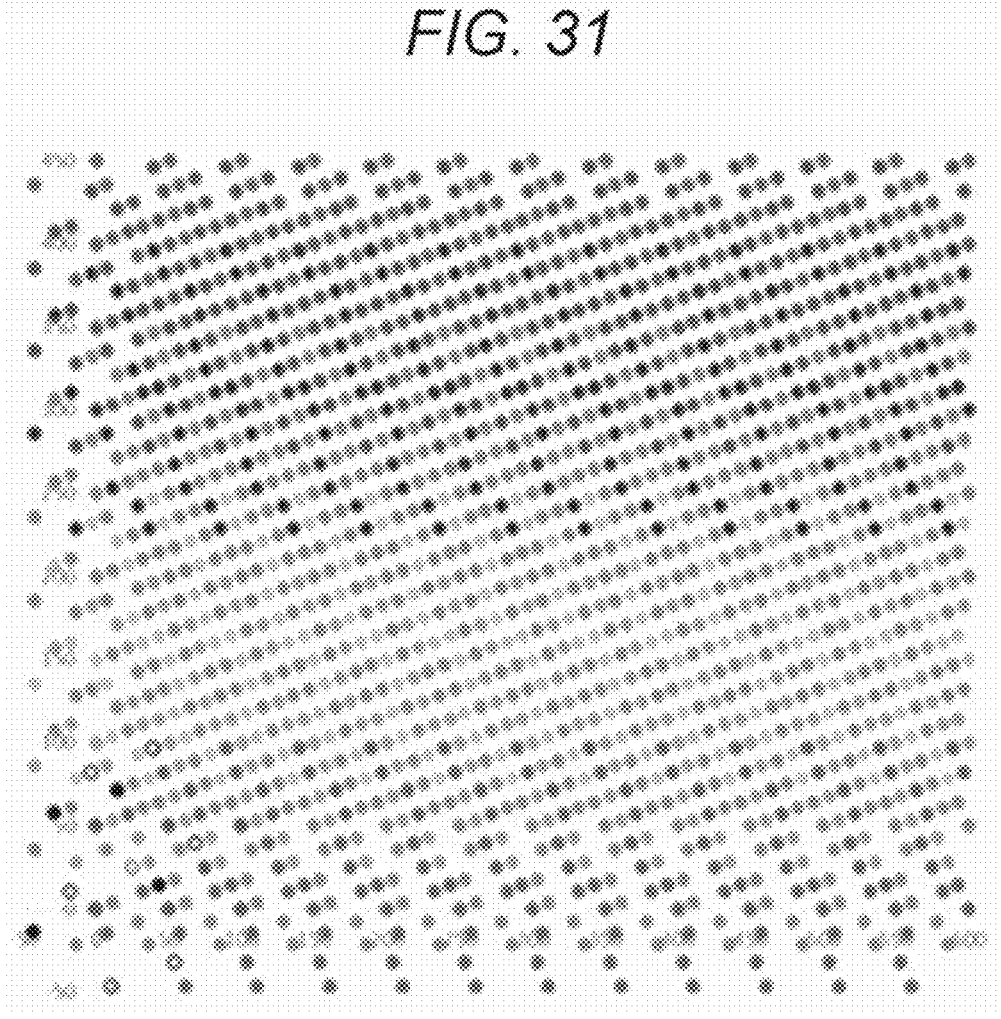
FIG. 31 is a diagram illustrating a specific example of a light irradiation spot pattern (m=4) in the third embodiment of the present technology.
Figure 32:
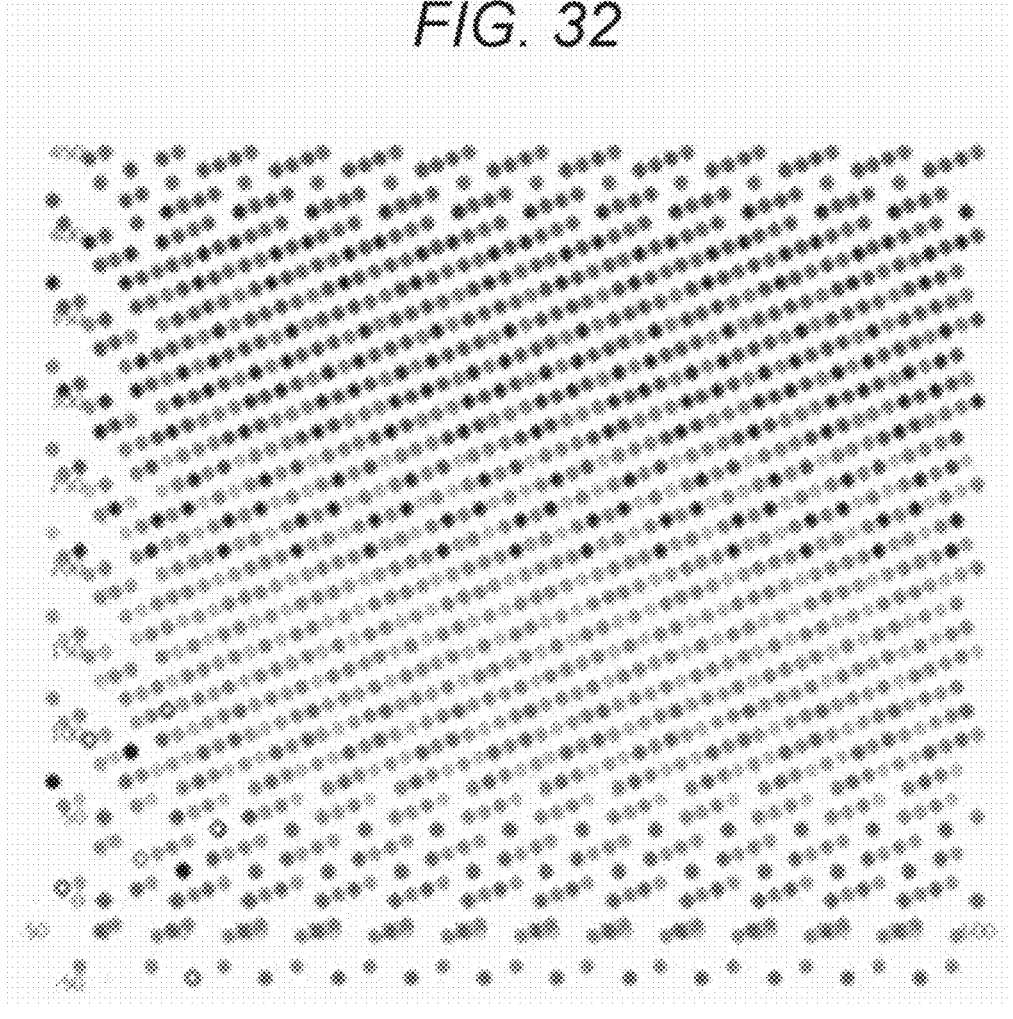
FIG. 32 is a diagram illustrating a specific example of a light irradiation spot pattern (m=5) in the third embodiment of the present technology.
Figure 33:
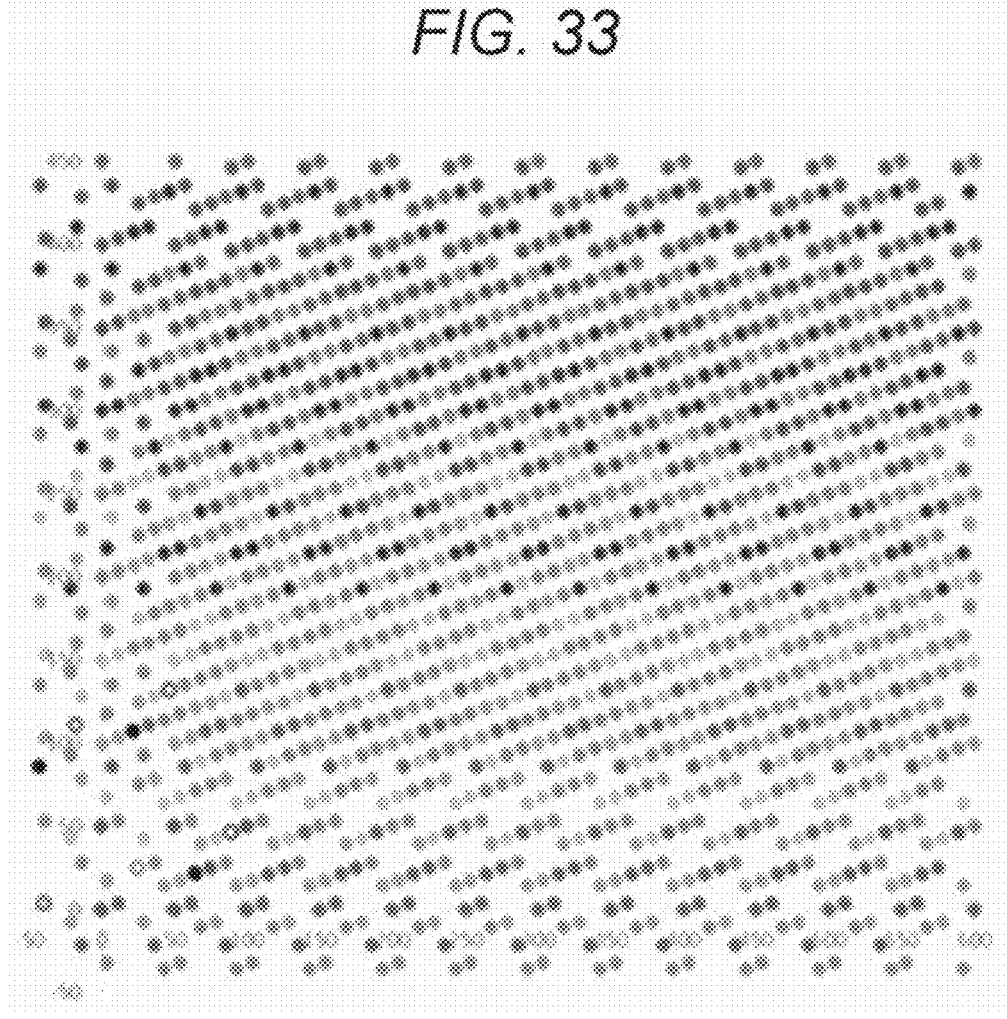
FIG. 33 is a diagram illustrating a specific example of a light irradiation spot pattern (m=6) in the third embodiment of the present technology.

FIGS. 28 to 33 are diagrams illustrating specific examples of a light irradiation spot pattern in the third embodiment of the present technology. FIG. 28 illustrates an example of a case where the diffraction unit m is set to 1. FIG. 29 illustrates an example of a case where the diffraction unit m is set to 2. FIG. 30 illustrates an example of a case where the diffraction unit m is set to 3. FIG. 31 illustrates an example of a case where the diffraction unit m is set to 4. FIG. 32 illustrates an example of a case where the diffraction unit m is set to 5. FIG. 33 illustrates an example of a case where the diffraction unit m is set to 6.

In this manner, since six diffracted lights are generated for one light emitting element 111, the number of spots increases sevenfold by zeroth order light, the positive first order diffracted lights, and the negative first order diffracted lights. Furthermore, the distances between the spots are kept regular. Therefore, the ranging resolution may be further improved.

Furthermore, as a value of the diffraction unit m increases, the number of spots in a peripheral portion decreases, so that the value of the diffraction unit m is desirably smaller. The diffraction unit m=1 is especially desirable. In contrast, in a case where the diffraction angle is small and it is difficult to control the diffraction angle and efficiency of the diffraction element 134, it is also possible to design the diffraction unit m to be larger.

4. Fourth Embodiment

Figure 34:
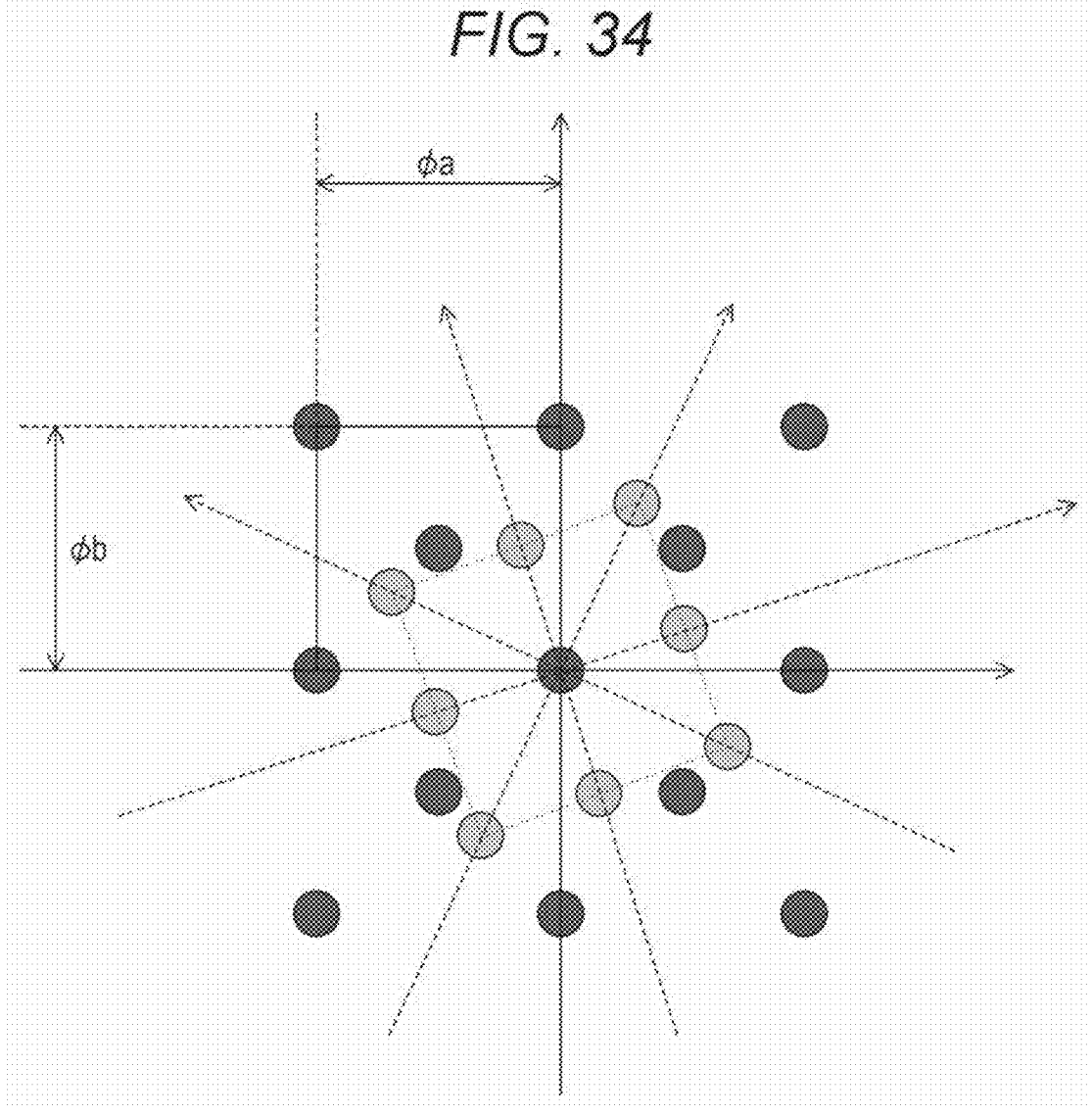
FIG. 34 is a diagram illustrating an example of the diffracted light by one light emitting element 111 in a fourth embodiment of the present technology.
Figure 35:
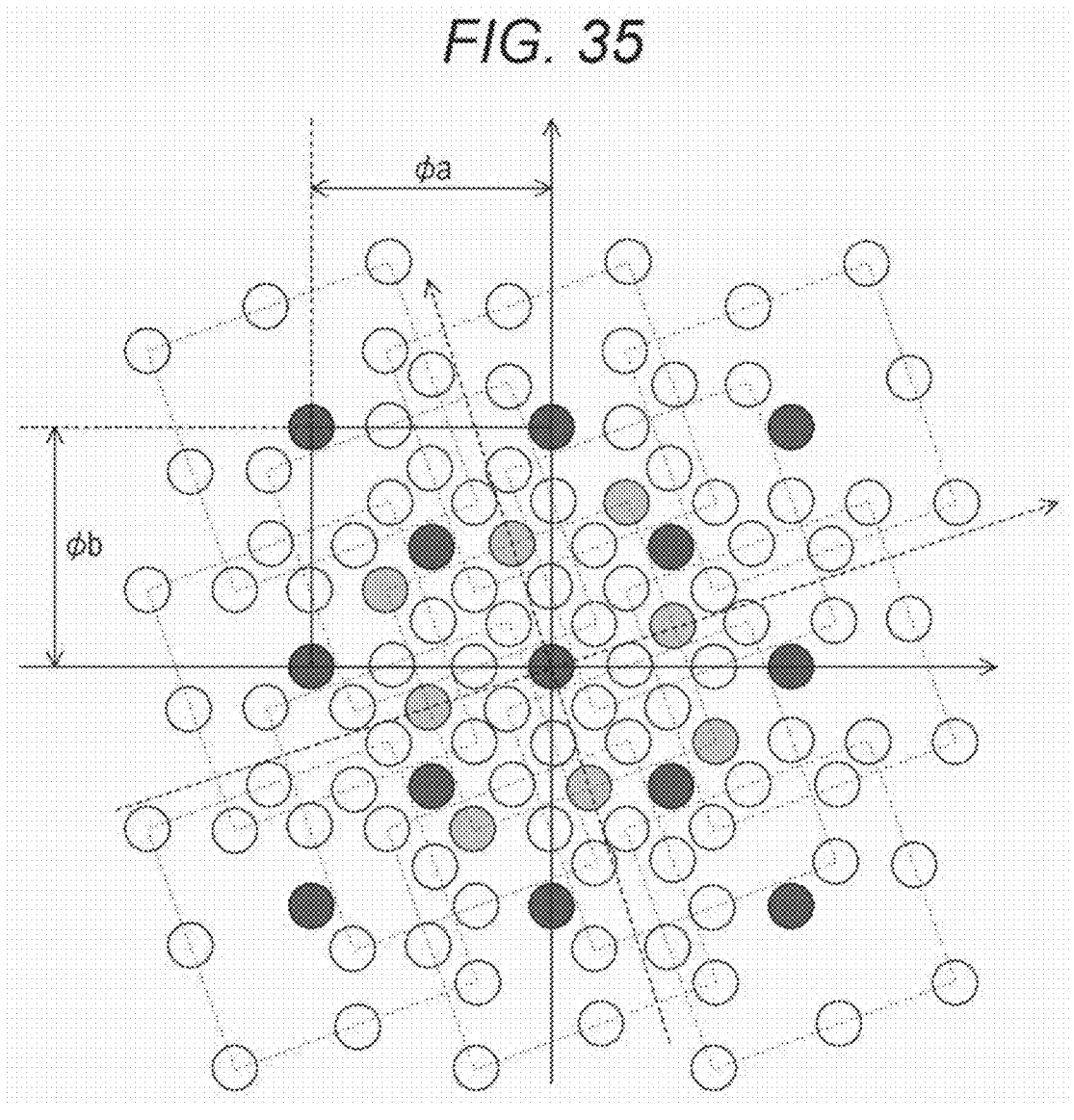
FIG. 35 is a diagram illustrating an example of the diffracted lights by a plurality of light emitting elements 111 in the fourth embodiment of the present technology.

In this fourth embodiment, an example of dividing light into nine by the diffraction element 134 is described. Note that, the configuration other than the diffraction element 134 is similar to that of the first embodiment described above, so that detailed description thereof will be omitted.
[Diffracted Light]
FIG. 34 is a diagram illustrating an example of the diffracted light by one light emitting element 111 in the fourth embodiment of the present technology. FIG. 35 is a diagram illustrating an example of the diffracted lights by a plurality of light emitting elements 111 in the fourth embodiment of the present technology.

In the fourth embodiment, it is assumed that n=4, that is, the diffracted lights in four directions are generated. The diffraction element 134 generates positive first order diffracted light and negative first order diffracted light in each of the four directions for the light emitted from one light emitting element 111 at the point C described above. Therefore, a total of eight diffracted lights are generated for one light emitting element 111.

An angle $\theta x$ formed between one diffraction direction and the side AB (CD) in one direction satisfies:

$\theta x = \tan^{-1}(b/3a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sgrt}((3\varphi a)^2 + \varphi b^2)/(2(2n+1)))$.

An angle $\theta x$ formed between another diffraction direction and the side AB (CD) in one direction satisfies:

$\theta x = \tan^{-1}(4b/2a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sgrt}((2\varphi a)^2 + (4\varphi b)^2)/(2(2n+1)))$.

An angle $\theta x$ formed between another diffraction direction and the side AB (CD) in one direction satisfies:

$\theta x = \tan^{-1}(-3b/a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sqrt}((\varphi a)^2 + (3\varphi b)^2)/(2(2n+1)))$.

An angle $\theta x$ formed between still another diffraction direction and the side AB (CD) in one direction satisfies:

$\theta x = \tan^{-1}(-2b/4a)$.

When angle differences of the two light beams generated by inter-light emission distances a and b after being collimated by the collimator lens 113 are set to $\varphi a$ and $\varphi b$, respectively, a diffraction angle $\varphi x$ of the diffracted light satisfies:

$\varphi x = m \cdot \mathrm{sqrt}((4\varphi a)^2 + (2\varphi b)^2)/(2(2n+1)))$.

Note that, the diffraction unit m is a natural number being a multiple of 3 excluding an integral multiple of 2n+1. This diffraction unit m desirably is:

$m < 2n+1$.

Figure 36:
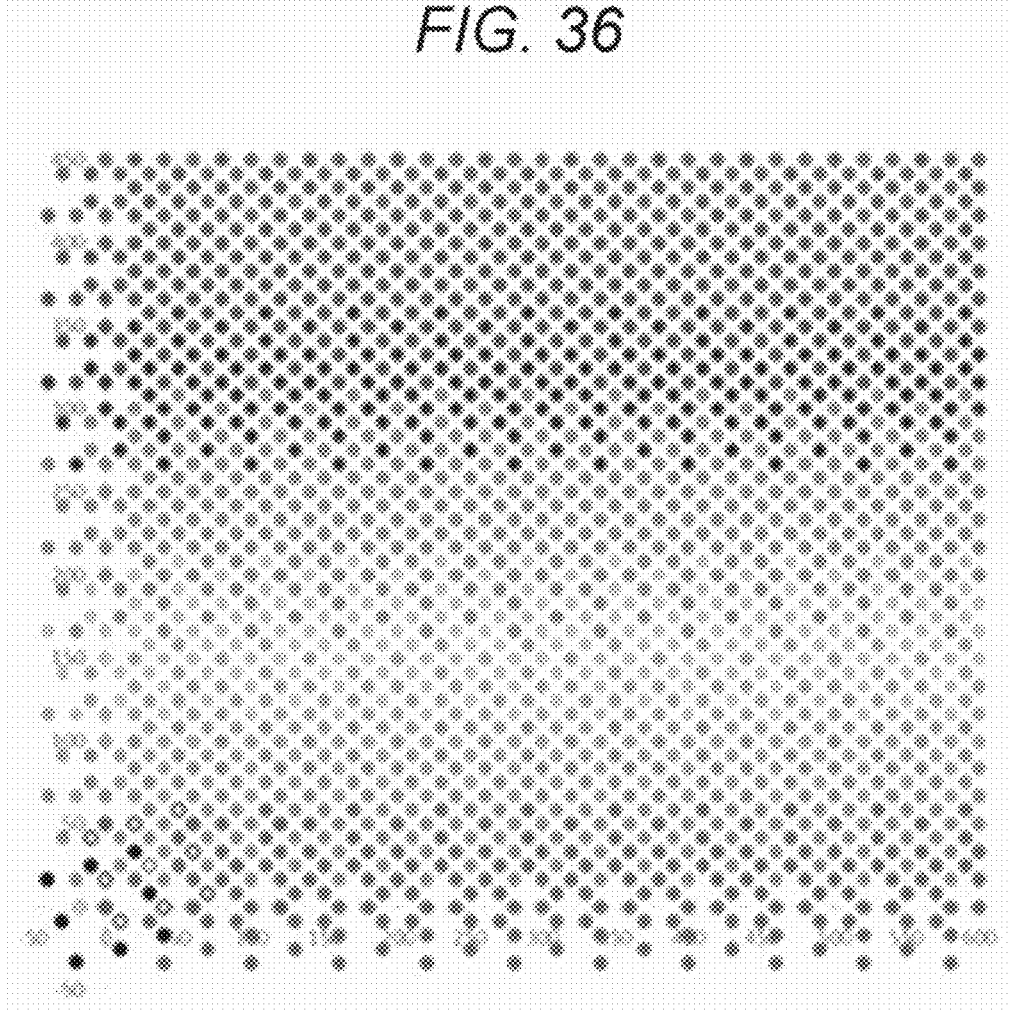
FIG. 36 is a diagram illustrating a specific example of a light irradiation spot pattern (m=3) in the fourth embodiment of the present technology.
Figure 37:
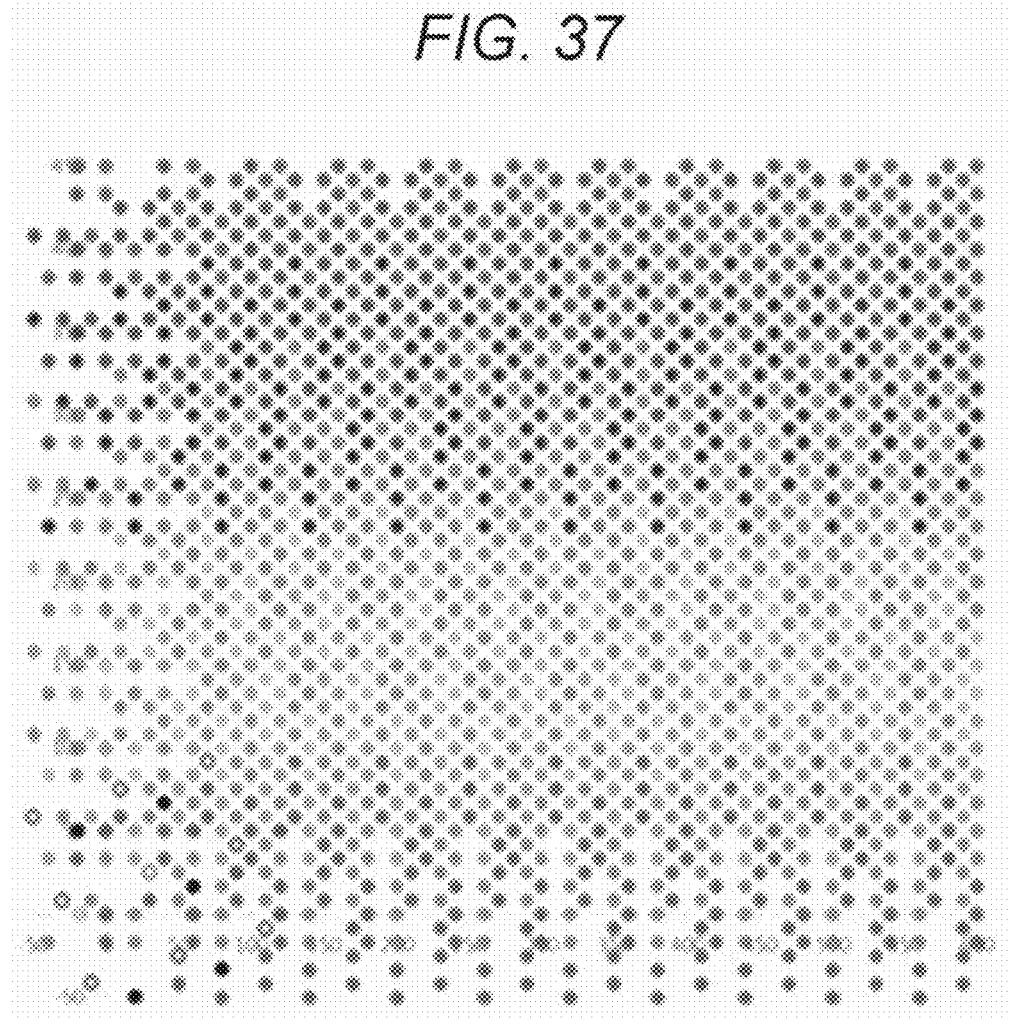
FIG. 37 is a diagram illustrating a specific example of a light irradiation spot pattern (m=6) in the fourth embodiment of the present technology.

FIGS. 36 and 37 are diagrams illustrating specific examples of a light irradiation spot pattern in the fourth embodiment of the present technology. FIG. 36 illustrates an example of a case where the diffraction unit m is set to 3. FIG. 37 illustrates an example of a case where the diffraction unit m is set to 6.

In this manner, since eight diffracted lights are generated for one light emitting element 111, the number of spots increases ninefold by zeroth order light, the positive first order diffracted lights, and the negative first order diffracted lights. Furthermore, the distances between the spots are kept regular. Therefore, the ranging resolution may be further improved.

Furthermore, as a value of the diffraction unit m increases, the number of spots in a peripheral portion decreases, so that the value of the diffraction unit m is desirably smaller. The diffraction unit m=3 is especially desirable. In contrast, in a case where the diffraction angle is small and it is difficult to control the diffraction angle and efficiency of the diffraction element 134, it is also possible to design the diffraction unit m to be larger.

5. Variation

Here, a variation of the fourth embodiment described above will be described. That is, another example in which the light is divided into nine by the diffraction element 134 will be described. Note that, the configuration other than the diffraction element 134 is similar to that of the first embodiment described above, so that detailed description thereof will be omitted.

[First Variation]

Figure 38:
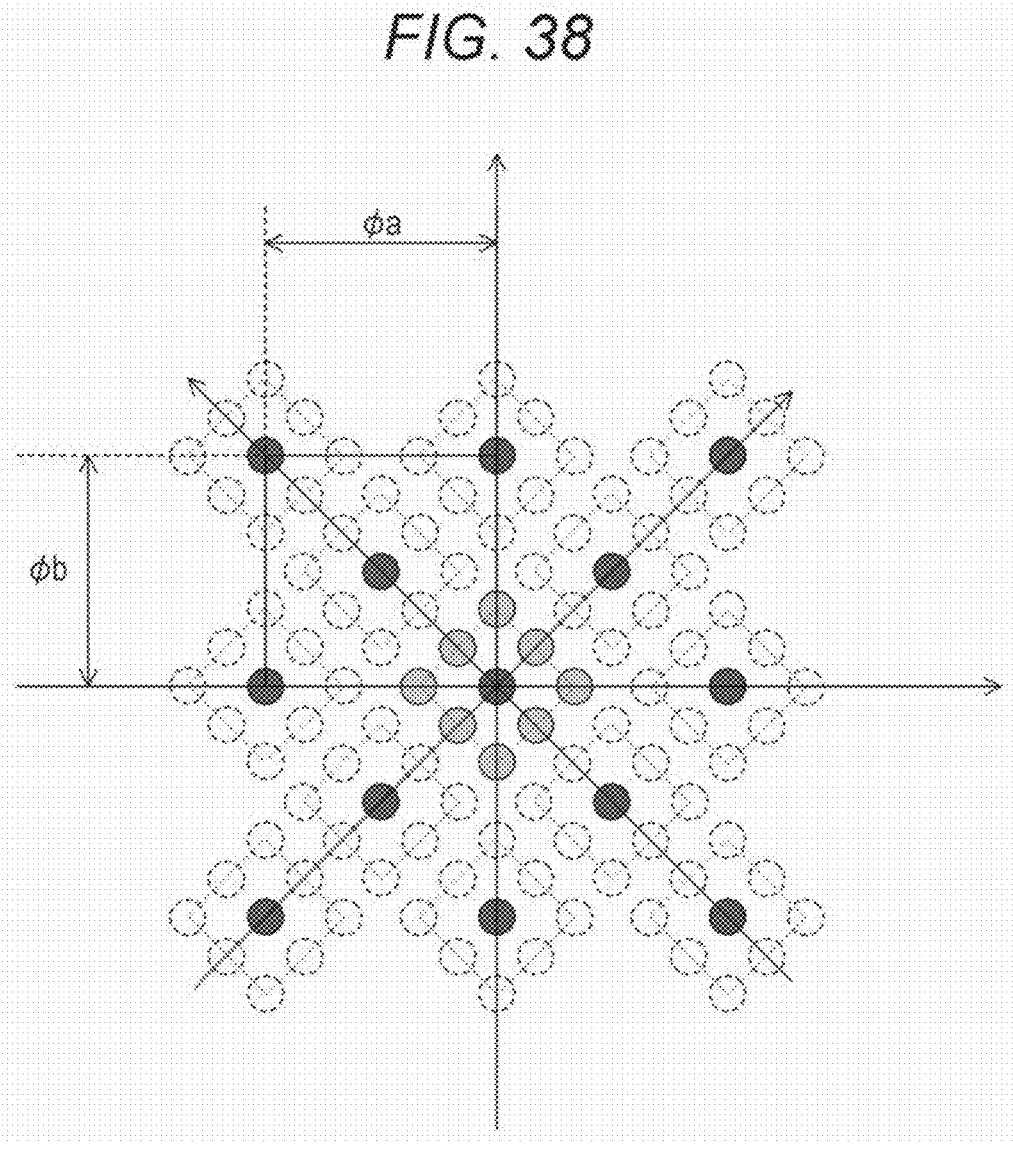
FIG. 38 is a diagram illustrating an example of the diffracted light by the light emitting element 111 in a first variation of the embodiment of the present technology.

FIG. 38 is a diagram illustrating an example of the diffracted light by the light emitting element 111 in a first variation of the embodiment of the present technology.

In the first variation, it is assumed that n=4, that is, the diffracted lights in four directions are generated. The diffraction element 134 generates positive first order diffracted light and negative first order diffracted light in each of the four directions for the light emitted from one light emitting element 111 at the point C described above. Therefore, a total of eight diffracted lights are generated for one light emitting element 111.

An angle θx formed between one diffraction direction and the side AB (CD) in one direction satisfies:

$$\theta x = \tan^{-1}(b/a).$$

When angle differences of the two light beams generated by inter-light emission distances a and b after being collimated by the collimator lens 113 are set to φa and φb, respectively, a diffraction angle φx of the diffracted light satisfies:

$$\varphi x = 3 \cdot sqrt(\varphi a\hat{}2 + \varphi b\hat{}2)/(2(2n+1)).$$

Figure 39:
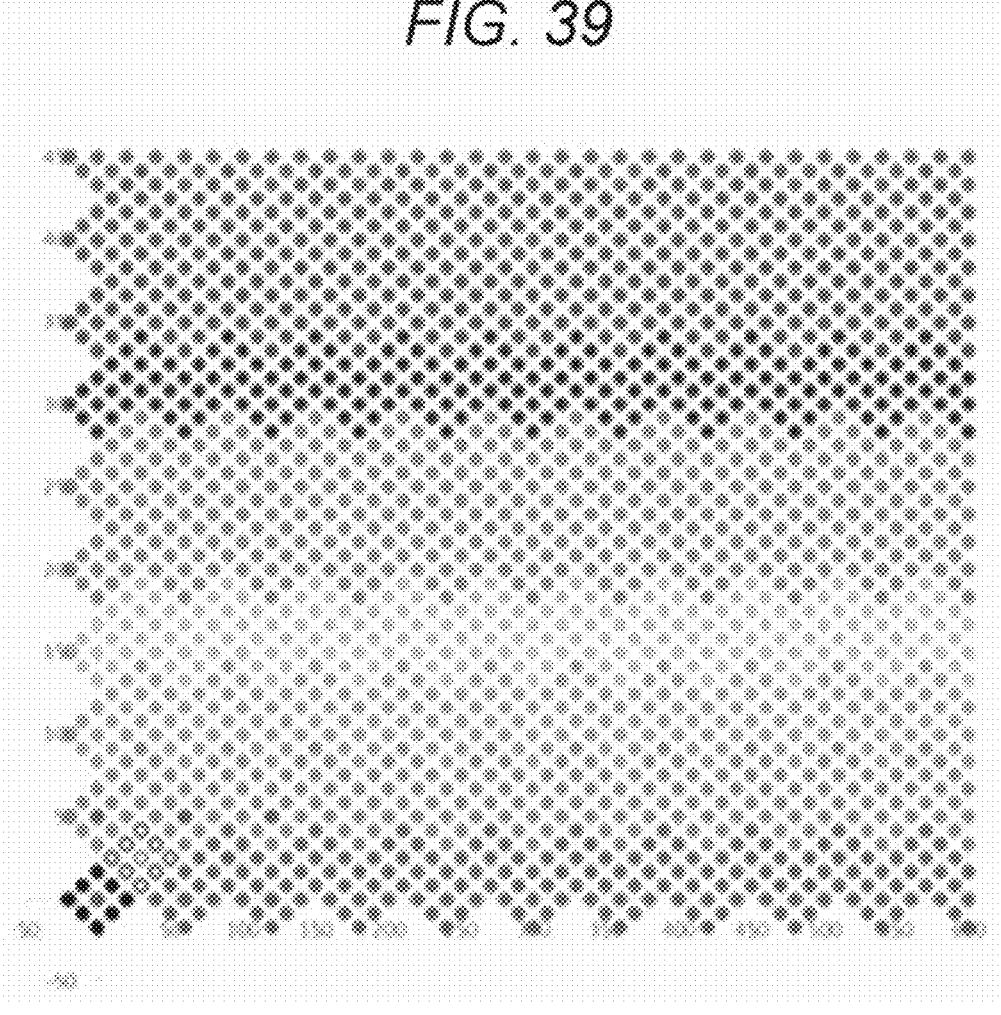
FIG. 39 is a diagram illustrating a specific example of a light irradiation spot pattern in the first variation of the embodiment of the present technology.

FIG. 39 is a diagram illustrating a specific example of a light irradiation spot pattern in the first variation of the embodiment of the present technology.

In this manner, since eight diffracted lights are generated for one light emitting element 111, the number of spots increases ninefold by zeroth order light, the positive first order diffracted lights, and the negative first order diffracted lights. Furthermore, the distances between the spots are kept regular. Therefore, the ranging resolution may be further improved.

[Second Variation]

Figure 40:
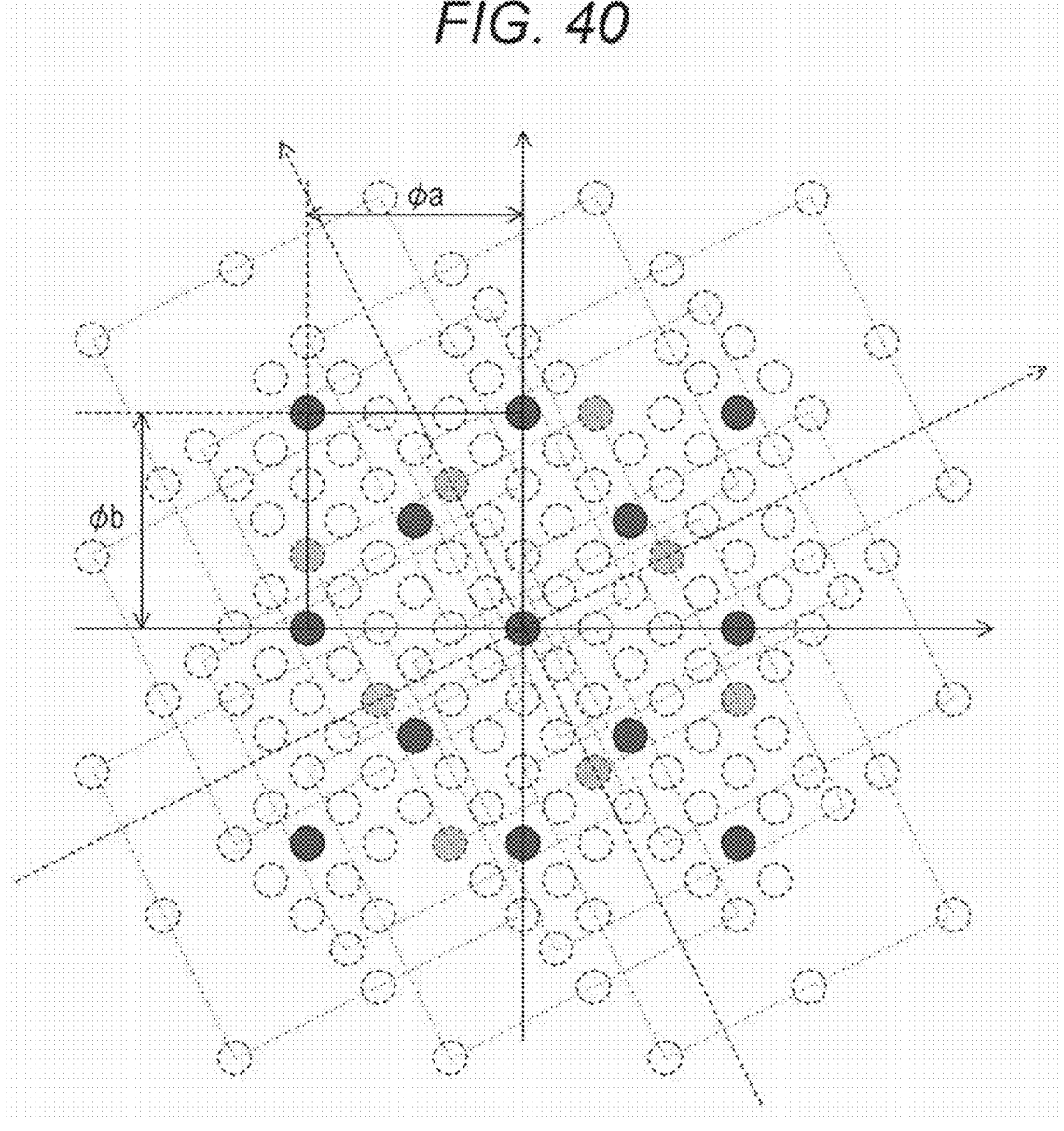
FIG. 40 is a diagram illustrating an example of the diffracted light by the light emitting element 111 in a second variation of the embodiment of the present technology.

FIG. 40 is a diagram illustrating an example of the diffracted light by the light emitting element 111 in a second variation of the embodiment of the present technology.

In the second variation, it is assumed that n=4, that is, the diffracted lights in four directions are generated. The diffraction element 134 generates positive first order diffracted light and negative first order diffracted light in each of the four directions for the light emitted from one light emitting element 111 at the point C described above. Therefore, a total of eight diffracted lights are generated for one light emitting element 111.

An angle θx formed between one diffraction direction and the side AB (CD) in one direction satisfies:

$$\theta x = \tan^{-1}(b/2a).$$

When angle differences of the two light beams generated by inter-light emission distances a and b after being collimated by the collimator lens 113 are set to φa and φb, respectively, a diffraction angle φx of the diffracted light satisfies:

$$\varphi x = 6 \cdot sqrt((2\varphi a)\hat{}2 + \varphi b\hat{}2)/(2(2n+1)).$$

Figure 41:
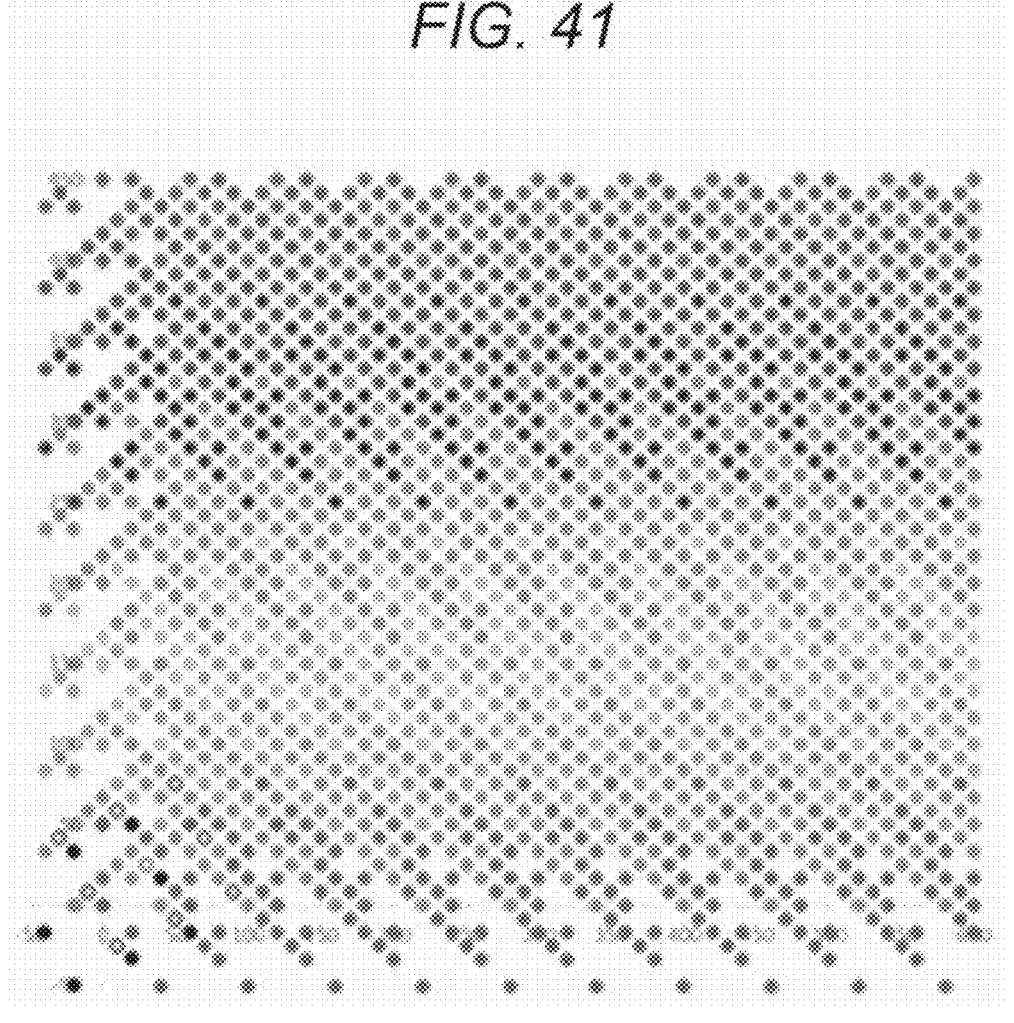
FIG. 41 is a diagram illustrating a specific example of a light irradiation spot pattern in the second variation of the embodiment of the present technology.

FIG. 41 is a diagram illustrating a specific example of a light irradiation spot pattern in the second variation of the embodiment of the present technology.

In this manner, since eight diffracted lights are generated for one light emitting element 111, the number of spots increases ninefold by zeroth order light, the positive first order diffracted lights, and the negative first order diffracted lights. Furthermore, the distances between the spots are kept regular. Therefore, the ranging resolution may be further improved.

6. Application Example

First Application Example

In the above-described embodiment, the number of spot lights is increased by dividing the spot light by the diffraction element 134. In this first application example, the light emitting elements 111 that emit light are divided into groups (sets), and the light emitting elements 111 that emit light are switched in a time division manner. Therefore, a light emission pattern may be changed as necessary. That is, switching light emission enables multipath countermeasures while improving resolution.

[Configuration of Light Emission Unit]

Figure 42:
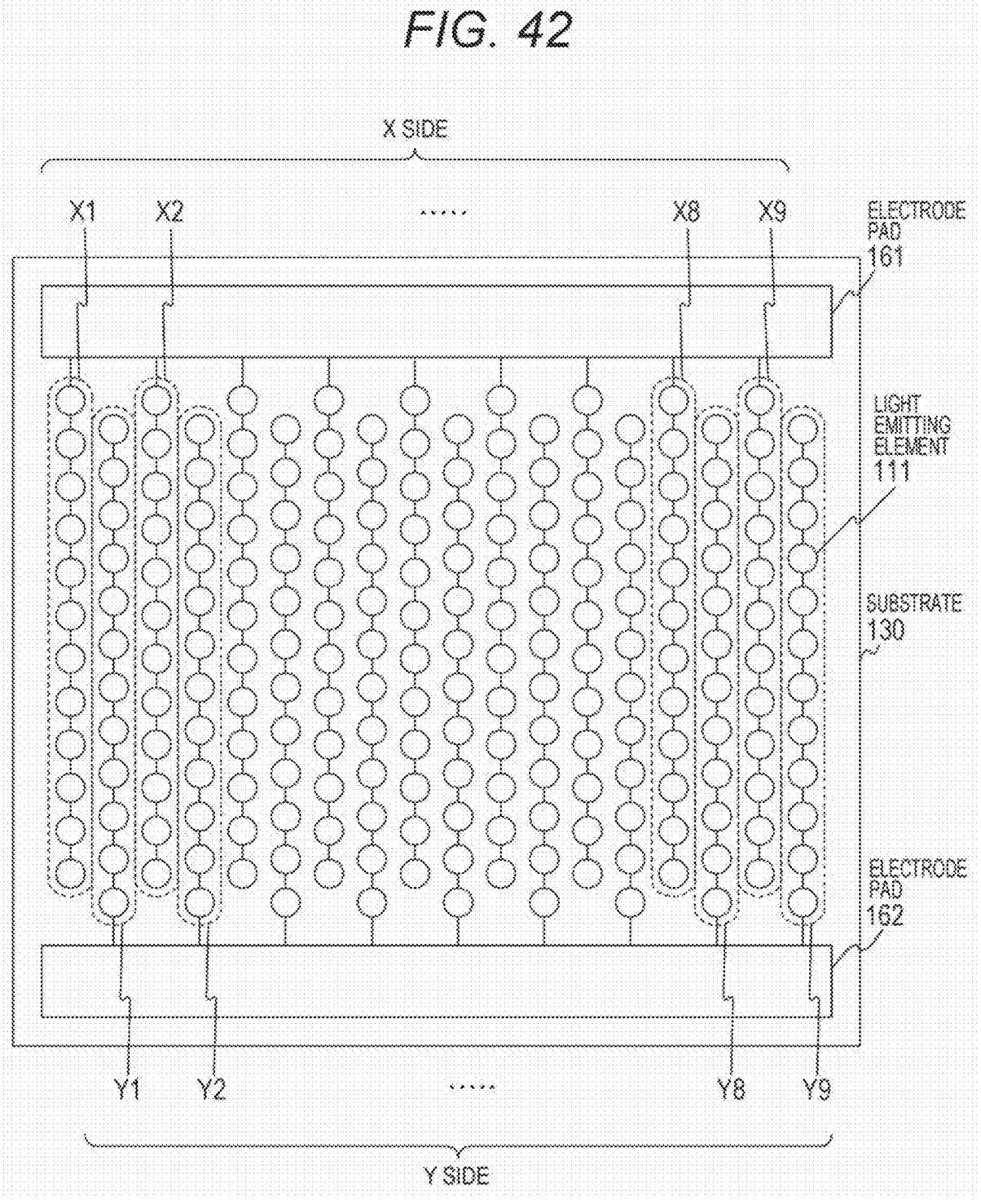
FIG. 42 is a diagram illustrating a configuration example of the light emission unit 110 in a first application example of the embodiment of the present technology.

FIG. 42 is a diagram illustrating a configuration example of the light emission unit 110 in the first application example of the embodiment of the present technology.

The light emission unit 110 in this application example groups the arrayed light emitting elements 111 into an X side (light emitting element groups X1 to X9) and a Y side (light emitting element groups Y1 to Y9) in units of columns. Then, an X-side electrode pad 161 and a Y-side electrode pad 162 are separately provided. Therefore, the X side and the Y side of the light emitting elements 111 may be driven independently.

In this example, the light emitting element groups X1 to X9 and the light emitting element groups Y1 to Y9 are alternately arranged on the substrate 130 having a rectangular shape. Note that, an example in which the light emitting element groups X1 to X9 and the light emitting element groups Y1 to Y9 are alternately arranged is herein described, but there is no limitation. For example, the number of the plurality of light emitting elements 111 may be optionally arrayed depending on the desired number and position of light emission points and a desired amount of light output.

Figure 43:
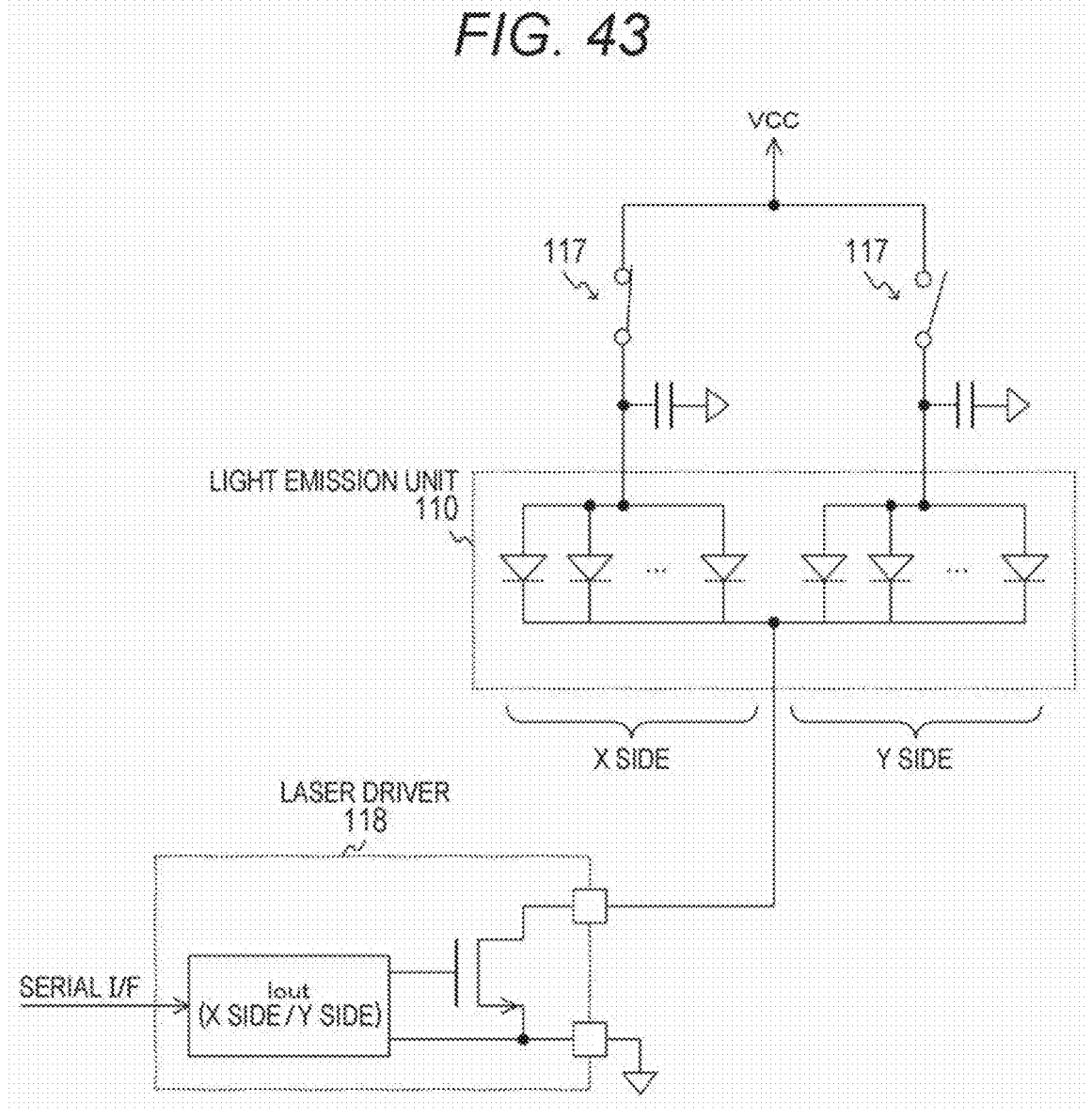
FIG. 43 is a diagram illustrating a first example of a laser driver 118 for driving the light emission unit 110 in the first application example of the embodiment of the present technology.

FIG. 43 is a diagram illustrating a first example of a laser driver 118 for driving the light emission unit 110 in the first application example of the embodiment of the present technology.

In the first example, the laser driver 118 is provided in common on the X side and the Y side of the light emitting elements 111, and light emission in the light emitting element 111 is controlled by opening and closing a switch 117. That is, by turning on one of the two switches 117 and turning off the other, it is possible to switch between the X side and the Y side of the light emitting elements 111. Note that, the switch 117 is an example of a switch unit recited in claims.

Figure 44:
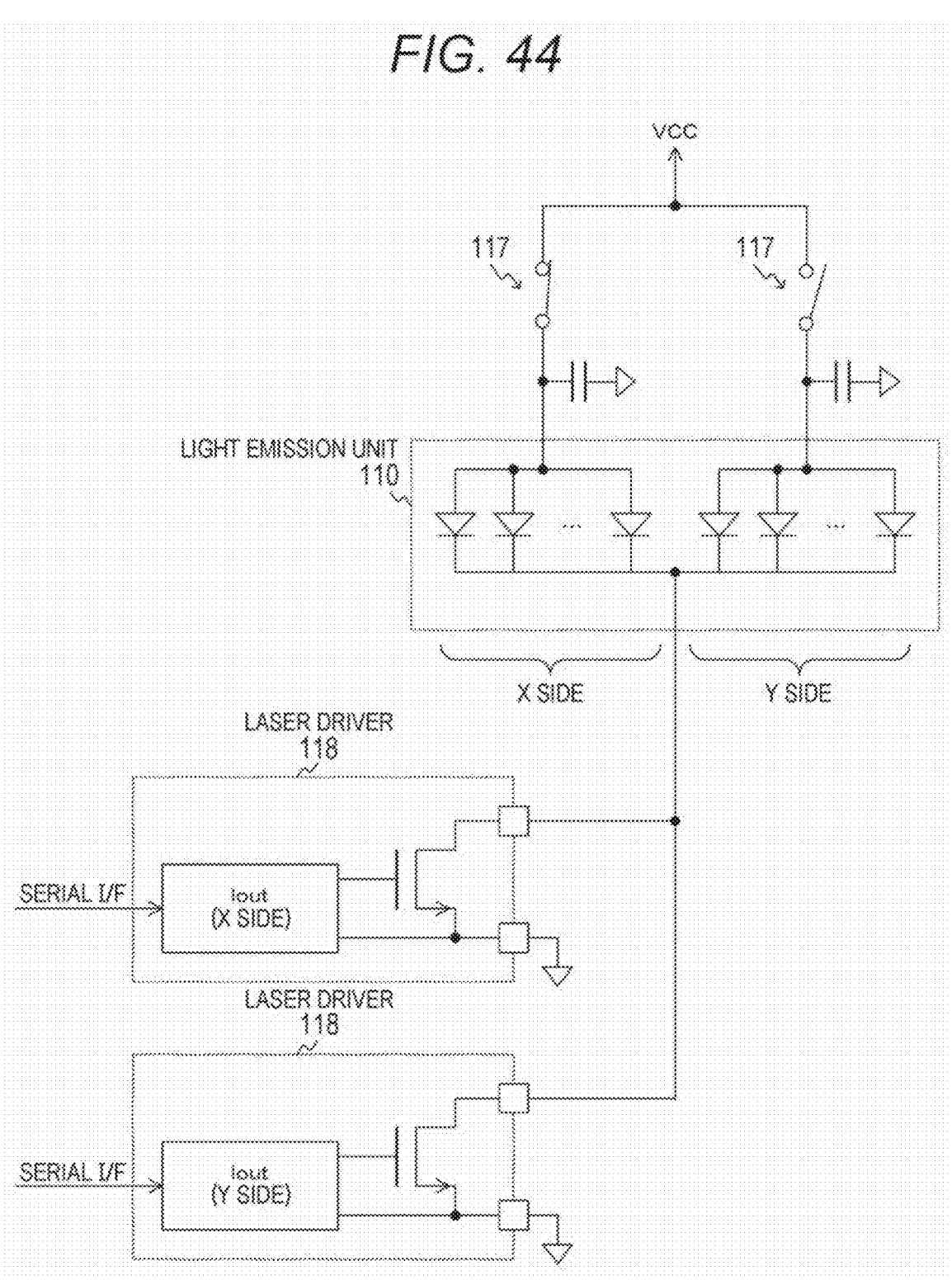
FIG. 44 is a diagram illustrating a second example of a laser driver 118 for driving the light emission unit 110 in the first application example of the embodiment of the present technology.

FIG. 44 is a diagram illustrating a second example of a laser driver 118 for driving the light emission unit 110 in the first application example of the embodiment of the present technology.

In this second example, the laser driver 118 is separately provided for driving each of the X side and the Y side of the light emitting elements 111. That is, one of the two laser drivers 118 is used for driving the light emitting elements 111 on the X side, and the other is used for driving the light emitting elements 111 on the Y side. By separately providing the laser drivers 118 in this manner, driving conditions such as a current and a voltage may be individually controlled.

Note that, the switching of the light emission between the X side and the Y side of the light emitting elements 111 may be performed by the switch 117 in this case also. Although the configuration of the cathode common circuit is described in this example, an anode common circuit is also possible, and the laser driver 118 may be arranged in each anode, and switched by an operation of each laser driver.

[Diffracted Light]

Figure 45:
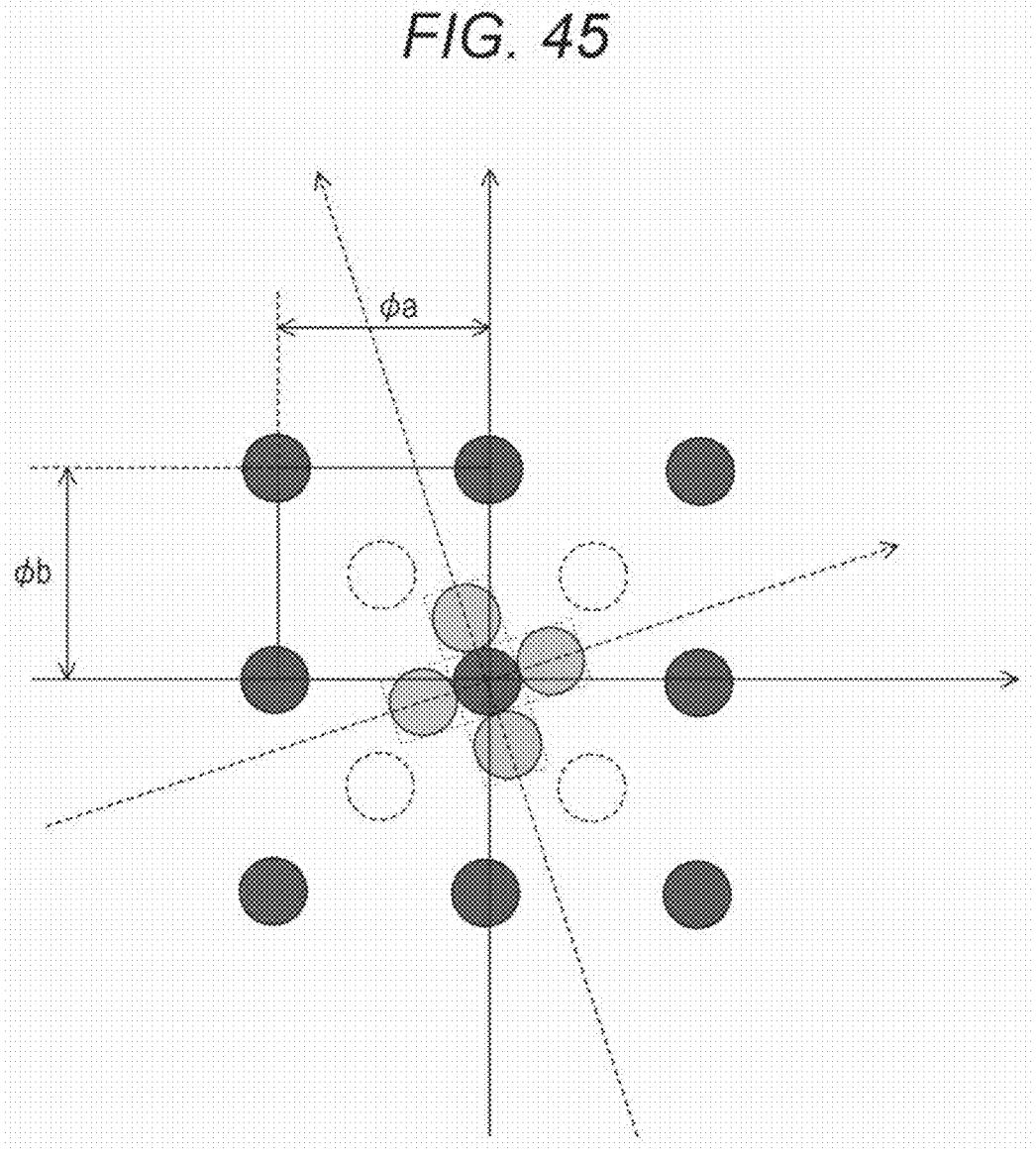
FIG. 45 is a diagram illustrating an example of the diffracted light by one light emitting element 111 on an X side in the first application example of the embodiment of the present technology.
Figure 46:
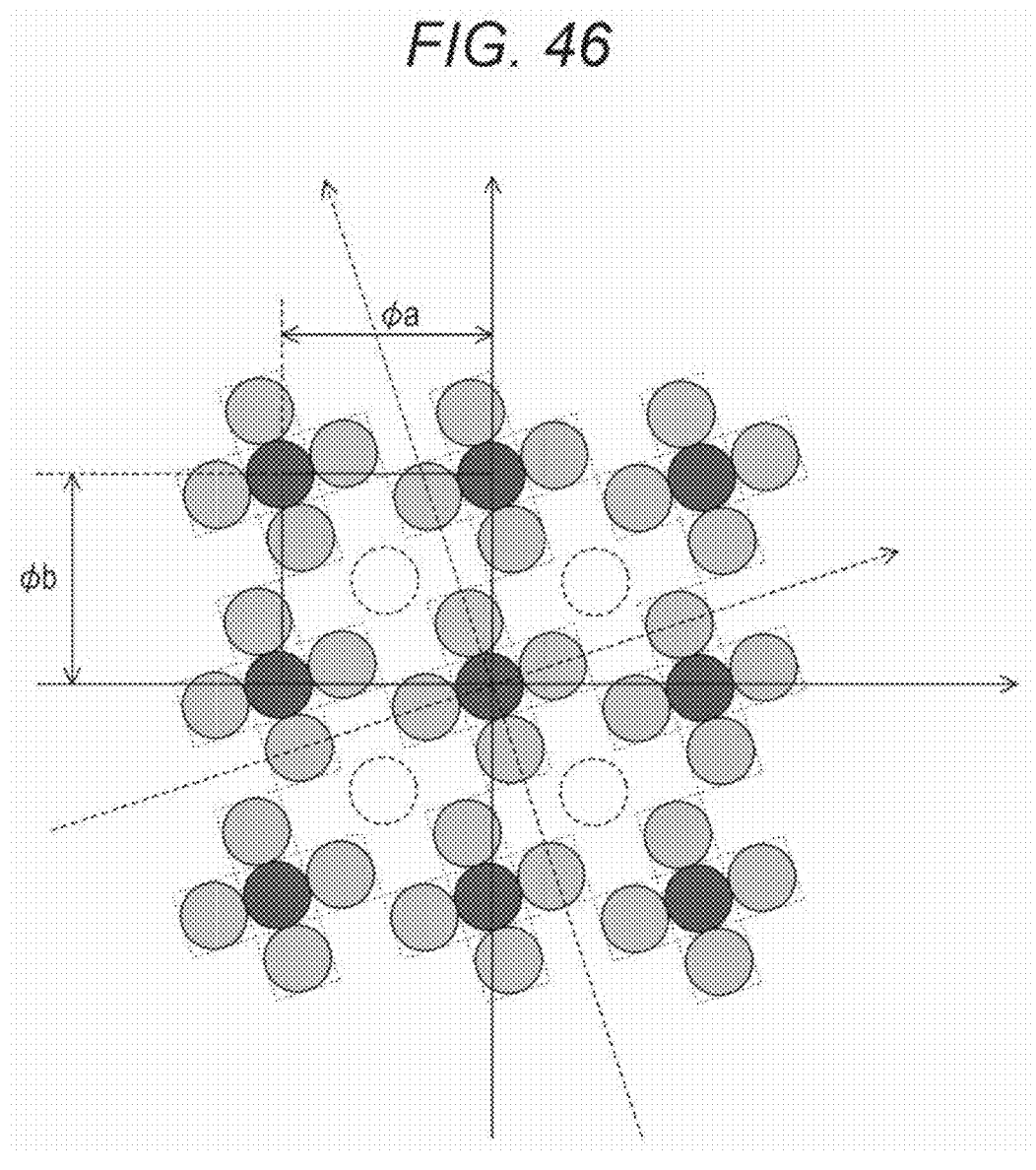
FIG. 46 is a diagram illustrating an example of the diffracted light by a plurality of light emitting elements 111 on the X side in the first application example of the embodiment of the present technology.
Figure 47:
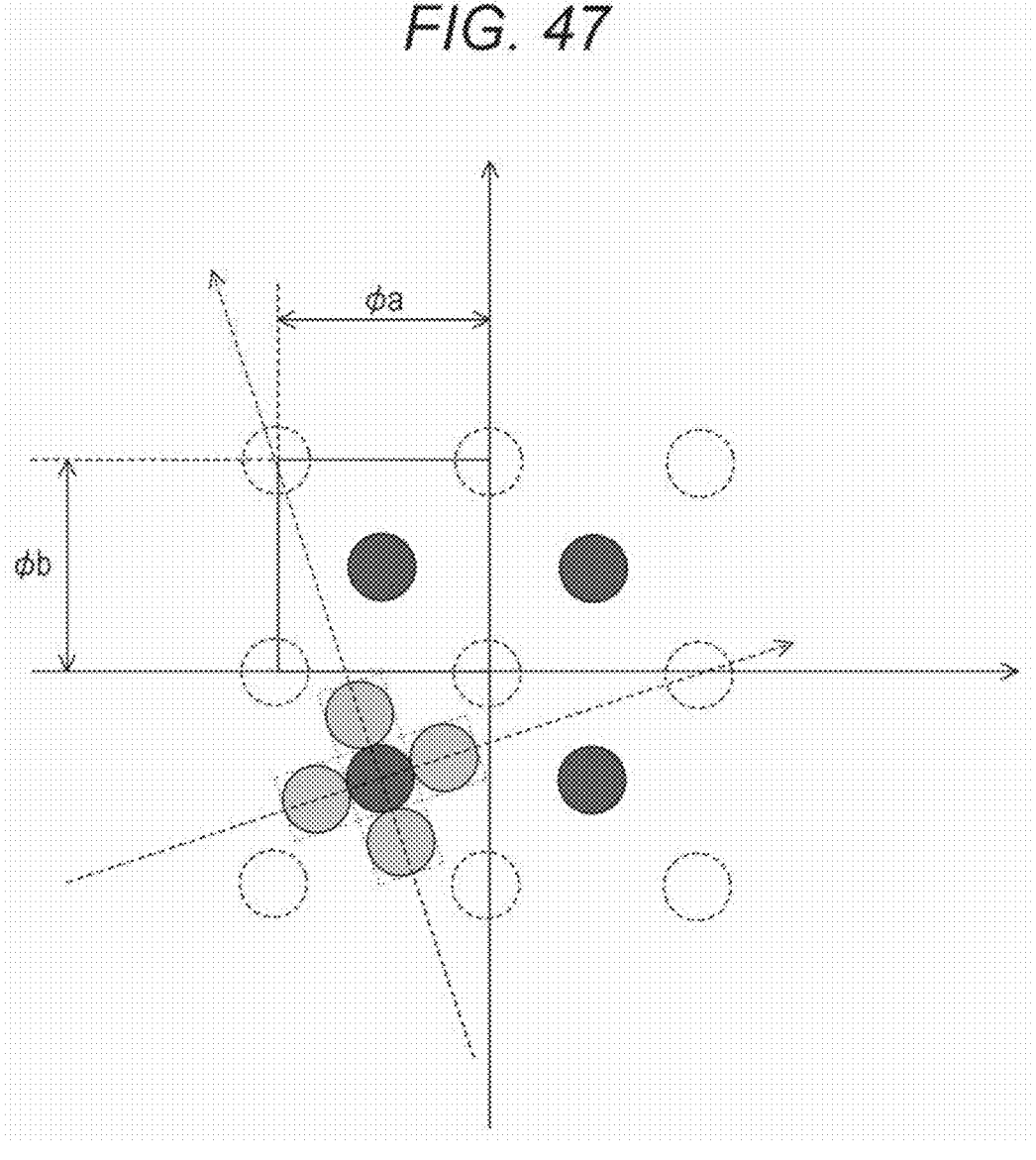
FIG. 47 is a diagram illustrating an example of the diffracted light by one light emitting element 111 on a Y side in the first application example of the embodiment of the present technology.
Figure 48:
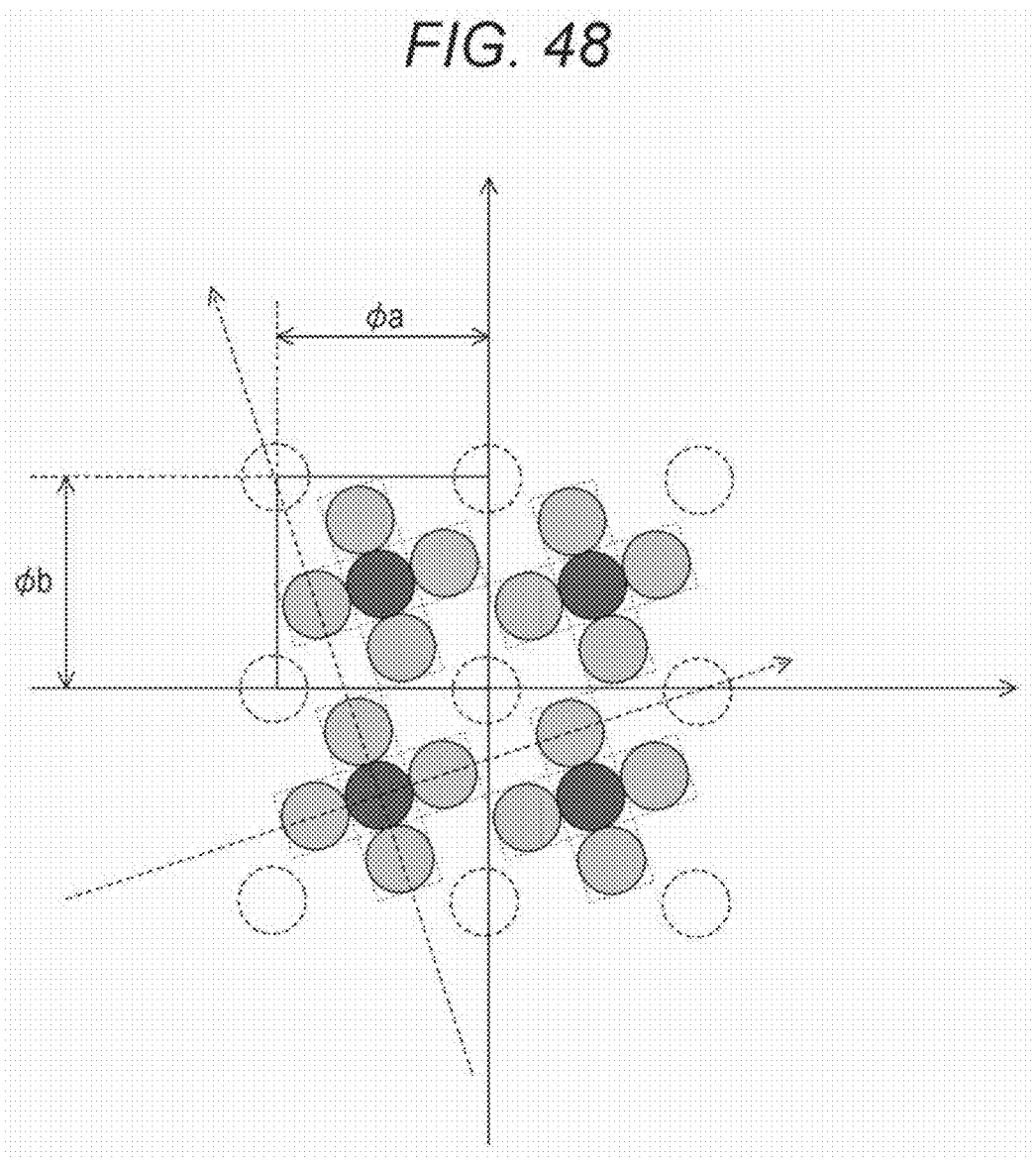
FIG. 48 is a diagram illustrating an example of the diffracted light by a plurality of light emitting elements 111 on the Y side in the first application example of the embodiment of the present technology.

FIG. 45 is a diagram illustrating an example of the diffracted light by one light emitting element 111 on the X side in the first application example of the embodiment of the present technology. FIG. 46 is a diagram illustrating an example of the diffracted light by a plurality of light emitting elements 111 on the X side in the first application example of the embodiment of the present technology. FIG. 47 is a diagram illustrating an example of the diffracted light by one light emitting element 111 on the Y side in the first application example of the embodiment of the present technology. FIG. 48 is a diagram illustrating an example of the diffracted lights by a plurality of light emitting elements 111 on the Y side in the application example of the embodiment of the present technology.

In this example, similarly to the above-described second embodiment, the diffraction element 134 generates the positive first order diffracted light and the negative first order diffracted light in each of the two directions for the light emitted from one light emitting element 111. Therefore, a total of four diffracted lights are generated for one light emitting element 111. In a case where the light emitting elements 111 on the X side and the light emitting elements 111 on the Y side are alternately switched to emit light, the diffracted light thereof is also simultaneously switched.

Figure 49:
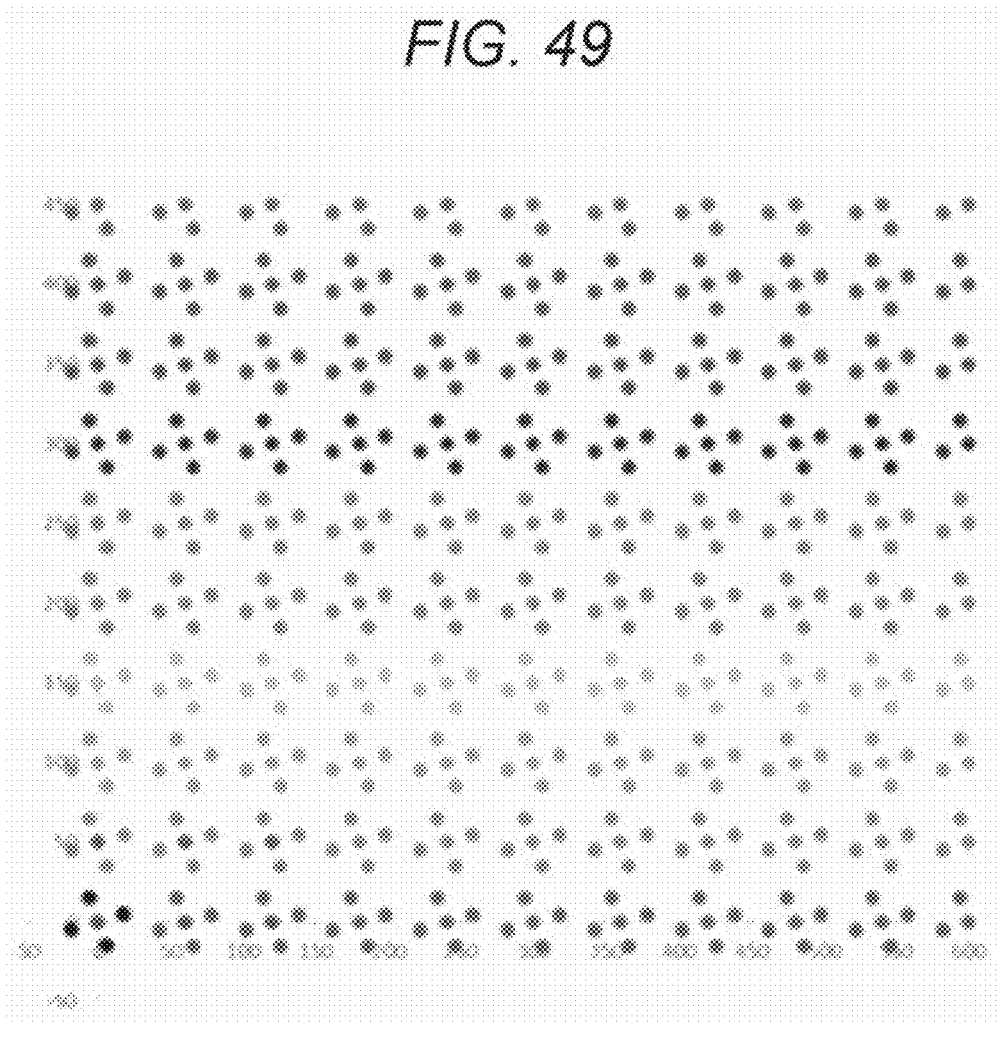
FIG. 49 is a diagram illustrating a specific example of a light irradiation spot pattern (light is emitted only on the X side) in the first application example of the embodiment of the present technology.
Figure 50:
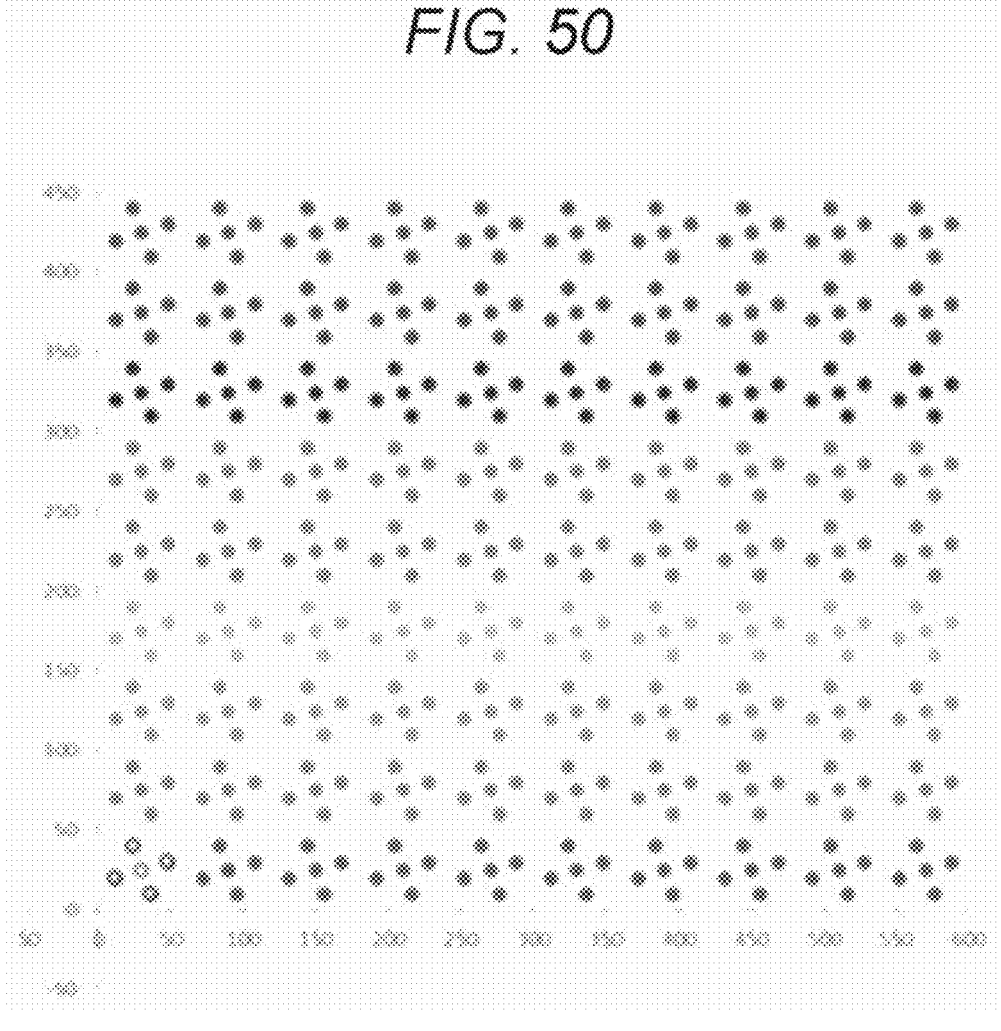
FIG. 50 is a diagram illustrating a specific example of a light irradiation spot pattern (light is emitted only on the Y side) in the first application example of the embodiment of the present technology.
Figure 51:
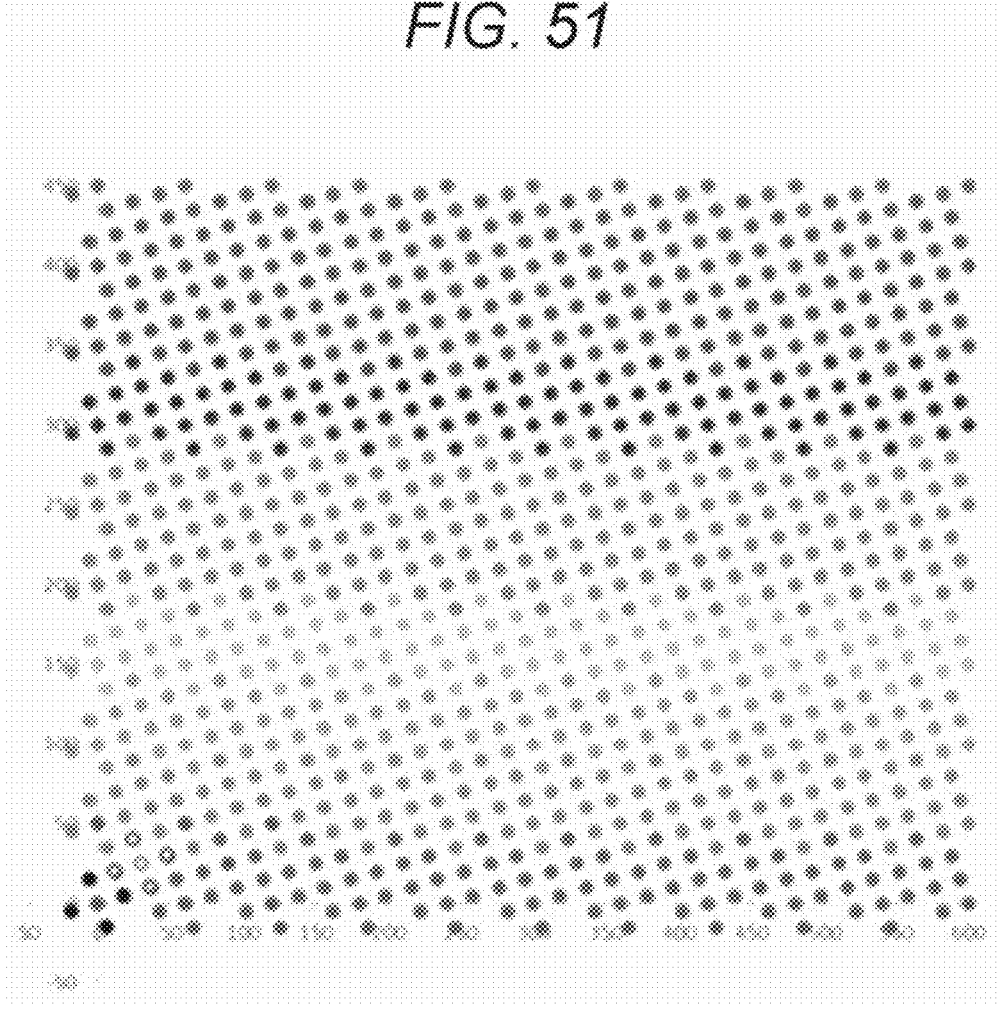
FIG. 51 is a diagram illustrating a specific example of a light irradiation spot pattern (light is emitted on both the X side and Y side) in the first application example of the embodiment of the present technology.

FIGS. 49 to 51 are diagrams illustrating specific examples of a light irradiation spot pattern in the first application example of the embodiment of the present technology. FIG. 49 illustrates an example of a case where only the light emitting elements 111 on the X side are allowed to emit light. FIG. 50 illustrates an example of a case where only the light emitting elements 111 on the Y side are allowed to emit light. FIG. 51 illustrates an example of a case where the light emitting elements 111 on both the X side and the Y side are allowed to emit light.

[Operation]

Figure 52:
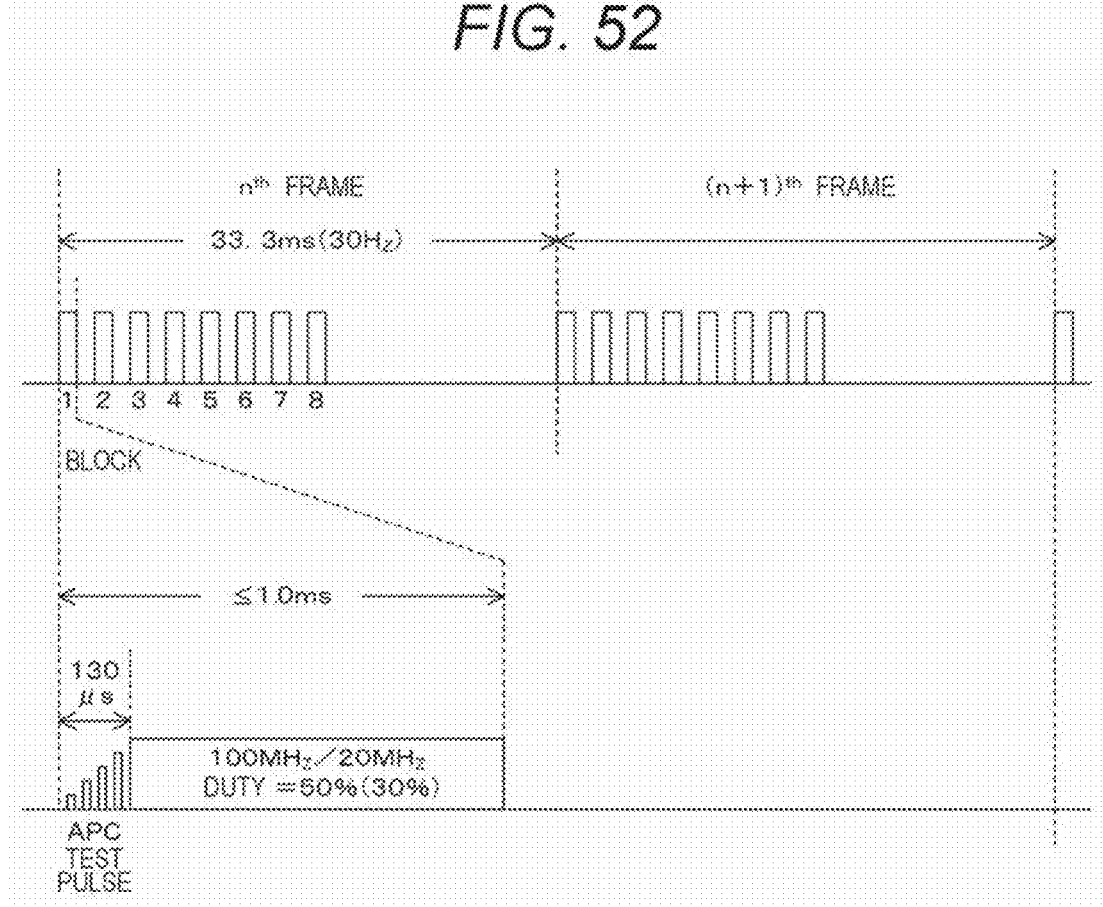
FIG. 52 is a diagram illustrating an operation timing example of light emission control of the light emission unit 110 in the first application example of the embodiment of the present technology.

FIG. 52 is a diagram illustrating an operation timing example of light emission control of the light emission unit 110 in the first application example of the embodiment of the present technology.

In this example, it is assumed that a frequency of frame display is 30 Hz. That is, a display time per frame is 33.3 ms. Each frame is divided into a plurality of blocks. A head of each block is a period of an auto power control (APC) test pulse of 180 μs, and light emission is subsequently performed according to a signal of a corresponding block.

As an aspect of the light emission control of the light emitting element 111, for example, the following three methods may be mentioned. In a first method, light emission is alternately performed on the X side and the Y side for each frame. Therefore, it is possible to reduce power consumption per frame. Furthermore, it is possible to increase a light output in one frame to extend a ranging distance and to improve ranging accuracy. In this manner, ranging with improved resolution may be performed using two frames.

In a second method, light emission is alternately performed on the X side and the Y side for each block. Furthermore, in a third method, which is an intermediate method between the first method and the second method described above, light emission is alternately performed in a switching manner on the X side and the Y side for every plurality of blocks.

By such switching of light emission, in light spot irradiation of one side, light (multipath light) that is irregularly reflected to be returned from an object other than a target is detected using a region not irradiated with the light spot. Then, it is also possible to correct a ranging error due to multipath by subtracting an influence of the detected multipath light from a ranging value obtained by the light spot irradiation.

In this example, it is assumed that the X side and the Y side are alternately switched, but it is also possible to sequentially switch among only the X side, only the Y side, and both the X side and Y side, between only the X side and both the X side and Y side, or between only the Y side and both the X side and Y side. For example, in consideration of power consumption, it is conceivable that both of them emit light in a case where the light output per one light emitting element 111 may be low at a short distance, and only one of them emits light in a case where the light output per one light emitting element 111 is desired to be high at a long distance. This makes it possible to perform ranging with high resolution at a short distance and ranging with high distance accuracy at a long distance.

[Switching for Each Region]

Figure 53:
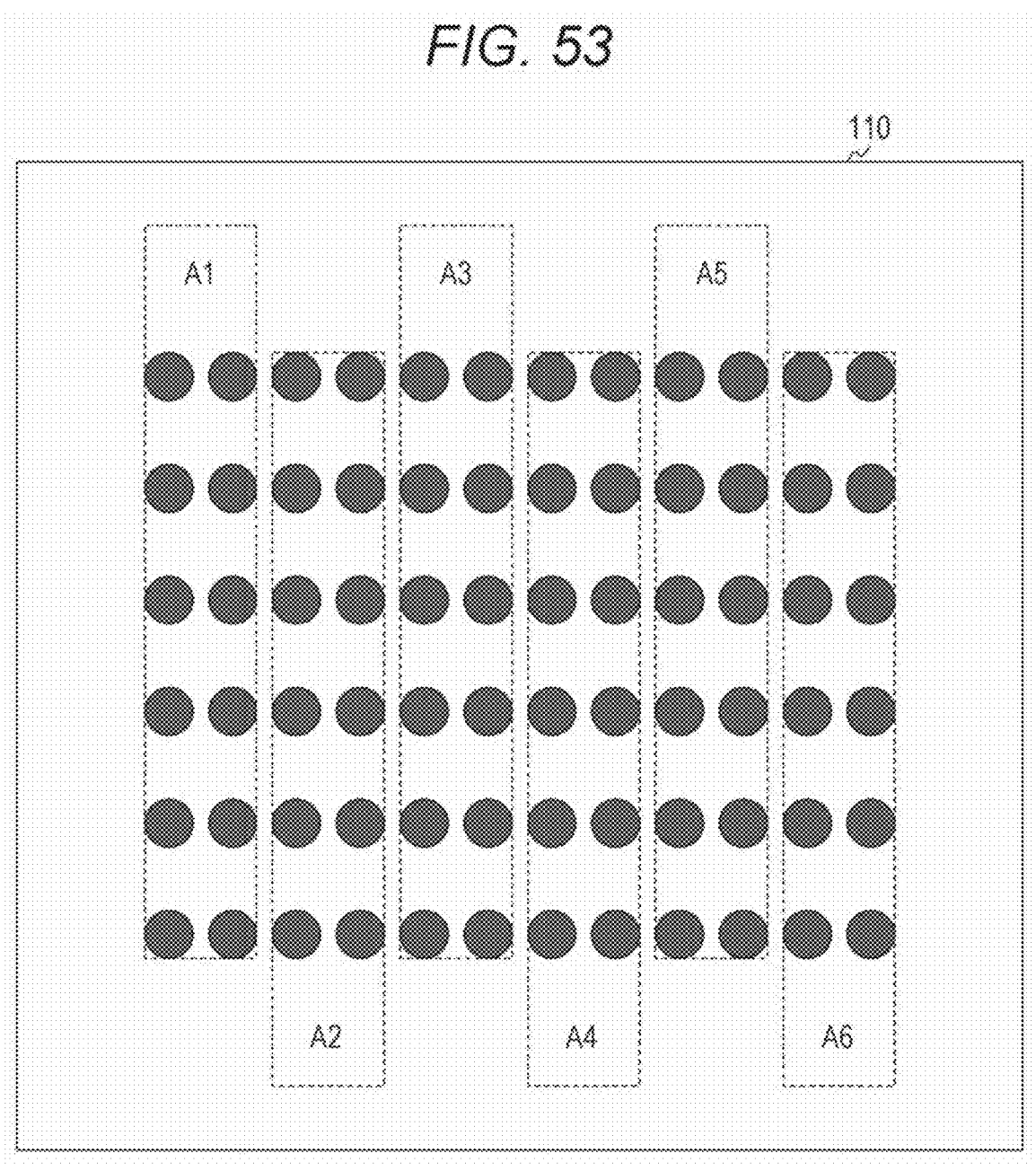
FIG. 53 is a diagram illustrating a first example of grouping of the light emitting elements 111 in the first application example of the embodiment of the present technology.
Figure 54:
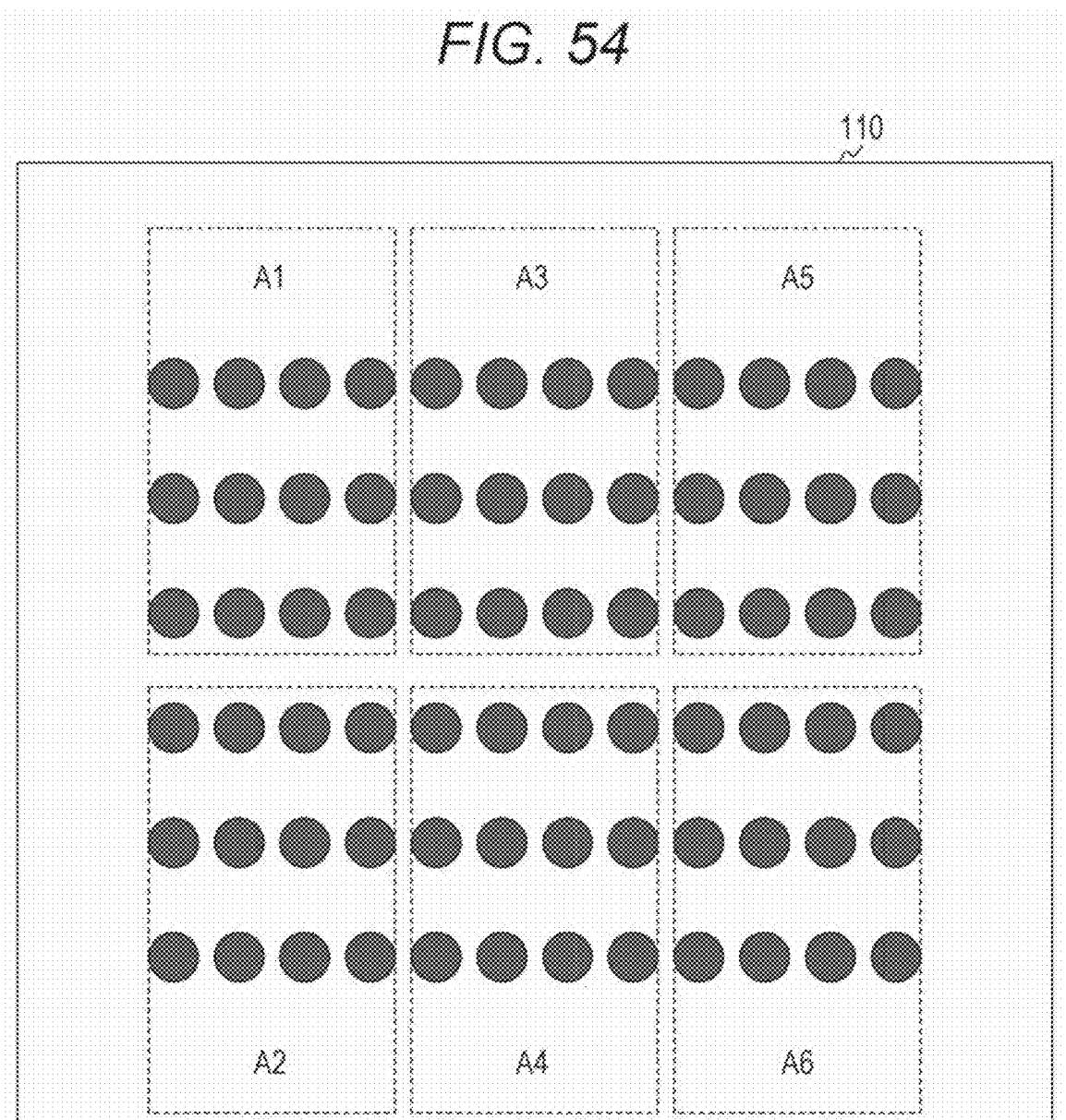
FIG. 54 is a diagram illustrating a second example of grouping of the light emitting elements 111 in the first application example of the embodiment of the present technology.
Figure 55:
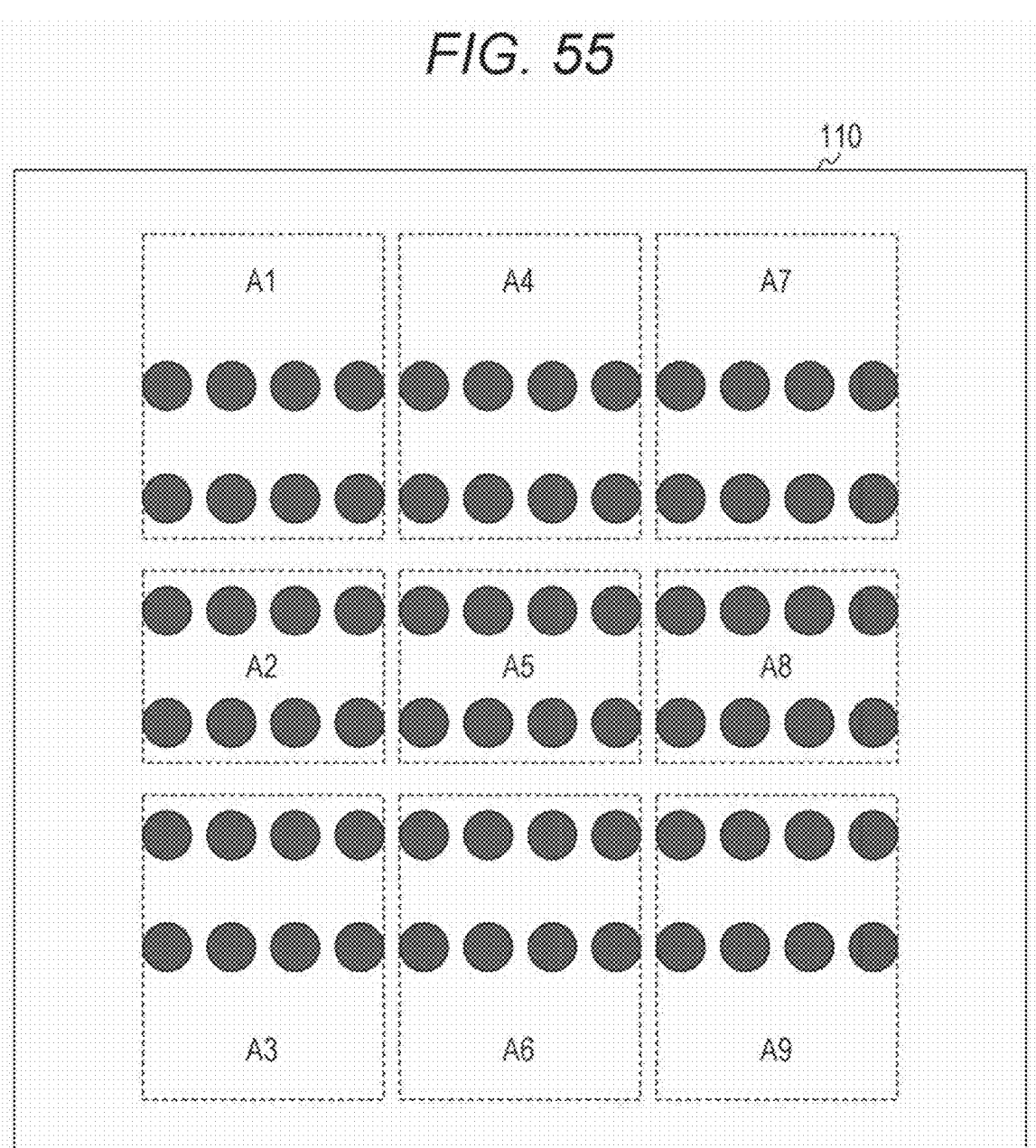
FIG. 55 is a diagram illustrating a third example of grouping of the light emitting elements 111 in the first application example of the embodiment of the present technology.

FIGS. 53 to 55 are diagrams illustrating an example of grouping of the light emitting elements 111 in the first application example of the embodiment of the present technology.

In the example in FIG. 53, a case is assumed where one region is formed for every plurality of columns (two columns in this example) and switching is performed for each region. In the example in FIG. 54, a case is assumed where one frame is further vertically divided into two to form quadrangle regions and switching is performed for each region. In the example in FIG. 55, a case is assumed where it is vertically divided into three and switching is performed for each region.

When the number of spots is increased and light intensity per spot is maintained, there is a possibility that power consumption increases to exceed safety standard for protecting the eye. In this regard, by switching the light emission in units of regions, flexible adjustment may be performed. Switching of light emission may be performed for each frame, or may be performed for each block or the like in the frame. Furthermore, it is also possible to recognize a position of a target ranging of which is intended and allow the region to emit light.

Figure 56:
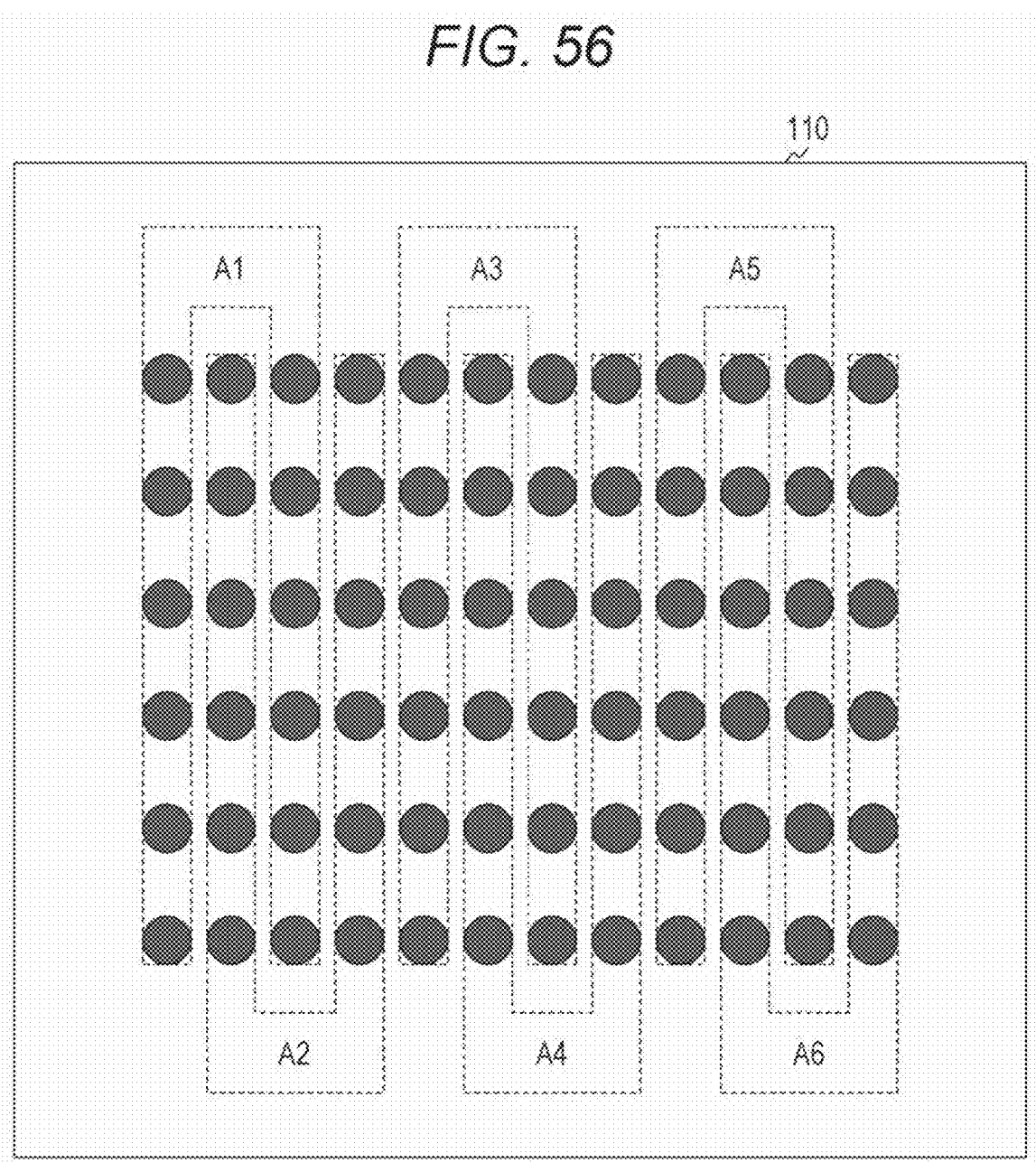
FIG. 56 is a diagram illustrating a fourth example of grouping of the light emitting elements 111 in the first application example of the embodiment of the present technology.

FIG. 56 is a diagram illustrating another example of grouping of the light emitting elements 111 in the first application example of the embodiment of the present technology.

In this example, an example is illustrated in which grouping is performed for every two columns with one column nested between two columns. For example, first and third columns form a region A1, second and fourth columns form a region A2, fifth and seventh columns form a region A3, sixth and eighth columns form a region A4, ninth and eleventh columns form a region A5, and tenth and twelfth columns form a region A6. Therefore, switching of light emission may be controlled for every two columns. Therefore, it is possible to reduce power consumption by region switching and increase light output within the laser safety standard while taking multipath countermeasures.

Second Application Example

In this second application example, a beam shaping function is provided between the light emission unit 110 and the collimator lens 113 in the above-described embodiment.
[Configuration of Illumination Unit]

Figure 57:
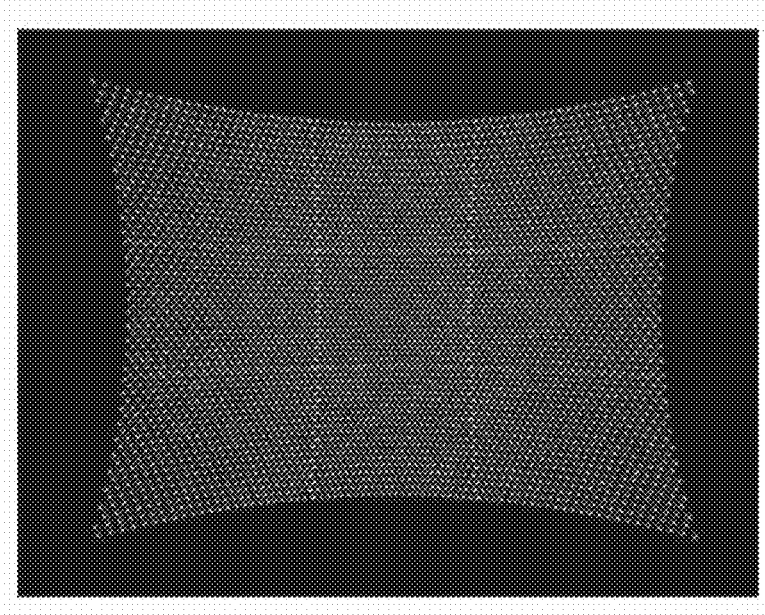
FIG. 57 is a diagram illustrating an example of a configuration of an irradiation unit 100 in a second application example of the embodiment of the present technology.
Figure 57:
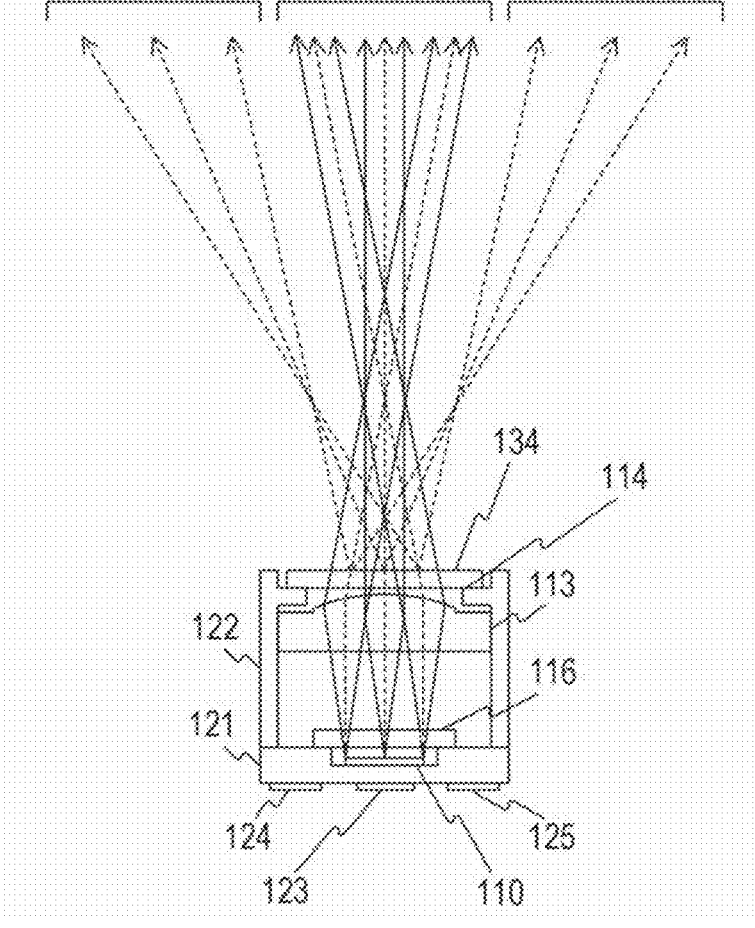

FIG. 57 is a cross-sectional view illustrating an example of a configuration of the illumination unit 100 in the second application example of the embodiment of the present technology.

In this second application example, the illumination unit 100 is provided with the light emission unit 110, a microlens array 116, the collimator lens 113, and the diffraction elements 114 and 134. The microlens array 116 obtained by arranging a plurality of lenses in an array has the beam shaping function.

The microlens array 116 is formed on an upper surface of the light emission unit 110. The plurality of light emitting elements 111 of the light emission unit 110 includes one on an upper surface of which the lens of the microlens array 116 is formed, and one on the upper surface of which the lens of the microlens array 116 is not formed. In a case where the lens of the microlens array 116 is formed on the upper surface, irradiation light from the light emitting element 111 becomes uniform irradiation. In contrast, in a case where the lens of the microlens array 116 is not formed on the upper surface, the irradiation light from the light emitting element 111 becomes spot irradiation.

Figure 58:
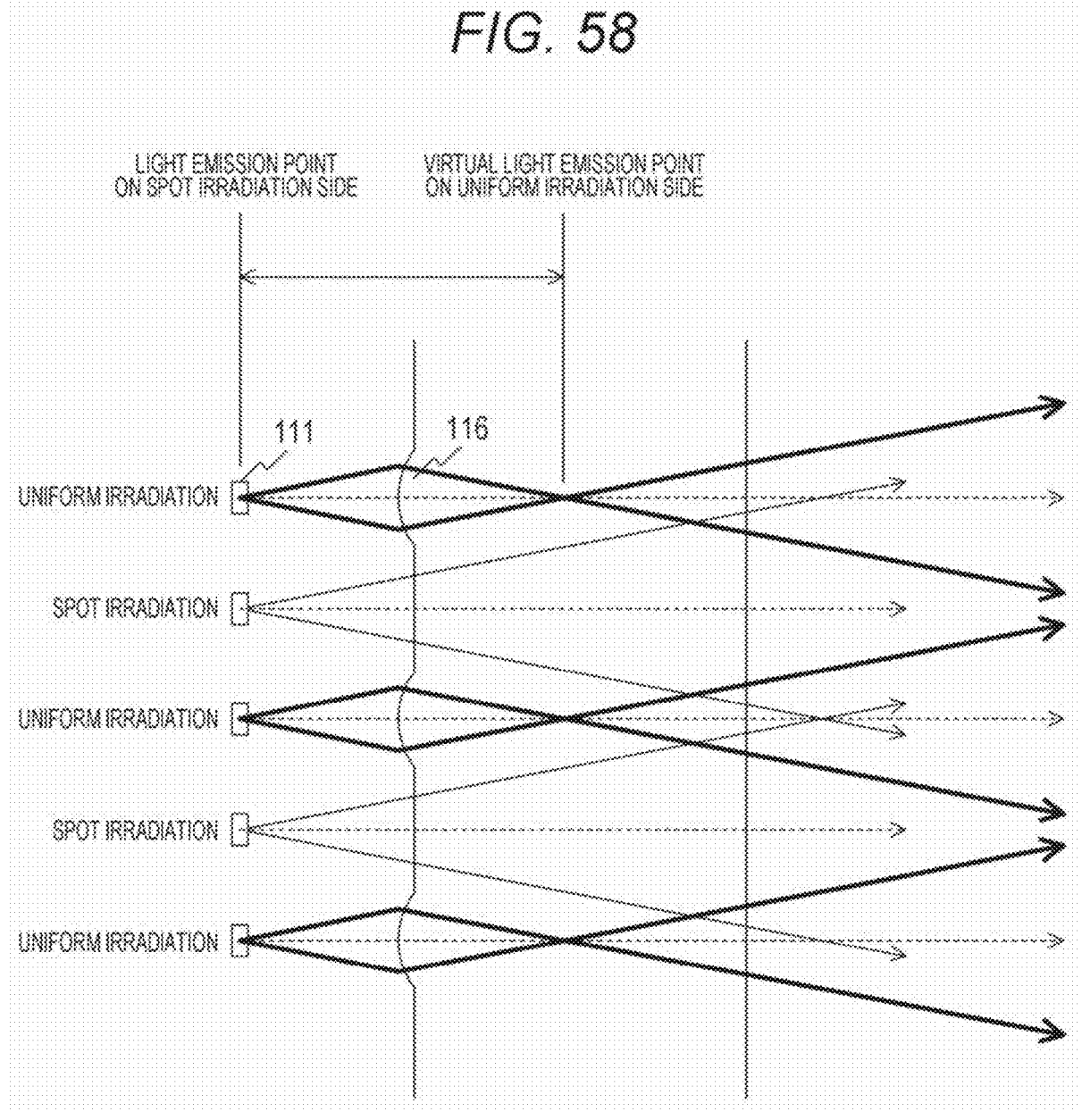
FIG. 58 is a diagram illustrating an example of behavior of a light beam in the second application example of the embodiment of the present technology.

FIG. 58 is a diagram illustrating an example of behavior of a light beam in the second application example of the embodiment of the present technology.

A laser beam emitted from each of a plurality of light emitting elements 111 is refracted by, in a case where the lens of the microlens array 116 is formed on the upper surface thereof, by a lens surface thereof, and forms a virtual light emission point in the microlens array 116, for example. In this case, the light emission points of the plurality of light emitting elements 111 are shifted and defocused in an optical axis direction, and are superimposed on the light beams emitted from adjacent light emitting elements 111, whereby uniform irradiation is performed. In contrast, in a case where the lens of the microlens array 116 is not formed on the upper surface, the refraction by the lens of the microlens array 116 does not occur, and the irradiation light from the light emitting element 111 becomes spot irradiation. Therefore, in the illumination unit 100, it is possible to switch between the spot irradiation and uniform irradiation by switching between light emission of one on the upper surface of which the lens of the microlens array 116 is formed and light emission of one without the lens formed.

Figure 59:
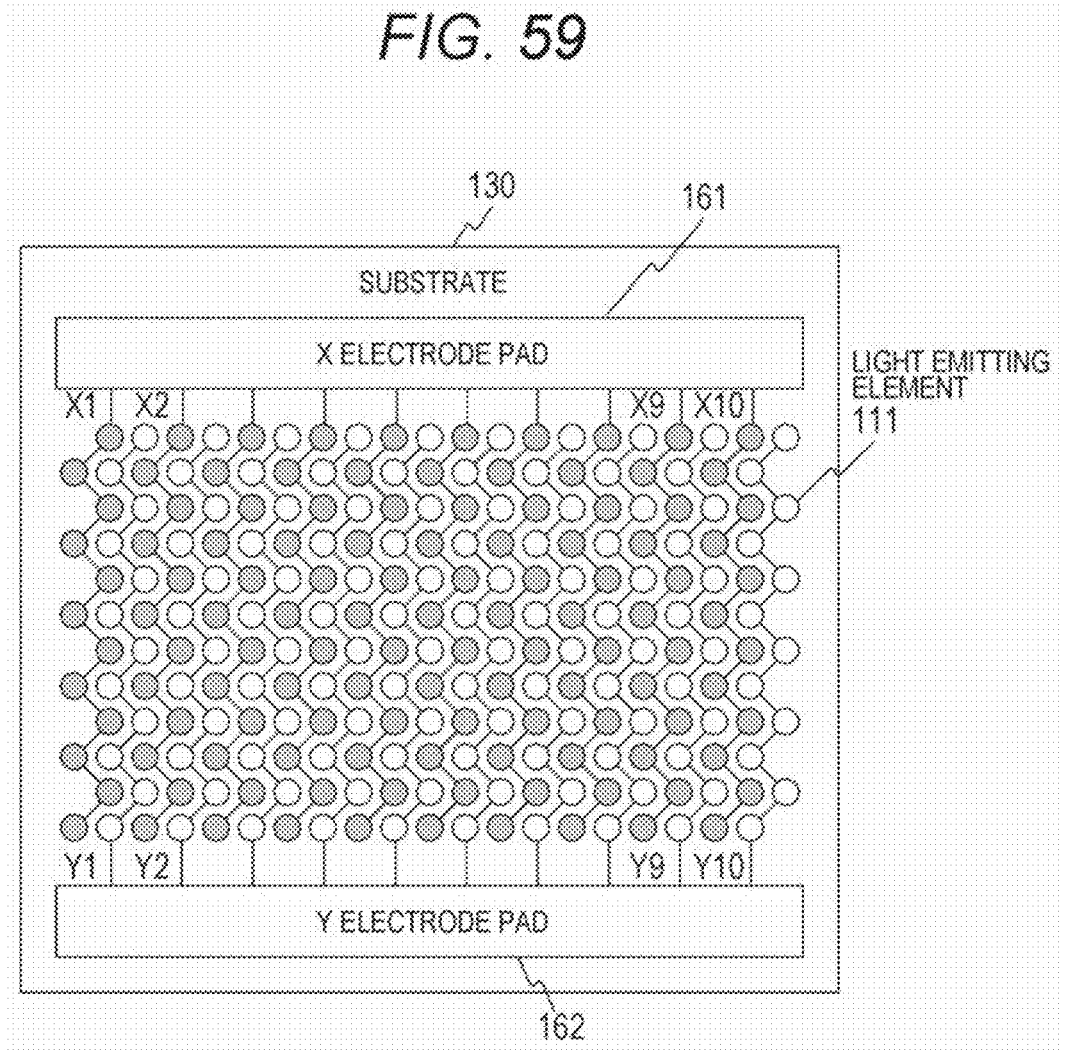
FIG. 59 is a diagram illustrating a first configuration example of the light emission unit 110 in the second application example of the embodiment of the present technology.

FIG. 59 is a diagram illustrating a first configuration example of the light emission unit 110 in the second application example of the embodiment of the present technology.

In the first configuration example, when each of the X light emitting elements and the Y light emitting elements emit light, four corners and one point where opposite corners intersect each other emit light.

Figure 60:
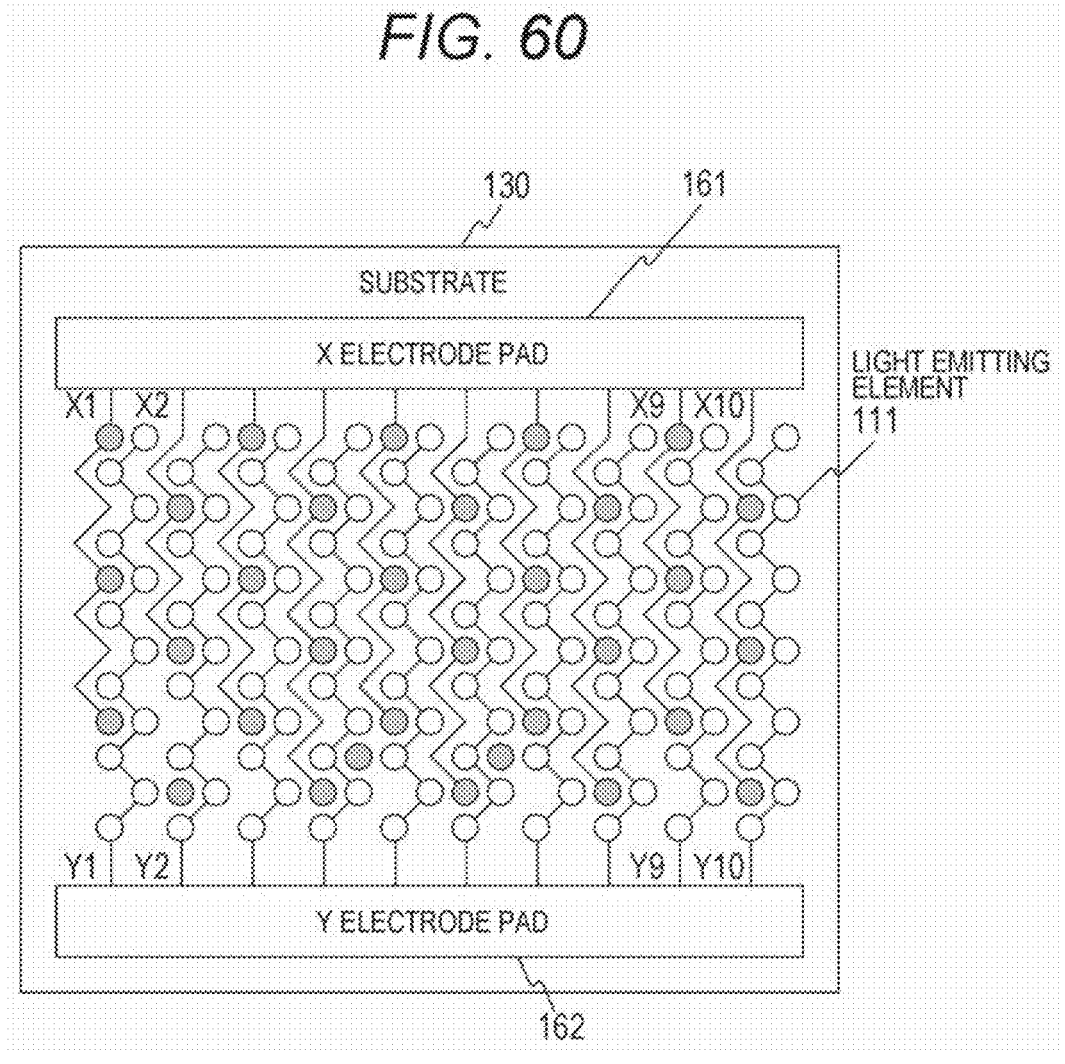
FIG. 60 is a diagram illustrating a second configuration example of the light emission unit 110 in the second application example of the embodiment of the present technology.

FIG. 60 is a diagram illustrating a second configuration example of the light emission unit 110 in the second application example of the embodiment of the present technology.

In this second configuration example, the number of light emitting elements of two groups is different from that in the above-described first configuration example. In the second configuration example, a length between the light emitting elements on the X side is twice that on the Y side. In this case, it is desirable to form a diffraction grating pattern on the basis of a period on the X side with a wide light emitting element interval.

In this example, the number of light emitting elements on a spot irradiation side is small, an interval between the spots with which the target is irradiated is widened, and a non-irradiation region between the spots for taking multipath countermeasures may be sufficiently secured. That is, when the same power is supplied to the light emission unit 110, the light output in each of the light emitting elements 111 may be increased, and the number of light emitting elements 111 on the uniform irradiation side is large, so that a more uniform light intensity distribution may be obtained.

Figure 61:
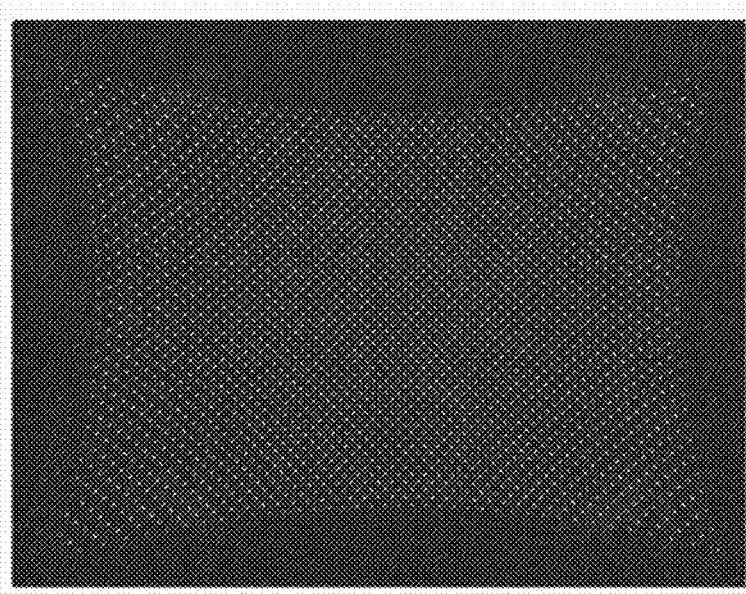
FIG. 61 is a diagram illustrating an example of an irradiation pattern in the second application example of the embodiment of the present technology.
Figure 61:
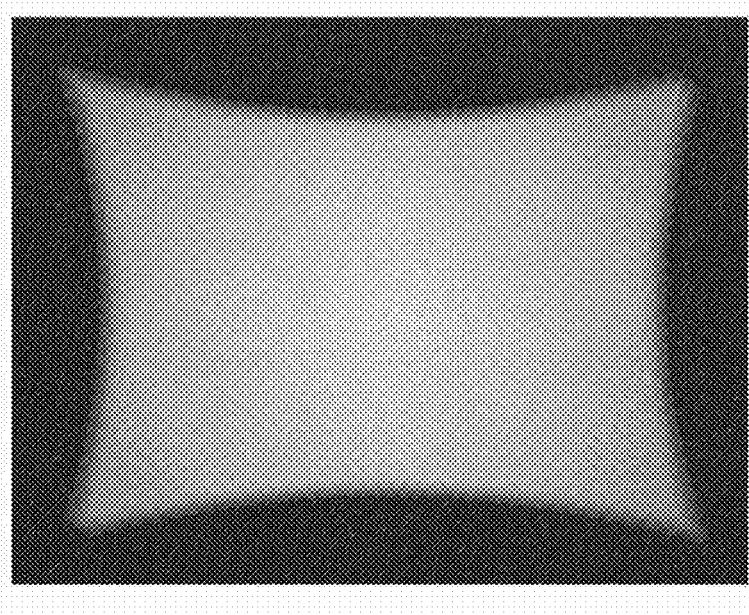

FIG. 61 is a diagram illustrating an example of the irradiation pattern in the second application example of the embodiment of the present technology.

In the drawing, a illustrates the irradiation pattern on the spot side. In the drawing, b illustrates the irradiation pattern on the uniform irradiation side.

In this manner, according to the embodiment of the present technology, by dividing the spot light by the diffraction element 134, it is possible to improve the resolution while suppressing the number of light emitting elements 111 arranged in an optical module. Furthermore, the intervals of the spot lights may be made uniform. Furthermore, it is possible to reduce the influence of high order diffracted light.

Note that, the above-described embodiments describe an example of embodying the present technology, and there is a correspondence relationship between the matters in the embodiments and the matters specifying the invention in claims. Similarly, there is a correspondence relationship between the matters specifying the invention in claims and the matters in the embodiments of the present technology having the same names. However, the present technology is not limited to the embodiments and may be embodied with various variations of the embodiment without departing from the spirit thereof.

Note that, the effects described in this specification are merely examples, and are not limited to them; there may also another effect.

Note that, the present technology may also have a following configuration.

(1) An optical module including:

a light emission unit including light emitting elements arrayed two-dimensionally; and a diffraction element that diffracts a light beam emitted from each of the light emitting elements and separates the light beam into a plurality of light beams, in which the light emission unit has a structure of a plurality of arrays based on a structure in which the light emitting elements are arranged at vertexes of a quadrangle of which sides facing each other are parallel to each other and at a point at which diagonal lines of the quadrangle intersect, in which a distance between the light emitting elements on a side in a first direction is set to a and a distance between the light emitting elements on a side in a second direction orthogonal to the side in the first direction is set to b, the diffraction element generates diffracted lights in n directions (n is a natural number), in which an angle $\theta x$ formed between one diffraction direction and the side in the first direction satisfies $\theta x = \tan^{-1}(b/3a)$, and a diffraction angle $\varphi x$ of diffracted light satisfies $\varphi x = m \cdot \mathrm{sqrt}((3\varphi a)^2 + \varphi b^2)/(2(2n+1))$ when angle differences of two light beams generated by inter-light emission distances a and b are set to $\varphi a$ and $\varphi b$, respectively, and m is set to a natural number excluding an integral multiple of 2n+1.

(2) The optical module according to (1) described above, further including:

an optical element that converts the light beam emitted from the light emitting element into a substantially parallel light beam or a light beam having a predetermined angular width.

(3) The optical module according to (1) or (2) described above, further including:

a light detection unit that detects reflected light from a target with respect to the light beam.

(4) The optical module according to any one of (1) to (3) described above, in which the light emission unit includes a switching unit that switches the light emitting elements to emit light between at least two sets.

(5) The optical module according to any one of (1) to (4) described above, in which each of the light emitting elements includes at least two active layers in a longitudinal direction.

(6) A distance measuring device including:

a light emission unit including light emitting elements arrayed two-dimensionally;

a diffraction element that diffracts a light beam emitted from each of the light emitting elements and separates the light beam into a plurality of light beams;

a light detection unit that detects reflected light from a target with respect to the light beam; and a ranging unit that measures a distance to the target from the light beam and the reflected light, in which the light emission unit has a structure of a plurality of arrays based on a structure in which the light emitting elements are arranged at vertexes of a quadrangle of which sides facing each other are parallel to each other and at a point at which diagonal lines of the quadrangle intersect, in which a distance between the light emitting elements on a side in a first direction is set to a and a distance between the light emitting elements on a side in a second direction orthogonal to the side in the first direction is set to b, the diffraction element generates diffracted lights in n directions (n is a natural number), in which an angle $\theta x$ formed between one diffraction direction and the side in the first direction satisfies $\theta x = \tan^{-1}(b/3a)$, and a diffraction angle $\varphi x$ of diffracted light satisfies $\varphi x = m \cdot \mathrm{sqrt}((3\varphi a)^2 + \varphi b^2)/(2(2n+1))$ when angle differences of two light beams generated by inter-light emission distances a and b are set to $\varphi a$ and $\varphi b$, respectively, and m is set to a natural number excluding an integral multiple of 2n+1.

REFERENCE SIGNS LIST

10 Ranging device
20 Irradiation target
100 Illumination unit
110 Light emission unit
111 Light emitting element
113 Collimator lens
114 Diffraction element
117 Switch
118 Laser driver
119 Component incorporating substrate
121, 122 Holding unit
123 Cathode electrode unit
124, 125 Anode electrode unit
130 Substrate
134 Diffraction element
161, 162 Electrode pad
200 Light reception unit
300 Control unit
400 Ranging unit

The invention claimed is:

1. An optical module comprising:

a light emission unit including light emitting elements arrayed two-dimensionally; and a diffraction element that diffracts a light beam emitted from each of the light emitting elements and separates the light beam into a plurality of light beams, wherein the light emission unit has a structure of a plurality of arrays based on a structure in which the light emitting elements are arranged at vertexes of a quadrangle of which sides facing each other are parallel to each other and at a point at which diagonal lines of the quadrangle intersect, in which a distance between the light emitting elements on a side in a first direction is set to a and a distance between the light emitting elements on a side in a second direction orthogonal to the side in the first direction is set to b, the diffraction element generates diffracted lights in n directions (n is a natural number), in which an angle $\theta x$ formed between one diffraction direction and the side in the first direction satisfies $\theta x = \tan^{-1}(b/3a)$, and a diffraction angle $\varphi x$ of diffracted light satisfies $\varphi x = m \cdot \mathrm{sqrt}((3\varphi a)^2 + \varphi b^2)/(2(2n+1))$ when angle differences of two light beams generated by inter-light emission distances a and b are set to $\varphi a$ and $\varphi b$, respectively, and m is set to a natural number excluding an integral multiple of 2n+1.

2. The optical module according to claim 1, further comprising:

an optical element that converts the light beam emitted from the light emitting element into a substantially parallel light beam or a light beam having a predetermined angular width.

3. The optical module according to claim 1, further comprising:

a light detection unit that detects reflected light from a target with respect to the light beam.

4. The optical module according to claim 1, wherein the light emission unit includes a switching unit that switches the light emitting elements to emit light between at least two sets.

5. The optical module according to claim 1, wherein each of the light emitting elements includes at least two active layers in a longitudinal direction.

6. A distance measuring device comprising:

a light emission unit including light emitting elements arrayed two-dimensionally;

a diffraction element that diffracts a light beam emitted from each of the light emitting elements and separates the light beam into a plurality of light beams;

a light detection unit that detects reflected light from a target with respect to the light beam; and a ranging unit that measures a distance to the target from the light beam and the reflected light, wherein the light emission unit has a structure of a plurality of arrays based on a structure in which the light emitting elements are arranged at vertexes of a quadrangle of which sides facing each other are parallel to each other and at a point at which diagonal lines of the quadrangle intersect, in which a distance between the light emitting elements on a side in a first direction is set to a and a distance between the light emitting elements on a side in a second direction orthogonal to the side in the first direction is set to b, the diffraction element generates diffracted lights in n directions (n is a natural number), in which an angle $\theta x$ formed between one diffraction direction and the side in the first direction satisfies $$\theta x = \tan^{-1}(b/3a), \text{ and}$$

a diffraction angle $\varphi x$ of diffracted light satisfies $$\varphi x = m \cdot \text{sgrt}((3\varphi a)^2 + \varphi b^2)/(2(2n+1))$$

when angle differences of two light beams generated by inter-light emission distances a and b are set to $\varphi a$ and $\varphi b$, respectively, and m is set to a natural number excluding an integral multiple of 2n+1.

* * * * *